(12) United States Patent
Moore et al.

(10) Patent No.: US 11,506,497 B2
(45) Date of Patent: *Nov. 22, 2022

(54) WARNING FOR FREQUENTLY TRAVELED TRIPS BASED ON TRAFFIC

(71) Applicant: Apple Inc., Cupertino, CA (US)

(72) Inventors: Bradford A. Moore, San Francisco, CA (US); Christine B. McGavran, Pacifica, CA (US); Gregory D. Bolsinga, San Francisco, CA (US); Christopher Blumenberg, San Francisco, CA (US); Seejo K. Pylappan, Cupertino, CA (US); Marcel Van Os, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 162 days.

This patent is subject to a terminal disclaimer.

(21) Appl. No.: 16/511,729

(22) Filed: Jul. 15, 2019

(65) Prior Publication Data

US 2019/0339079 A1 Nov. 7, 2019

Related U.S. Application Data

(63) Continuation of application No. 15/494,163, filed on Apr. 21, 2017, now Pat. No. 10,371,526, which is a
(Continued)

(51) Int. Cl.
*G01C 21/00* (2006.01)
*G06N 5/04* (2006.01)
(Continued)

(52) U.S. Cl.
CPC ......... *G01C 21/00* (2013.01); *G01C 21/3484* (2013.01); *G01C 21/3492* (2013.01);
(Continued)

(58) Field of Classification Search
CPC .......................... G01C 21/00; G01C 21/3492; G01C 21/3617; G01C 21/362; G01C 21/3484; G06N 20/00; G06N 5/04
(Continued)

(56) References Cited

U.S. PATENT DOCUMENTS 1,102,037 A 6/1914 Gibson
4,846,836 A 7/1989 Reich
(Continued)

FOREIGN PATENT DOCUMENTS

AU 2014235244 A1 9/2015
AU 2014235248 A1 9/2015
(Continued)

OTHER PUBLICATIONS

Mohan et al., "Adapting Multimedia Internet Content For Universal Access," IEEE Transactions on Multimedia, Mar. 1999, pp. 104-114.
(Continued)

*Primary Examiner* — Maceeh Anwari
(74) *Attorney, Agent, or Firm* — Invoke

(57) ABSTRACT

Some embodiments of the invention provide a novel prediction engine that (1) can formulate predictions about current or future destinations and/or routes to such destinations for a user, and (2) can relay information to the user about these predictions. In some embodiments, this engine includes a machine-learning engine that facilitates the formulation of predicted future destinations and/or future routes to destinations based on stored, user-specific data. The user-specific data is different in different embodiments. In some embodiments, the stored, user-specific data includes data about any combination of the following: (1) previous destinations traveled to by the user, (2) previous routes taken by the user, (3) locations of calendared events in the user's
(Continued)

calendar, (4) locations of events for which the user has electronic tickets, and (5) addresses parsed from recent e-mails and/or messages sent to the user. In some embodiments, the prediction engine only relies on user-specific data stored on the device on which this engine executes. Alternatively, in other embodiments, it relies only on user-specific data stored outside of the device by external devices/servers. In still other embodiments, the prediction engine relies on user-specific data stored both by the device and by other devices/servers.

20 Claims, 23 Drawing Sheets

Related U.S. Application Data continuation of application No. 14/081,899, filed on Nov. 15, 2013, now Pat. No. 9,631,930.

(60) Provisional application No. 61/875,753, filed on Sep. 10, 2013, provisional application No. 61/832,928, filed on Jun. 9, 2013, provisional application No. 61/832,853, filed on Jun. 8, 2013, provisional application No. 61/800,908, filed on Mar. 15, 2013.

(51) Int. Cl.
  *G06N 20/00* (2019.01)
  *G01C 21/34* (2006.01)
  *G01C 21/36* (2006.01)

(52) U.S. Cl.
  CPC ....... *G01C 21/362* (2013.01); *G01C 21/3617* (2013.01); *G06N 5/04* (2013.01); *G06N 20/00* (2019.01)

(58) Field of Classification Search
  USPC ........................................................ 701/465
  See application file for complete search history.

(56) References Cited

U.S. PATENT DOCUMENTS

| | | |
|---|---|---|
| 4,914,605 A | 4/1990 | Loughmiller et al. |
| 5,289,572 A | 2/1994 | Yano et al. |
| 5,459,667 A | 10/1995 | Odagaki et al. |
| 5,654,892 A | 8/1997 | Fujii et al. |
| 6,101,443 A | 8/2000 | Kato et al. |
| 6,321,158 B1 | 11/2001 | Delorme et al. |
| 6,321,161 B1 | 11/2001 | Herbst et al. |
| 6,322,538 B1 | 11/2001 | Elbert et al. |
| 6,480,783 B1 | 11/2002 | Myr |
| 6,615,130 B2 | 9/2003 | Myr |
| 6,653,948 B1 | 11/2003 | Kunimatsu et al. |
| 6,710,774 B1 | 3/2004 | Kawasaki et al. |
| 6,764,518 B2 | 7/2004 | Godin |
| 6,847,889 B2 | 1/2005 | Park et al. |
| 6,862,524 B1 | 3/2005 | Nagda et al. |
| 6,960,233 B1 | 11/2005 | Berg et al. |
| 7,149,625 B2 | 12/2006 | Mathews et al. |
| 7,158,878 B2 | 1/2007 | Rasmussen et al. |
| 7,200,394 B2 | 4/2007 | Aoki et al. |
| 7,254,580 B1 | 8/2007 | Gharachorloo et al. |
| 7,274,311 B1 | 9/2007 | MacLeod |
| 7,469,827 B2 | 12/2008 | Katragadda et al. |
| 7,552,009 B2 | 6/2009 | Nelson |
| 7,555,525 B2 | 6/2009 | Malik |
| 7,555,725 B2 | 6/2009 | Abramson et al. |
| 7,634,463 B1 | 12/2009 | Katragadda et al. |
| 7,702,456 B2 | 4/2010 | Singh |
| 7,708,684 B2 | 5/2010 | Demarais et al. |
| 7,729,854 B2 | 6/2010 | Muramatsu |
| 7,846,174 B2 | 12/2010 | Baker et al. |
| 7,860,645 B2 | 12/2010 | Kim et al. |
| 7,885,761 B2 | 2/2011 | Tajima et al. |
| 7,917,288 B2 | 3/2011 | Cheung et al. |
| 7,925,427 B2 | 4/2011 | Zehler |
| 8,020,104 B2 | 9/2011 | Robarts et al. |
| 8,078,397 B1 | 12/2011 | Zilka |
| 8,100,931 B2 | 1/2012 | Baker et al. |
| 8,190,326 B2 | 5/2012 | Nezu et al. |
| 8,205,157 B2 | 6/2012 | Van et al. |
| 8,255,830 B2 | 8/2012 | Ording et al. |
| 8,355,862 B2 | 1/2013 | Matas et al. |
| 8,370,736 B2 | 2/2013 | Ording et al. |
| 8,428,871 B1 | 4/2013 | Matthews et al. |
| 8,509,816 B2 | 8/2013 | Branch et al. |
| 8,510,665 B2 | 8/2013 | Ording et al. |
| 8,529,431 B2 | 9/2013 | Baker et al. |
| 8,564,544 B2 | 10/2013 | Jobs et al. |
| 8,584,050 B2 | 11/2013 | Ording et al. |
| 8,606,516 B2 | 12/2013 | Vertelney et al. |
| 8,607,167 B2 | 12/2013 | Matas et al. |
| 8,639,654 B2 | 1/2014 | Vervaet et al. |
| 8,694,791 B1 | 4/2014 | Rohrweck et al. |
| 8,745,018 B1 | 6/2014 | Singleton et al. |
| 8,756,534 B2 | 6/2014 | Ording et al. |
| 8,762,048 B2 | 6/2014 | Kosseifi et al. |
| 8,781,716 B1 | 7/2014 | Wenneman et al. |
| 8,798,918 B2 | 8/2014 | Onishi et al. |
| 8,825,362 B2 | 9/2014 | Kirsch |
| 8,825,381 B2 | 9/2014 | Tang |
| 8,849,564 B2 | 9/2014 | Mutoh |
| 8,881,060 B2 | 11/2014 | Ohaudhri et al. |
| 8,881,061 B2 | 11/2014 | Ohaudhri et al. |
| 8,918,736 B2 | 12/2014 | Jobs et al. |
| 8,954,524 B1 | 2/2015 | Hamon |
| 9,043,150 B2 | 5/2015 | Forstall et al. |
| 9,170,122 B2 | 10/2015 | Moore et al. |
| 9,223,494 B1 | 12/2015 | Desalvo et al. |
| 9,326,058 B2 | 4/2016 | Tachibana et al. |
| 9,347,787 B2 | 5/2016 | Moore et al. |
| 9,500,492 B2 | 11/2016 | Moore et al. |
| 9,574,894 B1 | 2/2017 | Karakotsios et al. |
| 2001/0056325 A1 | 12/2001 | Pu et al. |
| 2003/0040808 A1 | 2/2003 | Stack et al. |
| 2003/0093117 A1 | 5/2003 | Saadat |
| 2003/0156097 A1 | 8/2003 | Kakihara et al. |
| 2004/0009815 A1 | 1/2004 | Zotto et al. |
| 2004/0070602 A1 | 4/2004 | Kobuya et al. |
| 2004/0092892 A1 | 5/2004 | Kagan et al. |
| 2004/0128066 A1 | 7/2004 | Kudo et al. |
| 2004/0138761 A1 | 7/2004 | Stack et al. |
| 2004/0143342 A1 | 7/2004 | Stack et al. |
| 2004/0158395 A1 | 8/2004 | Yamada et al. |
| 2004/0160342 A1 | 8/2004 | Curley et al. |
| 2004/0172141 A1 | 9/2004 | Stack et al. |
| 2004/0193371 A1 | 9/2004 | Koshiji et al. |
| 2004/0220682 A1 | 11/2004 | Levine et al. |
| 2004/0236498 A1 | 11/2004 | Le et al. |
| 2005/0096673 A1 | 5/2005 | Stack et al. |
| 2005/0096750 A1 | 5/2005 | Kagan et al. |
| 2005/0125148 A1 | 6/2005 | Van et al. |
| 2005/0131631 A1 | 6/2005 | Nakano et al. |
| 2005/0149261 A9 | 7/2005 | Lee et al. |
| 2005/0177181 A1 | 8/2005 | Kagan et al. |
| 2005/0192629 A1 | 9/2005 | Saadat et al. |
| 2005/0247320 A1 | 11/2005 | Stack et al. |
| 2005/0251324 A1 | 11/2005 | Wiener et al. |
| 2005/0273251 A1 | 12/2005 | Nix et al. |
| 2005/0273252 A1 | 12/2005 | Nix et al. |
| 2006/0004680 A1 | 1/2006 | Robarts et al. |
| 2006/0015246 A1 | 1/2006 | Hui |
| 2006/0025925 A1 | 2/2006 | Fushiki et al. |
| 2006/0041372 A1 | 2/2006 | Kubota et al. |
| 2006/0074553 A1 | 4/2006 | Foo et al. |
| 2006/0155375 A1 | 7/2006 | Kagan et al. |
| 2006/0155431 A1 | 7/2006 | Berg et al. |
| 2006/0156209 A1 | 7/2006 | Matsuura et al. |
| 2006/0161440 A1 | 7/2006 | Nakayama et al. |
| 2006/0173841 A1 | 8/2006 | Bill |
| 2006/0179277 A1 | 8/2006 | Flachs et al. |

(56) References Cited

U.S. PATENT DOCUMENTS

| | | |
|---|---|---|
| 2006/0195257 A1 | 8/2006 | Nakamura |
| 2006/0206063 A1 | 9/2006 | Kagan et al. |
| 2006/0252983 A1 | 11/2006 | Lembo et al. |
| 2006/0264982 A1 | 11/2006 | Viola et al. |
| 2006/0271287 A1 | 11/2006 | Gold et al. |
| 2006/0287818 A1 | 12/2006 | Okude et al. |
| 2007/0016362 A1 | 1/2007 | Nelson |
| 2007/0021914 A1 | 1/2007 | Song |
| 2007/0060932 A1 | 3/2007 | Stack et al. |
| 2007/0135990 A1 | 6/2007 | Seymour et al. |
| 2007/0140187 A1 | 6/2007 | Rokusek et al. |
| 2007/0166396 A1 | 7/2007 | Badylak et al. |
| 2007/0185374 A1 | 8/2007 | Kick et al. |
| 2007/0185938 A1 | 8/2007 | Prahlad et al. |
| 2007/0185939 A1 | 8/2007 | Prahland et al. |
| 2007/0208429 A1 | 9/2007 | Leahy |
| 2007/0208498 A1 | 9/2007 | Barker et al. |
| 2007/0233162 A1 | 10/2007 | Gannoe et al. |
| 2007/0276596 A1 | 11/2007 | Solomon et al. |
| 2007/0276911 A1 | 11/2007 | Bhumkar et al. |
| 2007/0293716 A1 | 12/2007 | Baker et al. |
| 2007/0293958 A1 | 12/2007 | Stehle et al. |
| 2008/0015523 A1 | 1/2008 | Baker |
| 2008/0208356 A1 | 8/2008 | Stack et al. |
| 2008/0208450 A1 | 8/2008 | Katzer |
| 2008/0228030 A1 | 9/2008 | Godin |
| 2008/0228393 A1 | 9/2008 | Geelen et al. |
| 2008/0238941 A1 | 10/2008 | Kinnan et al. |
| 2008/0255678 A1 | 10/2008 | Cully et al. |
| 2008/0319653 A1 | 12/2008 | Moshfeghi |
| 2009/0005981 A1 | 1/2009 | Forstall et al. |
| 2009/0010405 A1 | 1/2009 | Toebes |
| 2009/0012553 A1 | 1/2009 | Swain et al. |
| 2009/0016504 A1 | 1/2009 | Mantell et al. |
| 2009/0037093 A1 | 2/2009 | Kurihara et al. |
| 2009/0063041 A1 | 3/2009 | Hirose et al. |
| 2009/0063048 A1 | 3/2009 | Tsuji |
| 2009/0100037 A1 | 4/2009 | Scheibe |
| 2009/0143977 A1 | 6/2009 | Beletski et al. |
| 2009/0157294 A1 | 6/2009 | Geelen et al. |
| 2009/0157615 A1 | 6/2009 | Ross et al. |
| 2009/0164110 A1 | 6/2009 | Basir |
| 2009/0177215 A1 | 7/2009 | Stack et al. |
| 2009/0182497 A1 | 7/2009 | Hagiwara |
| 2009/0192702 A1 | 7/2009 | Bourne et al. |
| 2009/0216434 A1 | 8/2009 | Panganiban et al. |
| 2009/0240427 A1 | 9/2009 | Siereveld et al. |
| 2009/0254273 A1 | 10/2009 | Gill et al. |
| 2009/0284476 A1 | 11/2009 | Bull et al. |
| 2009/0326803 A1 | 12/2009 | Neef et al. |
| 2010/0010738 A1 | 1/2010 | Cho |
| 2010/0045704 A1 | 2/2010 | Kim |
| 2010/0067631 A1 | 3/2010 | Ton et al. |
| 2010/0070253 A1 | 3/2010 | Hirata et al. |
| 2010/0088631 A1 | 4/2010 | Schiller |
| 2010/0100310 A1 | 4/2010 | Eich et al. |
| 2010/0153010 A1 | 6/2010 | Huang |
| 2010/0174790 A1 | 7/2010 | Dubs et al. |
| 2010/0179750 A1 | 7/2010 | Gum |
| 2010/0185382 A1 | 7/2010 | Barker et al. |
| 2010/0186244 A1 | 7/2010 | Schwindt |
| 2010/0204914 A1 | 8/2010 | Gad et al. |
| 2010/0220250 A1 | 9/2010 | Vanderwall et al. |
| 2010/0248746 A1* | 9/2010 | Saavedra ............ G01C 21/3407 455/456.3 |
| 2010/0287024 A1 | 11/2010 | Ward et al. |
| 2010/0293462 A1 | 11/2010 | Bull et al. |
| 2010/0309147 A1 | 12/2010 | Fleizach et al. |
| 2010/0309149 A1 | 12/2010 | Blumenberg et al. |
| 2010/0312466 A1 | 12/2010 | Katzer et al. |
| 2010/0324816 A1 | 12/2010 | Highstrom et al. |
| 2010/0328100 A1 | 12/2010 | Fujiwara et al. |
| 2011/0022305 A1 | 1/2011 | Okamoto |
| 2011/0029237 A1 | 2/2011 | Kamalski |
| 2011/0039584 A1 | 2/2011 | Merrett |
| 2011/0077850 A1 | 3/2011 | Ushida |
| 2011/0082620 A1 | 4/2011 | Small et al. |
| 2011/0082627 A1 | 4/2011 | Small et al. |
| 2011/0098918 A1 | 4/2011 | Siliski et al. |
| 2011/0106592 A1 | 5/2011 | Stehle et al. |
| 2011/0112750 A1 | 5/2011 | Lukassen |
| 2011/0137834 A1 | 6/2011 | Ide et al. |
| 2011/0143726 A1 | 6/2011 | De Silva |
| 2011/0145863 A1 | 6/2011 | Alsina et al. |
| 2011/0153186 A1 | 6/2011 | Jakobson |
| 2011/0161001 A1 | 6/2011 | Fink |
| 2011/0167058 A1 | 7/2011 | Van Os |
| 2011/0170682 A1 | 7/2011 | Kale et al. |
| 2011/0183627 A1 | 7/2011 | Ueda et al. |
| 2011/0185390 A1 | 7/2011 | Faenger et al. |
| 2011/0191516 A1 | 8/2011 | Xiong et al. |
| 2011/0194028 A1 | 8/2011 | Dove et al. |
| 2011/0210922 A1 | 9/2011 | Griffin |
| 2011/0213785 A1 | 9/2011 | Kristiansson et al. |
| 2011/0227843 A1 | 9/2011 | Wang |
| 2011/0230178 A1 | 9/2011 | Jones et al. |
| 2011/0238289 A1 | 9/2011 | Lehmann et al. |
| 2011/0238297 A1 | 9/2011 | Severson |
| 2011/0246891 A1 | 10/2011 | Schubert et al. |
| 2011/0264234 A1 | 10/2011 | Baker et al. |
| 2011/0265003 A1 | 10/2011 | Schubert et al. |
| 2011/0270517 A1 | 11/2011 | Benedetti |
| 2011/0282576 A1 | 11/2011 | Cabral et al. |
| 2011/0285717 A1 | 11/2011 | Schmidt et al. |
| 2011/0291860 A1 | 12/2011 | Ozaki et al. |
| 2011/0291863 A1 | 12/2011 | Ozaki et al. |
| 2011/0298724 A1 | 12/2011 | Ameling et al. |
| 2011/0307455 A1 | 12/2011 | Gupta et al. |
| 2012/0016554 A1 | 1/2012 | Huang |
| 2012/0035924 A1 | 2/2012 | Jitkoff et al. |
| 2012/0041674 A1 | 2/2012 | Katzer |
| 2012/0059812 A1 | 3/2012 | Bliss et al. |
| 2012/0065814 A1 | 3/2012 | Seok |
| 2012/0095675 A1 | 4/2012 | Tom et al. |
| 2012/0143503 A1 | 6/2012 | Hirai et al. |
| 2012/0143504 A1 | 6/2012 | Kalai et al. |
| 2012/0155800 A1 | 6/2012 | Cottrell et al. |
| 2012/0179361 A1 | 7/2012 | Mineta et al. |
| 2012/0179365 A1 | 7/2012 | Miyahara et al. |
| 2012/0191343 A1 | 7/2012 | Haleem |
| 2012/0208559 A1 | 8/2012 | Svendsen et al. |
| 2012/0253659 A1 | 10/2012 | Pu et al. |
| 2012/0254804 A1 | 10/2012 | Sheha et al. |
| 2012/0260188 A1 | 10/2012 | Park et al. |
| 2012/0265433 A1* | 10/2012 | Viola ............... G01C 21/362 701/410 |
| 2012/0303263 A1 | 11/2012 | Alam et al. |
| 2012/0303268 A1 | 11/2012 | Su et al. |
| 2012/0310882 A1 | 12/2012 | Werner et al. |
| 2012/0322458 A1 | 12/2012 | Shklarski et al. |
| 2012/0329520 A1 | 12/2012 | Akama |
| 2013/0006520 A1 | 1/2013 | Dhanani et al. |
| 2013/0035853 A1 | 2/2013 | Stout et al. |
| 2013/0110343 A1 | 5/2013 | Ichikawa et al. |
| 2013/0110842 A1 | 5/2013 | Donneau-Golencer et al. |
| 2013/0130742 A1* | 5/2013 | Dietz ............... H04W 4/027 455/556.1 |
| 2013/0158855 A1 | 6/2013 | Weir et al. |
| 2013/0166096 A1 | 6/2013 | Jotanovic |
| 2013/0190978 A1 | 7/2013 | Kato et al. |
| 2013/0191020 A1 | 7/2013 | Emani et al. |
| 2013/0191790 A1 | 7/2013 | Kawalkar |
| 2013/0238241 A1 | 9/2013 | Chelotti et al. |
| 2013/0275899 A1 | 10/2013 | Schubert et al. |
| 2013/0321178 A1 | 12/2013 | Jameel et al. |
| 2013/0322665 A1 | 12/2013 | Bennett et al. |
| 2013/0325332 A1 | 12/2013 | Rhee et al. |
| 2013/0325856 A1 | 12/2013 | Soto et al. |
| 2013/0326384 A1 | 12/2013 | Moore et al. |
| 2013/0345961 A1 | 12/2013 | Leader et al. |
| 2013/0345975 A1 | 12/2013 | Vulcano et al. |
| 2014/0093100 A1 | 4/2014 | Jeong et al. |
| 2014/0095066 A1 | 4/2014 | Bouillet et al. |
| 2014/0122605 A1 | 5/2014 | Merom et al. |

(56) References Cited

U.S. PATENT DOCUMENTS

| | | |
|---|---|---|
| 2014/0123062 A1 | 5/2014 | Nguyen |
| 2014/0137219 A1 | 5/2014 | Castro et al. |
| 2014/0156262 A1 | 6/2014 | Yuen et al. |
| 2014/0277937 A1 | 9/2014 | Scholz et al. |
| 2014/0278051 A1 | 9/2014 | Mcgavran et al. |
| 2014/0278070 A1 | 9/2014 | Mcgavran et al. |
| 2014/0279723 A1 | 9/2014 | Mcgavran et al. |
| 2014/0281955 A1 | 9/2014 | Sprenger |
| 2014/0309914 A1 | 10/2014 | Scofield et al. |
| 2014/0317086 A1 | 10/2014 | James |
| 2014/0344420 A1 | 11/2014 | Rjeili et al. |
| 2014/0358437 A1 | 12/2014 | Fletcher |
| 2014/0358438 A1 | 12/2014 | Cerny et al. |
| 2014/0364149 A1 | 12/2014 | Marti et al. |
| 2014/0364150 A1 | 12/2014 | Marti et al. |
| 2014/0365113 A1 | 12/2014 | Mcgavran et al. |
| 2014/0365120 A1 | 12/2014 | Vulcano et al. |
| 2014/0365124 A1 | 12/2014 | Vulcano et al. |
| 2014/0365125 A1 | 12/2014 | Vulcano et al. |
| 2014/0365126 A1 | 12/2014 | Vulcano et al. |
| 2014/0365459 A1 | 12/2014 | Clark et al. |
| 2014/0365505 A1 | 12/2014 | Clark et al. |
| 2015/0032366 A1 | 1/2015 | Man et al. |
| 2015/0066360 A1 | 3/2015 | Kirsch |
| 2015/0139407 A1 | 5/2015 | Maguire et al. |
| 2015/0161267 A1 | 6/2015 | Sugawara et al. |
| 2015/0177017 A1 | 6/2015 | Jones |
| 2015/0282230 A1 | 10/2015 | Kim |
| 2015/0334171 A1 | 11/2015 | Baalu et al. |
| 2016/0212229 A1 | 7/2016 | Mcgavran et al. |
| 2017/0132713 A1 | 5/2017 | Bowne et al. |
| 2017/0176208 A1 | 6/2017 | Chung et al. |
| 2017/0205243 A1 | 7/2017 | Moore et al. |
| 2017/0205246 A1 | 7/2017 | Koenig et al. |
| 2017/0350703 A1 | 12/2017 | Mcgavran et al. |
| 2017/0358033 A1 | 12/2017 | Montoya et al. |
| 2019/0025070 A1 | 1/2019 | Moore et al. |
| 2019/0063940 A1 | 2/2019 | Moore et al. |

FOREIGN PATENT DOCUMENTS

| | | |
|---|---|---|
| CN | 1754147 A | 3/2006 |
| CN | 1815438 A | 8/2006 |
| CN | 1900657 A | 1/2007 |
| CN | 101438133 A | 5/2009 |
| CN | 101517362 A | 8/2009 |
| CN | 101641568 A | 2/2010 |
| CN | 201555592 U | 8/2010 |
| CN | 102398600 A | 4/2012 |
| CN | 102567440 A | 7/2012 |
| CN | 102607570 A | 7/2012 |
| CN | 102781728 A | 11/2012 |
| CN | 102840866 A | 12/2012 |
| DE | 112013002794 T5 | 4/2015 |
| EP | 1063494 A1 | 12/2000 |
| EP | 1102037 A1 | 5/2001 |
| EP | 1944724 A1 | 7/2008 |
| EP | 1995564 A1 | 11/2008 |
| EP | 2355467 A2 | 8/2011 |
| EP | 2369299 A1 | 9/2011 |
| EP | 2479538 A2 | 7/2012 |
| EP | 2546104 A1 | 1/2013 |
| EP | 2546104 B1 * | 1/2013 |
| EP | 2617604 A1 | 7/2013 |
| EP | 2672225 A2 | 12/2013 |
| EP | 2672226 A2 | 12/2013 |
| EP | 2698968 A1 | 2/2014 |
| EP | 2778614 A1 | 9/2014 |
| EP | 2778615 A2 | 9/2014 |
| EP | 2946172 A1 | 11/2015 |
| EP | 2712152 B1 | 9/2016 |
| EP | 3101392 A1 | 12/2016 |
| JP | 2003-207340 A | 7/2003 |
| JP | 2005-198345 A | 7/2005 |
| JP | 3957062 B2 | 8/2007 |
| JP | 2010-261803 A | 11/2010 |
| TW | 200811422 A | 3/2008 |
| TW | 200949281 A | 12/2009 |
| TW | 201017110 A | 5/2010 |
| TW | M389063 U | 9/2010 |
| TW | 201202079 A | 1/2012 |
| TW | 201216667 A | 4/2012 |
| WO | 2005/015425 A1 | 2/2005 |
| WO | 2005/094257 A2 | 10/2005 |
| WO | 2008/079891 A2 | 7/2008 |
| WO | 2008/101048 A2 | 8/2008 |
| WO | 2009/073806 A2 | 6/2009 |
| WO | 2009/143876 A1 | 12/2009 |
| WO | 2010/040405 A1 | 4/2010 |
| WO | 2011/076989 A1 | 6/2011 |
| WO | 2011/146141 A1 | 11/2011 |
| WO | 2012/034581 A1 | 3/2012 |
| WO | 2012/036279 A1 | 3/2012 |
| WO | 2012/141294 A1 | 10/2012 |
| WO | 2013/184348 A2 | 12/2013 |
| WO | 2013/184444 A2 | 12/2013 |
| WO | 2013/184449 A2 | 12/2013 |
| WO | 2014/145127 A2 | 9/2014 |
| WO | 2014/145134 A1 | 9/2014 |
| WO | 2014/145145 A2 | 9/2014 |
| WO | 2014/151151 A1 | 9/2014 |
| WO | 2014/151152 A2 | 9/2014 |
| WO | 2014/151153 A2 | 9/2014 |
| WO | 2014/151155 A1 | 9/2014 |
| WO | 2014/197115 A2 | 12/2014 |
| WO | 2014/197155 A1 | 12/2014 |

OTHER PUBLICATIONS

A blind navigation system using RFID for indoor environments Chumkamon, S.; Tuvaphanthaphiphat, P.; Keeratiwintakom, P. Electrical Engineering/Electronics, Computer, Telecommunications and Information Technology, 2008. ECTI-CON 2008. 5th International Conference on Year: 2008, vol. 2 pp. 765-768, DOI: 10.1109/ECTICON.2008.4600543.

Archibald, Christopher, et al., "Human Motion Prediction for Indoor Mobile Relay Networks," 2011 IEEE International Conference on High Performance Computing and Communications, Sep. 2-4, 2011, pp. 989-994, IEEE, Banff, Canada.

Author Unknown, "Android 2.3.4 User's Guide", May 20, 2011, pp. 1-384, Google, Inc.

Author Unknown, "Blaupunkt chooses NNG navigation software for new aftermarket product," May 24, 2011, 2 pages, available at http://telematicsnews.info/2011/05/24/blaupunktchooses-nnq-naviqation-software-for-new-aftermarket-product_my224_1_/.

Author Unknown, "Garmin. nuvi 1100/1200/1300/1400 series owner's manual," Jan. 2011, 72 pages, Garmin Corporation, No. 68, Jangshu 2nd Road, Sijhih, Taipei County, Taiwan.

Author Unknown, "Google Maps Voice Navigation in Singapore," software2tech, Jul. 20, 2011, 1 page, available at http://www.youtube.com/watch?v=7B9JN7BkvME.

Author Unknown, "Hands-on with Sony Mirroriink head units," Jan. 13, 2012, 1 page, uudethuong, available at http://www.youtube.com/watch?v=UMkF478_Ax0.

Author Unknown, "Introducing Mimics—Control your iPhone from a Touch Screen," May 13, 2011, 3 pages, mp3Car.com, available at http://www.youtube.com/watch?v=YcggnNVTNwl.

Author Unknown, "iPhone Integration on Mercedes Head Unit," Dec. 3, 2011, 1 page, Motuslab, available at http://www.youtube.com/watch?v=rXy6IpQAtDo.

Author Unknown, "Magellan (Registered) Road Mate (Registered) GPS Receiver: 9020/9055 user Manual," Month Unknown, 2010, 48 pages, MiTAC International Corporation, CA, USA.

Author Unknown, "Magellan (Registered) Road Mate (Registered): 2010 North America Application User Manual," Month Unknown, 2009, 24 pages, MiTAC Digital Corporation, CA, USA.

Author Unknown, "Magellan Maestro 3100 User Manual," Month Unknown 2007, 4 pages, Magellan Navigation, Inc., San Dimas, USA.

(56) References Cited

OTHER PUBLICATIONS

Author Unknown, "Mazda: Navigation System—Owner's Manual", available at http://download.tomtom.com/open/manuals/mazda/nva-sd8110/Full_Manual_EN.pdf, Jan. 1, 2009, 159 pages.

Author Unknown, "Touch & Go' Owner's Manual," Jul. 2011, 218 pages, TOYOTA, United Kingdom.

Chumkamon, Sakmongkon, et al., "A Blind Navigation System Using RFID for Indoor Environments," Proceedings of ECTI-CON 2008, May 14-17, 2008, pp. 765-768, IEEE, Krabi, Thailand.

Diewald, Stefan, et al., "Mobile Device Integration and Interaction in the Automotive Domain", Autonui:Automotive Natural User Interfaces Workshop at the 3rd International Conference on Automotive User Interfaces and Interactive Vehicular Applications (AutomotiveUI '11), Nov. 29-Dec. 2, 2011, 4 pages, XP002732023, Salzburg,Austria.

Dube, Ryan, "Use Google Maps Navigation For Turn-By-Turn GPS [Android]", available at http://www.makeuseof.com/tag/google-maps-navigation-tumbytum-gps-android/, Jun. 24, 2010, 7 Pages.

Human Motion Prediction for Indoor Mobile Relay Networks Archibald, C.; Ying Zhang; Juan Liu High Performance Computing and Communications (HPCC), 2011 IEEE 13th International Conference on Year: 2011 pp. 989-994, DOI: 10.1109/HPCC.2011.145 Referenced in: IEEE Conference Publications.

Lawrence, Steve, "Review: Sygic Mobile Maps 2009," Jul. 23, 2009, 4 pages, available at http://www.iphonewzealand.co.nz/2009/all/review-sygic-mobile-maps-2009/.

Moren ("Google unveils free turn-by-turn directions for Android devices," Macworld, http://www.macworld.eom/article/1143547/android_turnbyturn.htmll7/8/2016 9:58:56 AM], Oct. 28, 2009).

Prabhala, Bhaskar, et al., "Next Place Predictions Based on User Mobility Traces," INFOCOM 2015 Student Workshop, Month Unknown, 2015, pp. 93-94, IEEE.

Ridhawi, I. Al, et al., "A Location-Aware User Tracking and Prediction System," 2009 Global Information Infrastructure Symposium, Jun. 23-26, 2009, pp. 1-8, IEEE, Hammamet, Tunisia.

Ruhs, Chris, "My Favorite Android Apps: Maps," Jun. 24, 2011,1 page, available at http://www.youtube.com/watch?v=v2aRkLkLT3s.

Blandford Rafe, "Nokia's terminal Mode (car integration) progressing", www.allaboutsymbian.com, Jul. 15, 2021 (2-10-07-15) 1-10 pages.

Feng, Tao, et al. "Continuous mobile authentication using touch-screen gestures." 2012 IEEE conference on technologies for homeland security (HST). IEEE, 2012. (Year: 2012).

* cited by examiner

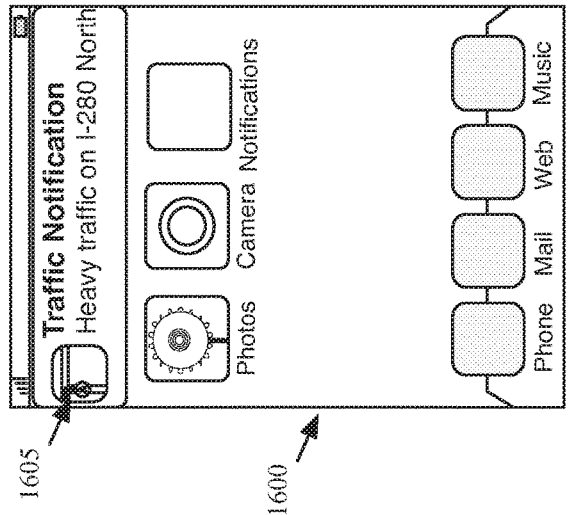
FIG. 16
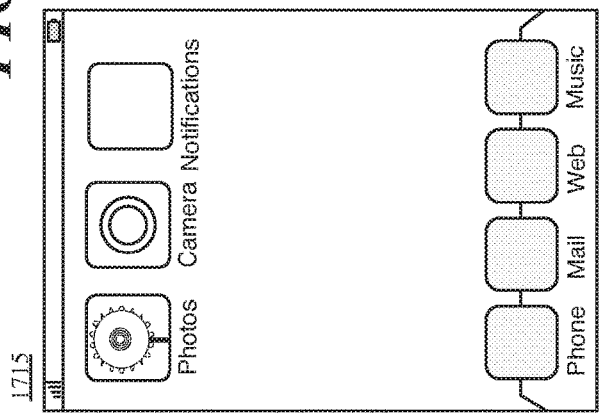
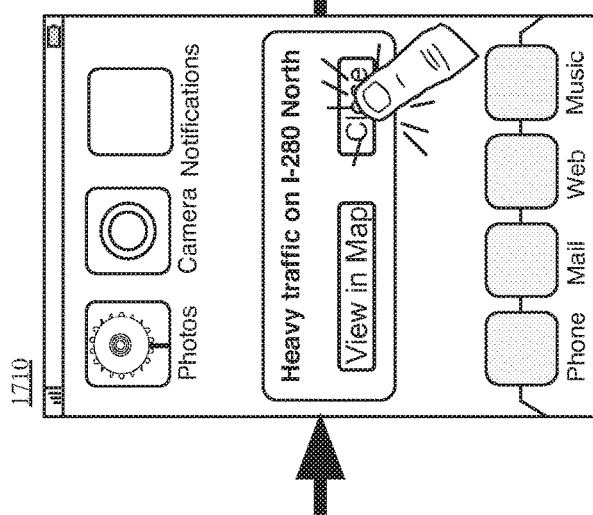
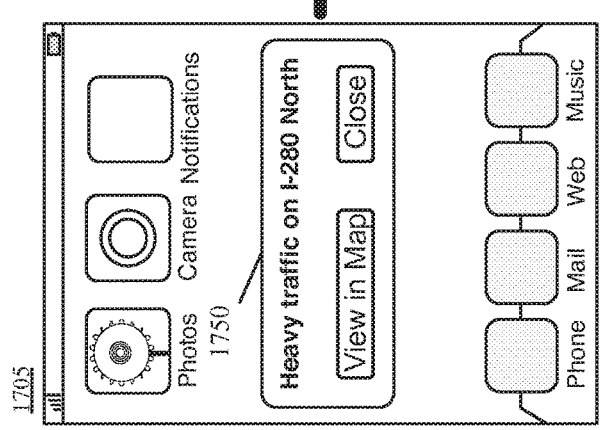
FIG. 17

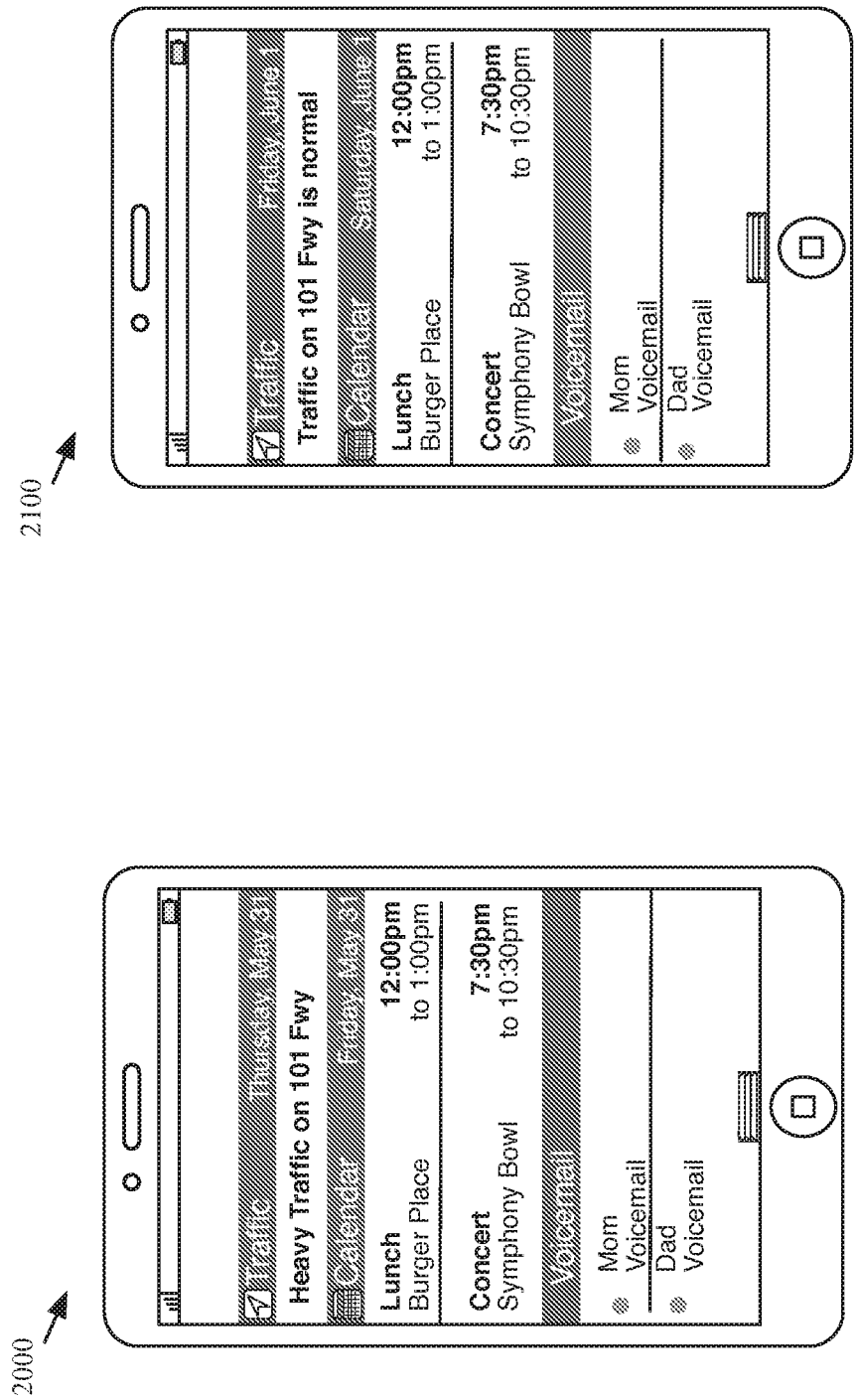

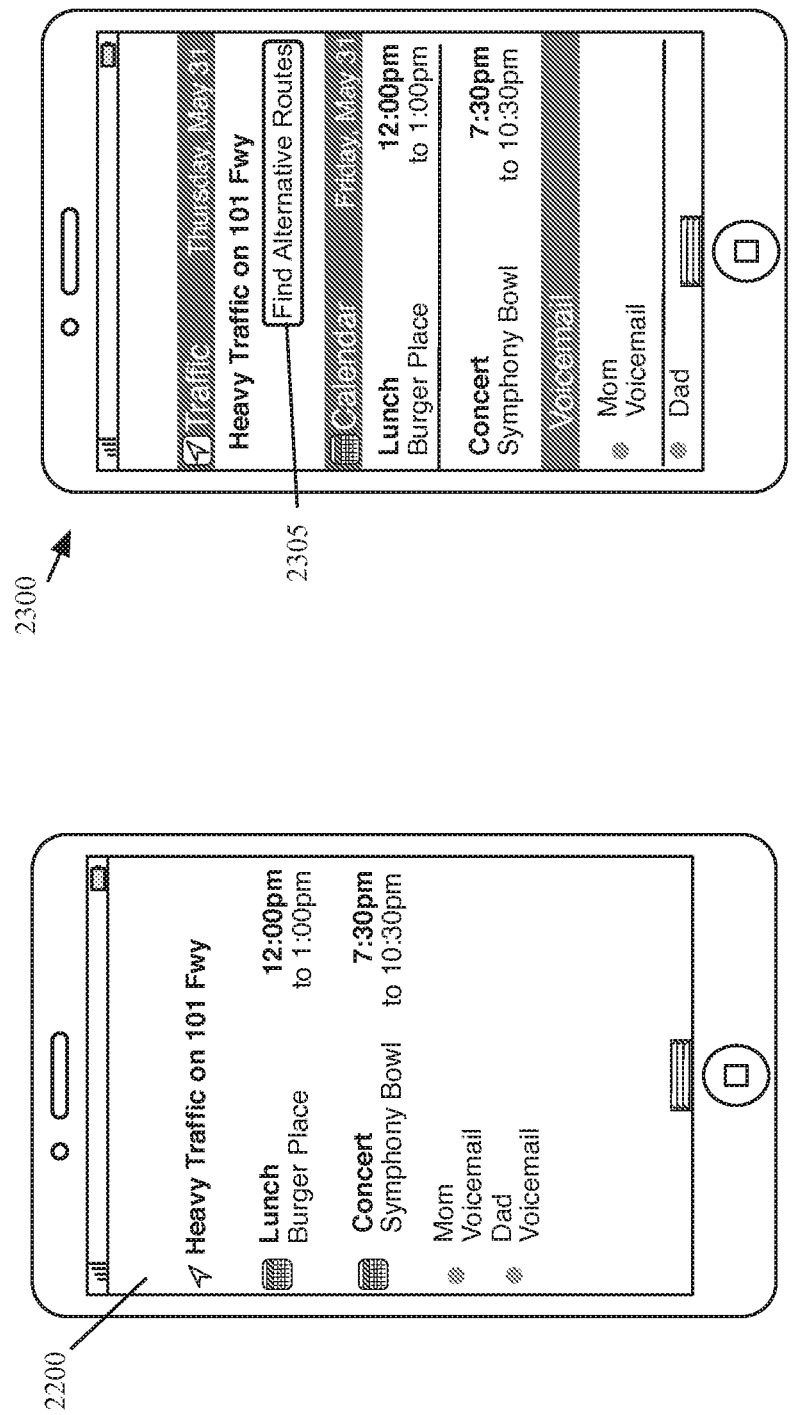

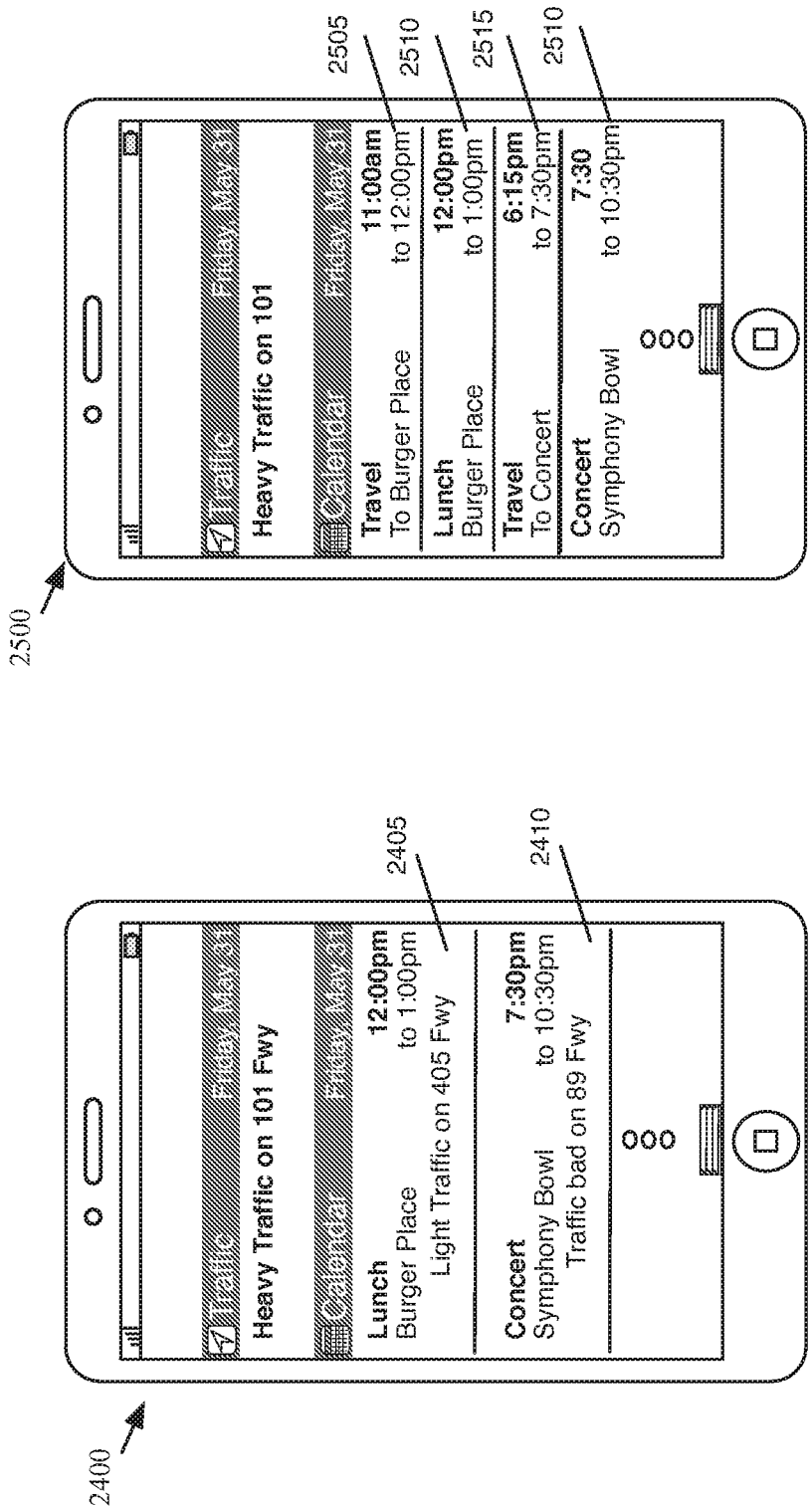

WARNING FOR FREQUENTLY TRAVELED TRIPS BASED ON TRAFFIC

INCORPORATION BY REFERENCE; DISCLAIMER

Each of the following applications are hereby incorporated by reference: application Ser. No. 15/494,163 filed on Apr. 21, 2017; application Ser. No. 14/081,899 filed Nov. 15, 2013; application 61/800,908 filed on Mar. 15, 2013; application 61/832,853 filed on Jun. 8, 2013; application 61/832,928 filed on Jun. 9, 2013; application 61/875,753 filed on Sep. 10, 2013. The Applicant hereby rescinds any disclaimer of claim scope in the parent application(s) or the prosecution history thereof and advises the USPTO that the claims in this application may be broader than any claim in the parent application(s).

BACKGROUND

Mobile devices are moving towards having access to larger amounts and varying types of personalized information, either stored on the device itself or accessible to the device over a network (e.g., in the cloud). This enables the users of such devices to store and subsequently access this information about their lives. To the users of mobile devices, this information may include their personal calendar (i.e., stored in a calendar application), their e-mail, mapping information (e.g., user-entered locations, user-requested routes, etc.).

However, at the moment, these devices require users to specifically request information in order for the devices to present the information. For instance, if a user wants a route to a particular destination, the user must enter information into the mobile device (e.g., via a touchscreen, voice input, etc.) requesting the route. Given the amount of data accessible to a mobile device, a device that leverages this data in order to predict the information needed by a user would be useful.

BRIEF SUMMARY

Some embodiments of the invention provide a novel prediction engine that (1) can formulate predictions about current or future destinations and/or routes to such destinations for a user, and (2) can relay information to the user about these predictions. In some embodiments, this engine includes a machine-learning engine that facilitates the formulation of predicted future destinations and/or future routes to destinations based on stored, user-specific data.

The user-specific data is different in different embodiments. In some embodiments, the stored, user-specific data includes data about any combination of the following: (1) previous destinations traveled to by the user, (2) previous routes taken by the user, (3) locations of calendared events in the user's calendar, (4) locations of events for which the user has electronic tickets, and (5) addresses parsed from recent e-mails and/or messages sent to the user. In some embodiments, the prediction engine only relies on user-specific data stored on the device on which this engine executes. Alternatively, in other embodiments, it relies only on user-specific data stored outside of the device by external devices/servers. In still other embodiments, the prediction engine relies on user-specific data stored both by the device and by other devices/servers.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIGS. 16, 17, and 18 illustrate examples of traffic banners while the device's screen is unlocked.

FIGS. 19-23 illustrate four different ways that the notification manager in different embodiments provides traffic data in a notification center.

FIGS. 24 and 25 illustrate embodiments in which the notification manager of the device uses traffic and route data to identify and display the travel times for appointments specified the a calendar application that executes on the device.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a novel prediction engine that (1) can formulate predictions about current or future destinations and/or routes to such destinations for a user, and (2) can relay information to the user about these predictions. In some embodiments, this engine includes a machine-learning engine that facilitates the formulation of predicted future destinations and/or future routes to destinations based on stored, user-specific data.

The user-specific data is different in different embodiments. In some embodiments, the stored, user-specific data includes data about any combination of the following: (1) previous destinations traveled to by the user, (2) previous routes taken by the user, (3) locations of calendared events in the user's calendar, (4) locations of events for which the user has electronic tickets, and (5) addresses parsed from recent e-mails and/or messages sent to the user. In some embodiments, the prediction engine only relies on user-specific data stored on the device on which this engine executes. Alternatively, in other embodiments, it relies only on user-specific data stored outside of the device by external devices/servers. In still other embodiments, the prediction engine relies on user-specific data stored both by the device and by other devices/servers.

Figure 1:
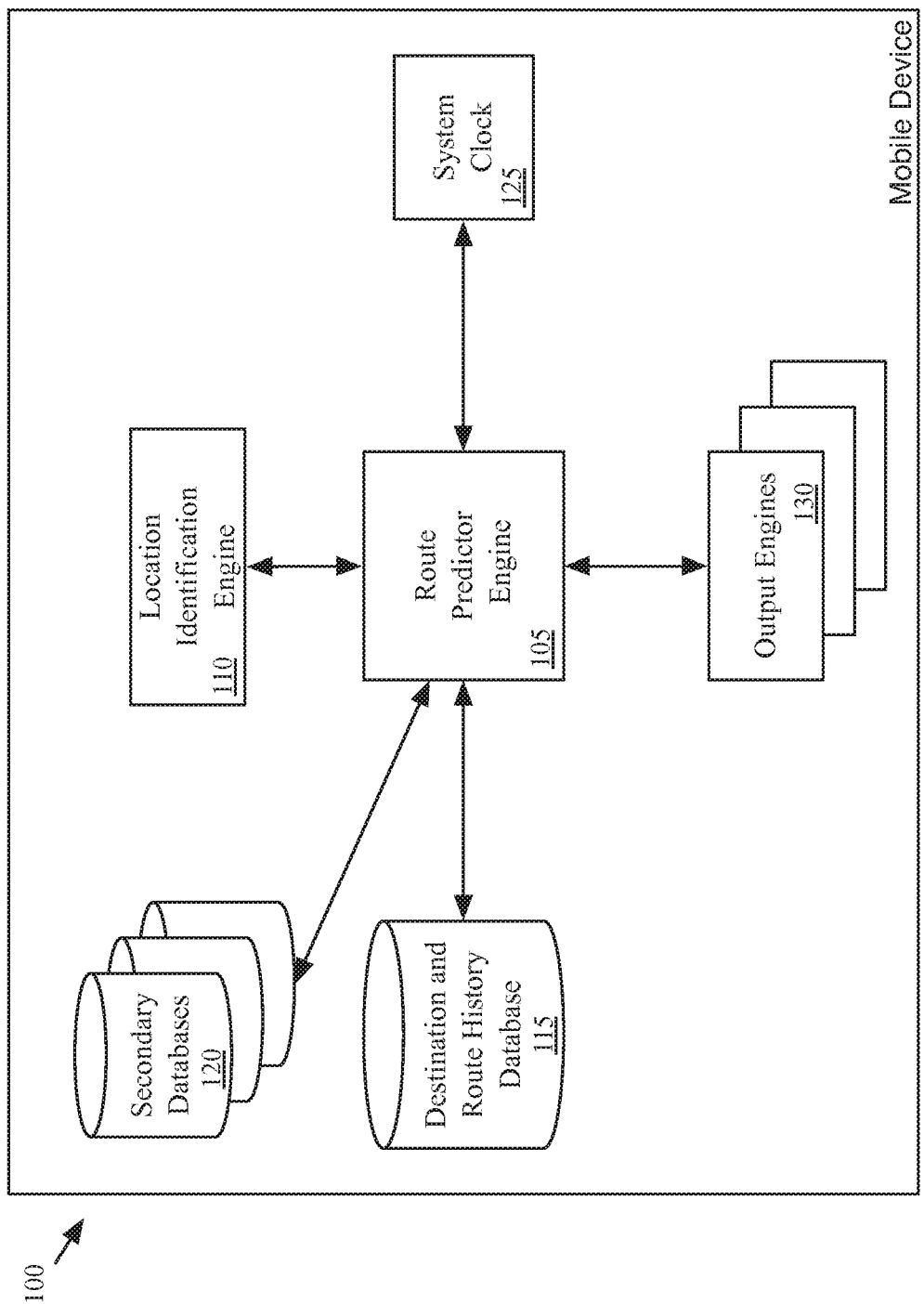
FIG. 1 illustrates an example of a mobile device with a novel prediction engine.

FIG. 1 illustrates an example of a mobile device 100 with such a novel prediction engine 105. In some embodiments, the mobile device is a smartphone or a tablet computer with location identification, mapping and routing services. In addition to the prediction engine 105, the device 100 includes a location identification engine 110, a destination and route history data storage (e.g., database) 115, a number of secondary data storages (e.g., databases) 120, a system clock 125 and a number of output engines 130.

In some embodiments, the prediction engine 105 periodically performs automated processes that formulate predictions about current or future destinations of the device and/or formulate routes to such destinations for the device, e.g., based on the information stored in the databases 115 and 120. Alternatively, or conjunctively, the prediction engine 105 in some embodiments performs automated processes in response to user demand or another module's demand in order to formulate predictions about current or future destinations of the device and/or mutes to such destinations. Based on these formulations, this engine then directs other modules of the device to relay relevant information to the user.

In different embodiments, the prediction engine 105 performs its automated processes with different frequencies. For instance, to identify possible patterns of travel, it runs these processes once a day in some embodiments, several times a day in other embodiments, several times an hour in yet other embodiments, and several times a minute in still other embodiments. Some of these embodiments modify the frequency of this process running based on whether the device has a full or relatively full battery charge, and/or whether the device is currently plugged into a power source and is being charged. In other words, these embodiments run the prediction processes more frequently when the device is fully or nearly fully charged, and/or is being charged. In addition, some embodiments allow the user of the device to configure how often or how aggressively the prediction engine should perform its automated processes. Also, in some embodiments, the user of the device can direct the prediction engine to perform its automated processes, as mentioned above.

The system clock 125 specifies the time and date at any given moment, while the location identification engine 110 specifies the current location of the device. Different embodiments use different location identification engines. In some embodiments, this engine includes a global positioning system (GPS) engine that uses GPS data to identify the current location of the user. In some of these embodiments, this engine augments the GPS data with other terrestrial tracking data, such as triangulated cellular tower data, triangulated radio tower data, and correlations to known access points (e.g., cell-ID. Wi-Fi ID/network ID), in order to improve the accuracy of the identified location. In addition, some embodiments use one or more of the types of terrestrial tracking data without GPS data.

Based on the location of the device and the time and date information, the prediction engine 105 determines when it should perform its processes, and/or what destinations and routes to predict. To formulate the predicted destinations and/or predicted routes, the prediction engine also uses previous location data that it retrieves from the destination and route history database 115 and other secondary databases 120.

In some embodiments, the destination and route history data storage 115 stores previous destinations that the device recorded for previous routes taken by the device. Also, this data storage in some embodiments stores location and motion histories regarding the routes taken by the device, including identification of locations at which user travel ended. Alternatively. or conjunctively, this storage stores in some embodiments other route data (e.g., routes that are each specified in terms of a set of travel directions). The secondary data storages 120 store additional locations that the prediction engine 105 can use to augment the set of possible destinations for the device. Examples of such additional locations include addresses extracted from recent electronic messages (e.g., e-mails or text messages), locations of calendared events, locations of future events for which the device has stored electronic tickets, etc.

In some embodiments, the prediction engine 105 formulates its prediction of future destinations and/or future routes to destinations based on the destination, location, and/or motion histories that it retrieves from the destination and route history data storage 115 and the secondary data storages 120. In some embodiments, the prediction engine 105 uses an external routing engine outside of the device (e.g., a routing engine of a mapping service communicatively coupled to the device through a wireless network) to generate routes based on information that the prediction engine puts together for the routes. In other embodiments, the prediction engine itself generates the mutes or uses a routing engine that executes on the device.

Once the prediction engine 105 has one or more specified predicted routes, it supplies its set of predicted mutes and/or metadata information about these routes to one or more output engines 130. The output engines 130 then relay one or more relevant pieces of information to the user of the device based on the data supplied by the prediction engine 105. Examples of such output include: (1) displaying potential routes on a map, (2) dynamically updating potential routes on the map, (3) dynamically sorting and updating suggestions of possible destinations as candidates for search or as destination for possible route, (4) dynamically providing updates to potential routes in the notification center that a user may manually access. (5) providing automatic prompts regarding current or future routes, (6) adjusting travel times and/or reminders for calendared events, etc.

Several such output presentations will be described in Section II. However, before describing these different uses for the output of the prediction engine, several more detailed embodiments of the prediction architecture will be described below in Section I.

I. Route Prediction

Figure 2:
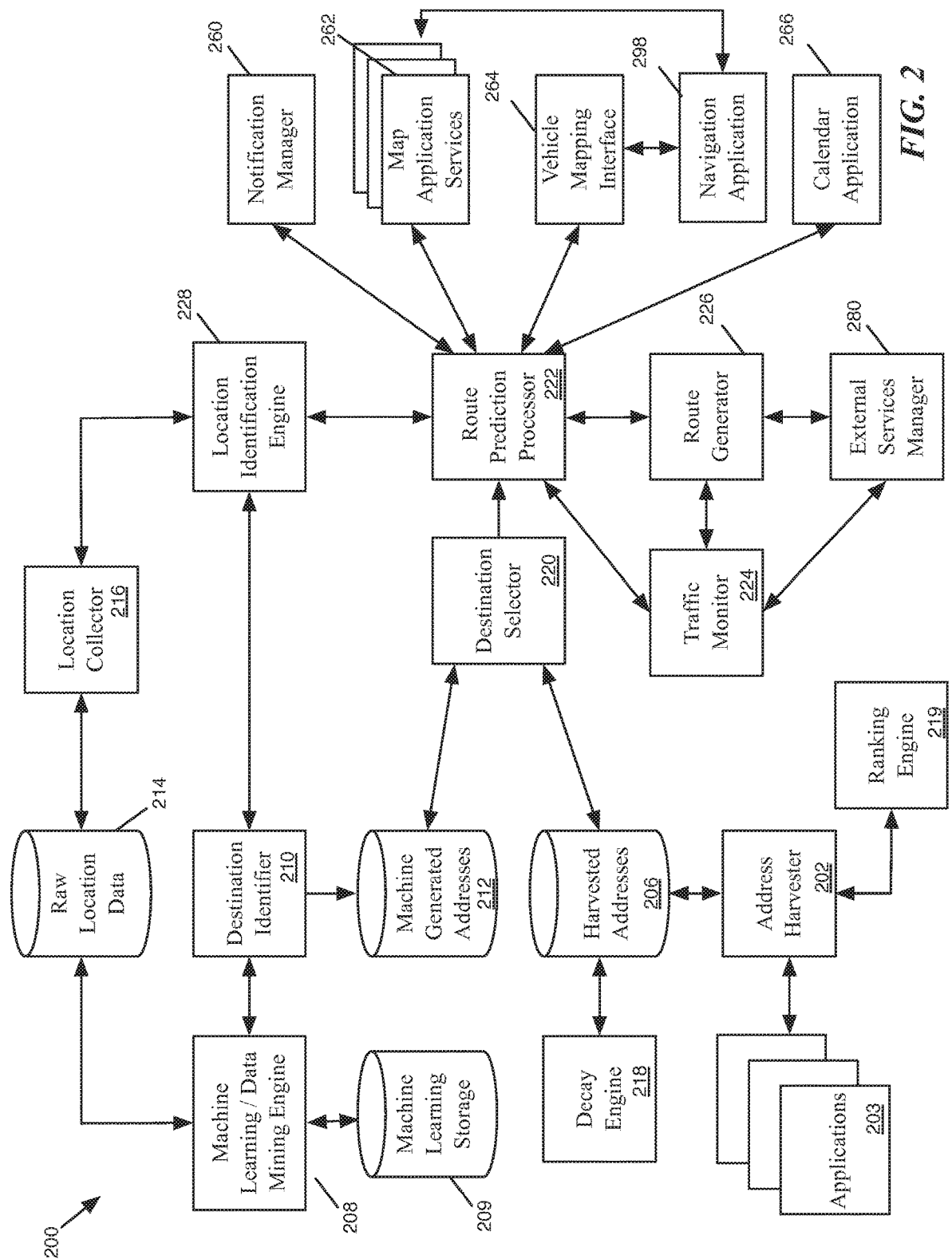
FIG. 2 illustrates a prediction architecture of a computing device of some embodiments of the invention.

FIG. 2 illustrates a prediction architecture of a computing device 200 of some embodiments of the invention. The computing device 200 can be a computer (e.g., desktop or laptop), a mobile device (e.g., smartphone, tablet), or any other computing device. In some embodiments, the device has location identification, mapping and routing services.

The prediction architecture of FIG. 2 formulates routes and information about these routes based on locations (e.g., machine-generated locations) that track a user's historical destinations, and based on highly ranked addresses harvested from the user's calendar events, calendar invites, electronic tickets, etc. Some embodiments additionally formulate routes and information about these routes based on highly ranked addresses harvested from the user's telecom messages (e.g., e-mails, text messages, etc.). This architecture then supplies the formulated mutes and/or associated information to a notification manager 260, one or more map application services 262, a vehicle UI interface 264, and a calendar application 266.

As shown in FIG. 2, the architecture includes an address harvester 202, a set of applications 203, a harvested address data storage 206, a ranking engine 219, a decay engine 218, a location collector 216, a raw location data storage (e.g., a database) 214, a machine-learning/data-mining engine 208, a machine learning data storage (e.g., a database) 209, a destination identifier 210, a machine-generated addresses data storage (e.g., a database) 212, a destination selector 220, a mute prediction processor 222, a traffic monitor 224, a mute generation engine 226, and a location identification engine 228. This architecture has other modules and/or services (e.g., system clock, etc.) that are not shown.

The address harvester 202 harvests addresses and stores these address in the harvested address data storage 206. The harvester 202 captures addresses differently in different embodiments. For instance, in some embodiments, the harvester 202 receives telecom messages (e.g., email messages, text messages, etc.) from one or more applications 203 (e.g., email applications, text messaging applications, etc.), analyzes these messages, extracts any physical addresses that it finds in these messages, and stores the extracted addresses in the harvested addresses data storage 206. The applications 203 in some embodiments supply telecom messages that they receive to the harvester 202, in other embodiments supply the telecom messages that they send to the harvester 202, and in still other embodiments supply both the sent and received telecom messages to the harvester 202.

In addition to such addresses, the harvester 202 also stores addresses that it parses or receives for events specified by scheduling applications. Specifically, from scheduling applications (e.g., a calendar application, an electronic ticketing application, etc.), the harvester 202 in some embodiments directly receives physical addresses to harvest. For example, when locations are specified for calendared appointments or within calendar invites, the calendar application of some embodiments provides (1) such locations to the address harvester 202 for storing in the harvested address storage 206, along with (2) the times associated with the calendar appointment or invite. Such times can be used later to inform when the location of the calendared appointment should be treated as an important, high ranking location that is likely to be a predicted destination. Similarly, when the electronic ticketing application of some embodiments has tickets for an event at a particular location, it supplies this location to the address harvester 202 for storing in the harvested address storage 206, along with the time for the event.

In storing these harvested addresses in the harvested address storage 206, the address harvester 202 uses the ranking engine 219 to compute ranking scores for some or all of the harvested addresses, in order to differentiate the different harvested addresses for the route predictions. These scores are decayed by the decay engine 218 over time to further differentiate newer addresses from older addresses.

More specifically, each time the address harvester 202 creates a new record for a newly harvested address, or updates a previously created record for a previously received address upon receiving that address again, the address harvester 202 uses the ranking engine 219 to compute a new score or an updated ranking score for the address record. In some embodiments, the ranking score for an address is based on a variety of factors. Different factors are used to compute the ranking score in different embodiments. One factor is the identity of the application 203 that provided the content for harvesting to the harvester 202. Certain applications (e.g., messaging applications) result in a higher ranking score for their harvested addresses than other applications (e.g., email applications).

For addresses harvested from telecom messages, another factor that affects the ranking score in some embodiments is the identity of the person who sent the message being harvested. For instance, addresses harvested from telecom messages from individuals in the device's address book or list of favorites are ranked higher than addresses harvested from messages from individuals not in the address books or list of favorites. Another factor in some embodiments is whether the message (e.g., email) that is being harvested has been viewed. If so, the address that is harvested from this message (e.g., this email) will have a higher ranking than the address that is harvested from a message (e.g., another email) that has not been viewed. Also, an address for a location that a user has viewed in a map (that, for instance, is presented by a mapping application or is presented in another application) or a location that the user has specifically added to the map is also ranked highly in some embodiments.

In some embodiments, the ranking engine 219 highly ranks addresses that are specified as locations of scheduled events (e.g., calendared events or events for which the device stores electronic tickets). This high rank will make it more likely that the physical address will be used to provide useful predictions to a user for such addresses, e.g., used to provide predicted routes, provide relevant traffic information, provide prioritized list of addresses, etc. Once the event passes, some embodiments reduce the ranking score of such a physical address or remove it altogether from the address storage.

The decay engine 218 continuously or periodically reviews the ranking scores of some or all of the harvested addresses in the harvested address storage 206. Whenever necessary, it reduces the ranking score of a harvested address in the database 206. In some embodiments, the decay engine reduces the ranking score of a harvested address each time that it reviews this address' record(s). In some embodiments, the decay engine 218 applies a linear decay function to the ranking scores of some or all of the harvested addresses. In some embodiments, the decay engine 218 does not adjust the ranking score of some of the harvested addresses. The harvesting of addresses, their ranking and decaying scores are further described in filed U.S. Provisional Patent Application 61/832,850, on Jun. 8, 2013, and in concurrently filed U.S. Non-Provisional application Ser. No. 14/081,843, now published as U.S. Patent Publication No. 2014/0365459. This concurrently filed U.S. Non-Provisional Patent Application and the U.S. Provisional Patent Application 61/832, 850 are incorporated herein by reference.

In addition to the harvested addresses in the harvested address storage 206, the prediction architecture of FIG. 2 also relies on machine-generated addresses in the machine-generated address data storage 212. The destination identifier 210 generates and stores these machine-generated addresses in the storage 212 by using the machine-learning/data-mining engine 208, which analyzes raw location data in the raw location data storage 214. The raw location data is the user's (e.g., the device's) past location data in some embodiments.

For example, when the device 200 is a mobile device, the location collector 216 of some embodiments receives raw location data from the location identification engine 228, and stores this location data in the raw data storage 214. In some embodiments, the location data stored in the raw data storage 214 is latitude and longitude coordinates for the device at various times. In some embodiments, the location data also includes other data, such as uncertainty of location, type of location, and/or confidence of location, where confidence in some of these embodiments expresses the probability that the estimate falls into the provided uncertainty interval.

In order to conserve the device's battery life, the location identification engine 228 of some embodiments employs several power conservation techniques. For instance, instead of always defining location data in terms of global positioning system (GPS) positions, the location identification engine of some embodiments often relies on lower power consuming location services that derive location data from WiFi and/or cell tower information.

Also, as further described below, the raw storage in some embodiments stores "leached" locations. A leached location is a location that the location collector 216 "leaches" when another service requests such a location (e.g., when a social media application executing on the device requests such a location) from the location identification engine. More specifically, in some embodiments, the location identification engine 228 employs the device's GPS module to identify location data only when the device is being charged. Some embodiments also allow the location collector 216 to "leach off" data (e.g., GPS location data, WiFi location data) from the location identification engine 228 when the location identification engine needs to provide location data (e.g., GPS data, WiFi data, etc.) for another application executing on the device. Such "leaching" collection of location data is accepted because in some embodiments the application that is asking for the location data is an application that the user has enabled for collecting such data, and hence has the user's tacit approval for running services that might drain the user's battery. In some embodiments, the location collector 216 also receives GPS data that the location identification engine 228 periodically (e.g., every 30, 45, 60 minutes) captures in order to facilitate navigation functionality of the device.

In conjunction with or instead of the above-described collection techniques, the location collector 216 of some embodiments uses other techniques to collect location data. For instance, this collector directs the location identification engine 228 to capture location data (e.g., GPS data, WiFi data, etc.) when the device is fully or nearly fully charged. Also, at the behest of the machine-learning engine 208 or some other module, the location collector 216 in some embodiments may increase its frequency of location data collection over time when too few locations have been captured to perform machine learning operations, as further described below.

In some embodiments, other devices of the user provide some or all of the raw location data in the raw location data storage 214. This is especially helpful for devices that are not mobile, as they would not gather such data on their own. Even for mobile devices, sharing of raw location data is helpful in that it allows a device to have a richer collection of data. However, due to privacy concerns, some embodiments do not allow the sharing of raw data (and/or other location, destination, motion and/or route related data) between devices of a user. Also, for privacy concerns, raw location data is not kept on a device for more than a pre-specified number of days. Alternatively, raw location data from multiple devices is used on a device to specify candidate destination regions for the device, but such raw location data is only maintained for a short duration of time in order to specify the candidate destination regions.

Periodically or at the request of the destination identifier 210, the machine-learning/data-mining engine 208 in some embodiments analyzes the raw location data in the data storage 214 to identify regions of interests (e.g., specific addresses, city blocks, city neighborhoods, cities, specific or arbitrary geometric shapes about a location, etc.) at which the user (e.g., the device) was located for more than a threshold time period (e.g., more than 30 minutes or 45 minutes). As further described below, the engine 208 provides its regions of interests (also called regions, or zones of locations) to the destination identifier 210 so that it can identify machine-generated physical addresses based on these regions.

For each region, the machine-learning/data mining engine 208 of some embodiments identifies a start time for entering the region and an end time for leaving the region. As these regions are identified over several days of raw data, the machine-learning engine 208 computes the start and end times for a region based on the statistical averages over the sample of raw data that collectively define the region. Various machine-learning engines can be used to perform such a task. In general, machine-learning engines can formulate a solution to a problem expressed in terms of a set of known input variables and a set of unknown output variables by taking previously solved problems (expressed in terms of known input and output variables) and extrapolating values for the unknown output variables of the current problem. In this instance, the machine-learning engine 208 analyzes the raw data to identify clusters of locations that should be treated as regions. To do this analysis, the machine-learning engine 208 stores in the machine-learning data storage 209 analysis, statistical and historical data regarding the different clusters of locations and different locations within each cluster that it identifies. Over a span of a number of days, the machine-learning engine 208 gradually improves this data and its analysis, and thereby improves the quality of the regions that it provides to the destination identifier.

In some embodiments, the machine learning engine 208 factors frequency and time information for the raw locations. That is, each raw location is associated with a time of day and day of the week, and the machine-learning engine 208 identifies the frequency with which the same or similar data is accumulated over similar times and similar days. The use of frequency and time data makes it more likely that the regions that are identified by the engine 208 represent route destinations for a set of days and particular times on those days.

At certain periodic intervals (e.g., once every N hours), upon occurrence of certain events (e.g., receiving a new location for a scheduled event), or based on user demand (e.g., through the opening of a notification display area), the destination identifier 210 of some embodiments directs the machine-learning engine 208 to provide it with one or more regions. For each region that the destination identifier 210 receives from the machine-learning engine 208, the identifier 210 performs a reverse geocoding operation, or asks (directly or through the location identifier 228) a map service of a server connected to the device to perform this reverse geocoding operation. The reverse geocoding operation provides one specific physical address or physical location for a region that represents multiple physical locations.

In the machine-generated address data storage 212, the identifier 210 of some embodiments stores (in the machine generated address storage 212) each region that it receives from the engine 208 as the physical address or location received by the reverse geocoder plus one or more geometric attributes (e.g., one or more radii) that specify the region about the physical address or location. The process for generating machine-generated addresses is further described in (1) U.S. Provisional Patent Application 61/832,741, entitled "Predictive User Assistance" filed Jun. 7, 2013, with the (2) U.S. Non-Provisional patent application Ser. No. 14/020,689, and (3) U.S. Non-Provisional patent application Ser. No. 14/022,099, U.S. Provisional Patent Application 61/832,741 and U.S. Non-Provisional patent application Ser. No. 14/020,689 and 14/022,099 are incorporated herein by reference.

One of ordinary skill will realize that other embodiments might specify the regions differently. For instance, in other embodiments, the reverse geocoding operation is initiated by the engine 208, which then provides each region to the identifier 210 in terms of physical address or location and one or more geometric attributes (e.g., one or more radii) that specify the region about the physical address or location. Also, in other embodiments, the engine 208 or identifier 210 may not use a physical address/location plus a set geometric attributes to specify each region but instead specifies each region through other descriptive formats.

In the machine generated address storage 212, the identifier 210 stores the regions that it receives from the engine 208 as potential destinations for the device. Also, for each particular region that it stores, the identifier 212 of some embodiments stores one or more regions that are associated destination regions for the particular regions for particular times of days. In other words, the endpoint of any route taken by the device can be specified as a region in some embodiments when the duration of stay at that endpoint is sufficiently long. Given that over time, a device will take many trips from points within one common region to points within another common region at particular times of day, the machine learning engine of some embodiments uses machine learning processes to identify associations between regions for certain time periods on certain days. For instance, the machine learning engine can specify one or more transitions from one region to one or more other regions. In some embodiments, each transition has a certain probability for certain times in the day.

The machine learning engine 208 provides these transitions to the destination identifier 210, which in turn stores these transitions (i.e., these associations between the regions) along with the regions in the machine generated address storage 212. In some embodiments, the machine generated address storage 212 can identify regions corresponding to locations provided by other modules (e.g., the destination selector 220), while in other embodiments these other modules or the address storage 212 identify regions for particular locations by examining the machine learning storage 209 (either directly or indirectly through the destination identifier or the machine learning engine). Also, in some embodiments, the storages 209 and 212 are part of one single storage.

For each particular region or each destination (e.g., physical address) derived from a region, the machine generated address storage 212 of some embodiments stores one or more destination regions that are associated destination for routes that start at the particular region at different time intervals, as mentioned above. In some of these embodiments, the machine generated address storage 212 stores for each associated region a ranking score that can be used to select a smaller subset of destination regions when multiple viable candidates exist. In some embodiments, the ranking score for a destination region is based on the frequency of travel (in general or for a given time period) to the region and/or based on the time of time. In some of these embodiments, the ranking score is a probability score. In some embodiments, the ranking score is the frequency of travel (in general or in a given time period) from the particular region to the destination region. The frequency of travel can be viewed as an affinity score between the two regions in some embodiments.

In some embodiments, the destination selector 220 is a destination predictor that generates a set of predicted destinations for a particular time period based on the addresses stored in the machine-generated address data storage 212 and/or the harvested address data storage 206, as well as the device's current location. For example, for a particular time period, the destination selector 220 in some embodiments selects one or more addresses that the destination identifier 210 specified and stored for that time period based on the current location of the device. To do this, the destination selector of some embodiments queries the machine generated address storage 212 to determine whether it contains a region that includes the current location, and if so, whether it contains one or more associated destination regions for the region that includes the current location for the particular time, a time interval that includes the particular time, or a time interval shortly thereafter. If the address storage contains a region for the current location and one or more destination regions for the current region for the particular time, time period, or time period shortly thereafter, it then supplies the set of associated regions along with their ranking score or affinity score that expresses their association with the current region. When presented with multiple potential destination regions and/or their addresses, the destination selector can filter out some of the potential destinations that have lower ranking or affinity scores.

In other embodiments, the destination selector simply provides the address storage 212 with the current address. The address storage 212 in some of these embodiments then determines (directly, or indirectly through the destination identifier and/or machine learning engine) whether the machine learning storage 209 has a region for the current location. If address storage 212 can identify a machine generated region for the current location from the storage 209, the address storage 212 determines whether it has any region associated with the current location's region for the particular time period. If so, it returns the address of any associated region that it identifies to the destination selector 212. In other embodiments, the destination selector interacts directly with the machine learning storage 209 to identify the region for the current location, and then interacts with the address storage 212 to determine whether this storage has destination regions or addresses for the identified current region.

In addition to these addresses, the destination selector 220 in some embodiments selects harvested addresses from the harvested address storage 206 based on rankings of these addresses, which factors various criteria as further described below. In some embodiments, the destination selector 220 only selects the highest ranking harvested addresses as the data storage 206 may contain numerous addresses. Also, in some embodiments, the destination selector 220 selects different sets of ranked harvested addresses for different predictions that the route prediction processor 222 performs for different applications 260, 262, 264, and 266.

In some embodiments, the destination selector 220 performs its destination prediction in real-time based on a user's demand or another module's demand, or at regular intervals (e.g., once every 30 minutes, 60 minutes, 90 minutes, 2 hours, 4 hours, 6 hours, 8 hours, 12 hours, 24 hours, etc.) for a particular time period. The route prediction processor 222 directs the destination selector in some of these embodiments to perform its prediction operations on demand or at regular intervals for particular time periods.

In some embodiments, the destination selector 220 does not update a particular time period's list of predicted destinations. In other embodiments, the destination selector updates a particular time period's list of predicted destinations when one or more events occur. One such event is the harvested address data storage 206 receiving a new location for a new or existing appointment. Also, the prediction processor 222 in some embodiments directs the destination selector to update its predicted destination list when it detects that the device is moving in a vehicle, so that it can update the prediction for the user as the user passes certain points along the road. To do this, the prediction processor 222 in some embodiments passes the device's current location from the location identification engine 228 to the destination selector 220, so that the selector can factor the current location in picking the predicted destinations. Some embodiments do not perform this real time prediction updates unless the device is well charged, it is being charged, and/or the user has opted into performing such real-time updates.

In some embodiments, the destination selector retrieves from the machine-generated address storage 212 and the harvested address storage 206 a set of addresses related to the current location of the device. For instance, the destination selector 220 might retrieve predicted addresses before each time that it, or the route prediction processor 222, predicts that the user might make a trip (or a set of subsequent trips). Some embodiments retrieve predicted addresses each morning before the user leaves for work, in order to start the route prediction process that leads to the user automatically receiving traffic and/or route data in the morning before traveling to work.

Also, as mentioned above, the destination selector 220 performs its destination prediction based on a user's demand or another module's demand. For instance, as further described below, the device in some embodiments provides a notification center with a notification display area to display various notifications, including predicted destinations and/or traffic to predicted destinations. In some of these embodiments, each time a user opens the notification display area, the destination selector 220 is directed to provide one or more predicted destinations based on the current location of the device.

When the current location of the device falls within a particular region that is one of the stored destination regions (e.g., in the machine generated address storage 212), the destination selector 220 selects for the device one or more predicted destination regions from the current location in terms of the probability of transitioning from the particular region that contains the current location to each of the predicted destination regions. In other words, the destination selector performs an "in-state" probability analysis (where "in-state" refers to the device being in a region that is one of the machined-generated destination regions for the device) that (1) for each potential destination region, expresses a conditional probability for transitioning from the device's current region to the potential destination region, and (2) selects one or more potential destination regions for the current in-state region of the device based on the expressed conditional probabilities. In some embodiments, the machine-generated address storage 212 stores the conditional probabilities. For instance, in some of these embodiments, the machine-generates address storage 212 stores different conditional probabilities for the same transition (i.e., the transition between two regions) at different time intervals. In other embodiments, the machine-generated address storage 212 does not store the conditional probabilities, but instead stores region parameters (e.g., attributes, such as ingress and egress transition times and statistics) that the destination selector 220 uses to compute the conditional probabilities.

When the current location of the device does not fall within a particular region that is one of the stored destination regions (e.g., in the machine generated address storage 212), the destination selector 220 selects for the device one or more predicted destination regions from the current location in terms of the probability of transitioning into each of the predicted destination regions. In other words, the destination selector performs an "out-of-state" probability analysis (where "out-of-state" refers to the device currently being in a location that is not one of the machined-generated destination regions for the device) that (1) for each potential destination region, expresses a probability for transitioning into the potential destination region, and (2) selects one or more potential destination regions for the current out-of-state region of the device based on the expressed probabilities. In some embodiments, these probabilities are not conditioned on the device's current location, or are conditioned on the device's current location but are expressed as weaker conditional probabilities than the conditional probabilities used during the in-state analysis. In some embodiments, the machine-generated address storage 212 stores the probabilities used during the out-of-state analysis. For instance, in some of these embodiments, the machine-generates address storage 212 stores different probabilities for transition into a region at different time intervals. In other embodiments, the machine-generated address storage 212 stores parameters (e.g., attributes, such as ingress transition times and statistics) that the destination selector 220 uses to compute the probabilities for transitioning into a region.

Some embodiments perform the in-state and out-of-state analysis differently. For instance, in some embodiments, destination selector performs an "in-state" probability analysis when device is currently between two regions that are stored in the address storage 212, so long as the current device location is along a path that the device typically takes between the two regions or is along a common path between the two regions. To determine whether the path is a typical path taken by the device, some embodiments store positional data (e.g., intermediate positional data as described below) for the transitions between two regions. To determine whether a path is a common path between two regions, different embodiments assess the "commonness" of the path differently. For instance, some embodiments determine if the path is along a route that is returned by a routing service as the route between the two regions. When the device is between two stored regions but it is not along a typical or common path, the destination selector of some embodiments performs an "out-of-state" analysis as described above.

The destination selector 220 of some embodiments sends the set of predicted destinations to the route prediction processor 222. This prediction processor (also called route predictor below) (1) works with other modules in the architecture to identify one or more routes and information about the generated route(s), and (2) provides the predicted destinations, identified route(s) and/or associated information to one or more applications 260, 262, 264, and 266. To identify the routes, the route prediction processor 222 uses the route generation engine 226.

In some embodiments, the route prediction processor 222 provides for each desired route two locations to the route generator. In some of these embodiments, one of these locations is an address in the predicted destination set, while the other location is the current location of the device. The prediction processor 222 obtains the current location from the location identifier 228 in some embodiments, the destination selector 220 in other embodiments, and from the machine generated addresses 212 in still other embodiments. Also, in some embodiments, neither of the two locations is the current location of the device in some cases. In some of these embodiments, the prediction processor predicts routes between expected pairs of future locations of the device in a particular time interval.

For any two locations it receives, the route generator 226 produces a best route. Different embodiments define the best route differently. The best route might be the route most often traveled by users, the shortest route, the fastest route, etc. In some embodiments, the default best route might be one type of route (e.g., shortest route), but the route generator 226 might produce another type of route (e.g., a longer route) based on current road conditions (e.g., based on traffic, accident data, road closure, etc.), or based on user explicit or implicit preferences.

In some embodiments, the route generator 226 is a routing engine that executes on the device 200 to produce the routes, while in other embodiments it uses a route generator on one or more servers connected to the device to generate the route. To communicate with the external routing engine, the route generator 226 uses an external map services manager 280, which through a network interface and a network (e.g., a wireless network) communicatively couples the device 200 and the external route server(s) and other servers (e.g., traffic servers, etc.).

As indicated, in some embodiments the locations between which the route generation engine 226 produces a route are physical addresses (e.g., harvested addresses or machine-generated addresses selected by the destination selector 220). In other embodiments, one or both of the addresses are received in terms of latitude and longitude coordinates. For instance, in some embodiments, the current location of the device 220 is received from the location identification engine 228 as a pair of latitude and longitude coordinates. Furthermore, some embodiments do not store the machine-generated addresses as physical addresses, but instead as latitude and longitude coordinates. In these cases, before generating a route, or before having any route be generated, for two locations, the route generator 226 in some embodiments first ties the two locations to the road network (or first ties to the road network the one location not already tied to the road network), because more specific physical addresses are needed by the mute generation processes of some embodiments in order to generate routes. In some embodiments, the latitude and longitude coordinates are provided to the external routing server, which ties them to the road network before generating the route.

The route generator 226 uses the traffic monitor 224 in some embodiments to determine traffic along any generated route. In some embodiments, the traffic monitor 224 is part of the route generator 226, and it deciphers traffic data (e.g., congestion data) that accompanies each generated route. In other embodiments, the prediction processor 222 uses the traffic monitor 224 to obtain separately traffic data for a route that it receives from the route generator 226. In still other embodiments, the traffic monitor 224 is a set of applications that executes on a set of servers that communicatively connects to the device 200, or executes on the device but obtains traffic data from a set of applications that executes on a set of servers that communicatively connects to the device 200. In some embodiments, some amount of traffic data accompanies each route (e.g., each route is provided with data that specifies whether the traffic is normal and if not, how much worse than the norm is the traffic), while other traffic data (e.g., data regarding accidents, road closures, etc.) has to be retrieved from the traffic monitor 224 by the route generator 226 and/or prediction processor 222.

As further described below, the destination selector 220 in some embodiments provides the prediction processor 222 not only with two end locations, but also with a group of intermediate locations in between the two end locations. This group of intermediate locations along with the two end locations forms a set of related locations for which the prediction processor 222 needs to generate a route. In the discussion below, intermediate locations are referred to as "breadcrumb" locations as they provide clues for the route generator 226 to identify routes.

In some embodiments, this set of breadcrumb and end locations are provided in terms of latitude and longitude locations. The prediction processor 222 provides each location set to the route generator 226, which then uses this set of locations to generate a more specific route for the user. Without this set, the route generator 226 of some embodiments generates the best route when it receives only two locations as described above. However, when the route generator 226 receives a set of locations, including intermediate locations, it can identify a more specific route that traverses through all or most of the locations in the set. To do this, the route generator 226 of some embodiments employs machine-learning processes, as further described below by reference to FIG. 3.

As shown in FIG. 2, the prediction processor 222 provides the predicted destinations, generated routes and/or information about the routes to one or more applications 260, 262, 264, and 266. For instance, in some embodiments, the prediction processor 222 notifies the notification manager 260 of the device 200. This manager 260 handles the notification services of the device. In some embodiments, the notification manager 260 generates and presents a notification center, which provides notification about calendared events, unread email and text messages, and other data for notifying a user. Also, in some embodiments, the notification manager generates and presents notification banners while the device screen is unlocked and locked. Accordingly, in some embodiments, the prediction processor 222 provides destination, route and traffic data to the notification manager 260, so that this manager can provide route and/or traffic data in the notification center or notification banners. Examples of such notifications will be further described below.

Also, in some embodiments, the prediction processor 222 provides the calendar application 266 travel times and updates to travel times for calendared events. In some embodiments, the calendar application 266 initially calls the prediction processor 222 to calculate travel times, and registers for updates thereafter based on the prediction architecture's monitoring of the user position and of the traffic. In some embodiments, calendared event travel times and updates to these times also appear in the notification center managed by the notification manager 260, and require interaction between the calendar application 266 and the notification manager 260, and/or between the prediction processor 222 and the notification manager 260. For interactions between the calendar application 266 and notification manager 260 on one hand, and the prediction processor 222 on the other hand, the prediction processor 222 provides APIs for such application to use to request computation and updates to its services (e.g., to request computation and updates of the travel times).

One or more mapping services 262 of a map application are also consumers of the predicted destinations, routes and/or associate route data supplied by the prediction processor 222. In some embodiments, some or all of the modules of the prediction architecture illustrated in FIG. 2 are part of the map application. In some embodiments, the mapping application services 262 uses the predicted destinations, routes and associated information that are supplied by the prediction processor 222 to present a user with easily selectable possible destinations for navigation.

Some embodiments present the predicted destinations, routes and/or associate route data to the user on a vehicle display screen when the device 200 is connected to the vehicle. For such cases, the vehicle UI interface 264 is used. As described below, the vehicle UI interface presents multiple predicted destinations and/or predicted mutes on a vehicle's interactive communication system. Also, as further described below, the selection of any predicted destination or predicted route in a presentation driven by the map application services 262 or the vehicle mapping interface 264 in some embodiments causes the navigation application 298 to generate a turn-by-turn navigation presentation for guiding the user from the device's current location to the predicted destination. The turn-by-turn navigation correlates the device's current position (as identified by the location engine (e.g., GPS engine) of the device) at multiple locations along the route to the navigate route that it presents so that it can provide real time maneuver instructions to guide the user to the destination.

Figure 3:
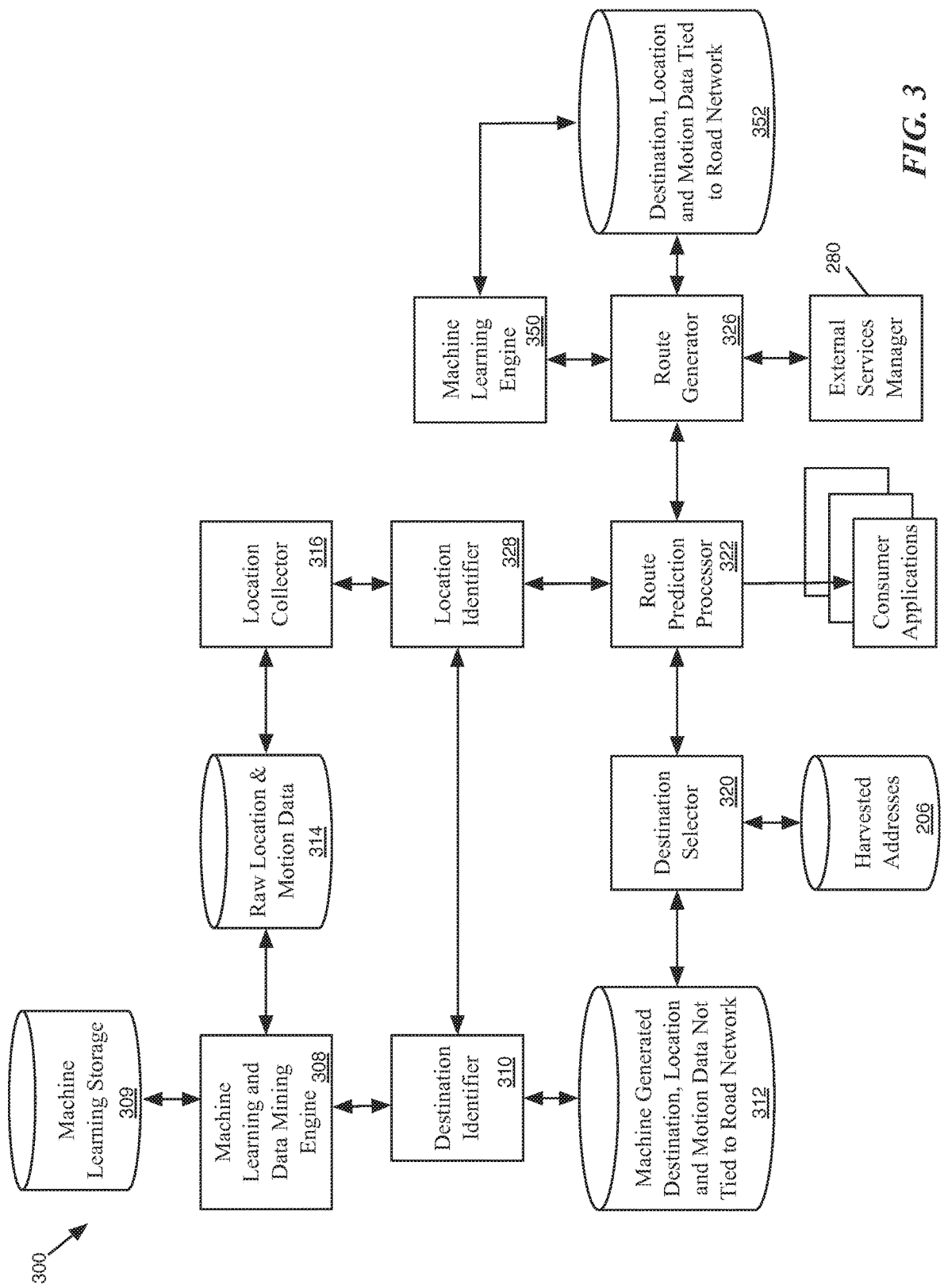
FIG. 3 illustrates another prediction architecture of another device of some embodiments.

FIG. 3 illustrates another prediction architecture of another device 300 of some embodiments. This architecture is similar to architecture of FIG. 2 except in two ways. First, in this architecture, machine generated destinations are accompanied with intermediate breadcrumb locations as well as motion data for these locations in order to allow the route generator to identify more specific routes. Second, to generate such routes, the route generator of some embodiments employs machine-learning processes that operate off a data storage that stores processed destination, location and motion data that is tied to the road network.

As shown in FIG. 3, this architecture includes a harvested address data storage 206, a location identifier 328, a location collector 316, a raw data storage (e.g., a database) 314, a machine-learning/data-mining engine 308, a machine-learning data storage (e.g., a database) 309, a destination identifier 310, a machine generated data storage (e.g., a database) 312, a destination selector 320, a route prediction processor 322, a route generation engine 326, a machine-learning engine 350, and a processed data storage (e.g., a database) 352. Although not shown in FIG. 3, this architecture also includes a ranking engine, an address harvester, and a traffic monitor, which perform the same operations as those modules in FIG. 2. These modules are not shown in FIG. 3 in order not to obscure this figure with unnecessary detail.

Many of the components of the architecture of FIG. 3 perform the same operations as their analogous components in the architecture of FIG. 2, but in many cases, the components in FIG. 3 perform additional operations as well. For instance, like the location collector 216, the location collector 316 collects raw location data from the location identifier 328. However, in addition to this location data, it also captures motion data for each location sample or for each sample in a subset of the location samples. The motion data specifies the speed at which the user (e.g., the device) was traveling at the time the location sample was taken. In addition to speed, motion data in some embodiments includes other data captured or derived from the device sensors (e.g., from the gyroscope or accelerometer). Such data includes in some embodiments the mode of transit associated with the captured location data. Specifying mode of transit based on captured sensor data is described further in U.S. patent application Ser. No. 13/913,234, entitled "Motion Fencing," filed Jun. 7, 2013.

In some embodiments, the location collector 316 generates the motion data from the timestamps for capturing a number (e.g., two) consecutive location samples, and the locations specified by the location sample. To generate such motion data, the location collector 316 in some embodiments collects data from one or more device sensors other than the location identification sensor(s). Such other sensor data can specify the mode of transit and thereby can be used to isolate driving data from non-driving data. Also, in some embodiments, the location collector 316 does not generate the motion data. For instance, in some such embodiments, the route generator 326 generates the motion data based on the processed location data that is tied to the road network.

Like the machine-learning engine 208, the machine-learning engine 308 in some embodiments (1) analyzes the raw data in the data storage 314 to identify regions of locations at which the user was located for more than a threshold time period (e.g., for at least 30 minutes), and (2) provides the identified regions to the destination identifier 310 so that it can identify machine-generated physical addresses based on these regions. Also, like the engine 208 of some embodiments, the engine 308 of some embodiments identifies start and end times for entering and leaving each region based on analysis, statistical, and historical data that is stored partially or completely in the machine-learning storage 309. Further, like the engine 208 of some embodiments, the engine 308 of some embodiments stores transitions between regions and transition probabilities or parameters from which such probabilities can be computed.

Unlike the machine-learning engine 208, the machine learning engine 308 factors frequency and time information for not only the raw locations but also the motion data. Unlike the machine-learning engine 208, the machine-learning engine 308 creates intermediate breadcrumbs for each pair of associated endpoints. In other words, for each pair of regions that the machine-learning engine 308 associates for a particular time interval on a particular day, the machine-learning engine 308 specifies a group of breadcrumbs that specify the direction of travel between the two endpoints. The breadcrumb data is stored location data that represents locations along routes that the device previously traveled. This data is initially collected as raw data stored in the raw data storage 314. It is only captured as GPS data in some embodiments, while in other embodiments it alternatively or conjunctively includes captured WiFi data, cell tower data, or other location data. The breadcrumb data is then processed by machine-learning engine 308, and stored in its machine-learning data storage 309. Subsequently, it is stored in the machine generated data storage 312 by the destination identifier 310.

To generate a more complete set of possible locations for a particular time interval on a particular day, the machine-learning engine 308 in some embodiments specifies motion data for some or all of the breadcrumb locations. This engine 308 in some embodiments stores the motion data in the machine-learning storage 309 so that it can update such data based on additional raw data and additional analysis. In other embodiments, such motion data are generated by route generator 326 as described above and further described below.

The machine-learning engine 308 supplies an associated set of locations that it creates for a particular time interval on a particular day to the destination identifier 310. Like the identifier 210 of some embodiments, the identifier 310 of some embodiments performs reverse geocoding, or has an external service perform reverse geocoding, on each region in each set of locations that it receives so that it can store an actual physical address or physical location for the region, along with the location and motion data for the intermediate breadcrumb data, in the machine-generated data storage 312. In some embodiments, the destination identifier 310 stores the breadcrumb data in terms of latitude and longitude coordinates. Accordingly, at least some of the location data in the machine-generated storage 312 (e.g., the breadcrumb data between regions for which physical addresses are stored) is not tied to the road network in some embodiments.

For a particular time interval on a particular day, the destination selector 320 in some embodiments provides the prediction processor 322 with one or more sets of associated locations from the machine-generated data storage 312. Also, the destination selector 320 in some embodiments selects one or more physical addresses from the harvested address data storage 206, so that the route prediction processor 322 can also generate routes for these physical addresses. However, the discussion below does not further describe generating routes based on use of harvested addresses (from the harvested addresses data storage 206) because this topic was described above by reference to FIG. 2, and because in some embodiments described below, predicted routes that are based on harvested addresses do not rely on breadcrumb data.

Each set of associated locations that the destination selector 320 retrieves from the data storage 312, represents a possible route for traveling. In some embodiments, each set has two end locations, and a group of intermediate breadcrumb locations in between the two end locations. Also, in some embodiments, each set has motion data for each or some of the locations in the set. In some embodiments, one of the two end locations in each set is the current location. In other embodiments, neither of the two end locations in each of at least some of the sets is the current location. Also, as mentioned above, each location in a set of locations in some embodiments is not tied to the road network and instead is expressed in terms of latitude and longitude locations, with the exception of the endpoints; as mentioned above, an endpoint in some embodiments is expressed in terms of a physical address as the reverse geocoder in these embodiments provides its results in terms of physical addresses, while in other embodiments, an endpoint is also provided in terms of latitude and longitude coordinates.

The prediction processor 322 provides each location set to the route generator 326, which then uses the set to generate a specific route for the user. Without the breadcrumb data, the route generator 326 of some embodiments generates the best route, as described above, but with the breadcrumb data it can identify a more specific route that traverses through all or most of the intermediate breadcrumb locations in the set.

To create such a more specific route, the route generator 326 uses the machine-learning engine 350 to create sets of associated locations that are tied to the road network. In some embodiments, each set of associated destinations includes start and end locations (which are typically called route destinations or endpoints), a number of locations in between the start and end locations, and a number of motion records specifying rate of travel (e.g., between the locations).

In some embodiments, the route generator 326 uses the machine-learning engine 350 to stitch together a route definition for each set of locations that it receives. The machine-learning engine 350 formulates this route definition based on the destination, location, and motion histories that it maintains and stores in the data storage 352. In some embodiments, this data 352 includes frequency and time information for the destinations, locations, and motion data. That is, each set of data is associated with a time of day and day of the week, and the machine-learning engine 350 also identifies the frequency with which the same or similar data is accumulated (e.g., when the user drives via the same route on a regular basis). The use of frequency and time data makes more likely the routes that are traveled more frequently, or the routes that are traveled more often at the current time of day.

The machine-learning engine 350 ties the location data that it receives to the road network, analyzes this data in conjunction with the motion data, generates statistics regarding the analyzed data, and updates its data, its analysis and its statistics each time that it receives more location data. The machine-learning engine 350 stores the analysis, historical and statistical data in the data storage 352.

Tying the data to the road network can allow the machine-learning engine 350 to differentiate between similar routes. For example, a user might take a freeway to work on Monday-Thursday, but take a frontage road that closely parallels the freeway on Fridays. The latitude and longitude breadcrumb data for these two routes will look very similar, but when tied to the road network will indicate different routes. In order to differentiate the routes when tying the latitude and longitude data to actual roads, some embodiments rely on the additional motion data recorded along with the latitude and longitude (e.g., speed data that indicates how fast the user was traveling). In other embodiments, the coordinate data is tied to the road network by having very precise definitions of the roads, such that the latitude and longitude for the freeway can be differentiated from the latitude and longitude of the paralleling frontage road. In this example, generating the information that the user takes the freeway most days and the frontage road on Fridays allows the device to provide the user with the appropriate route and data for the appropriate day (e.g., traffic information along the correct route that the user will take each day).

In some embodiments, the route generator 326 uses the machine-learning engine 350 to generate a route definition in terms of two endpoint locations and several intermediate breadcrumb locations, which are all tied to the road network. In some embodiments, the route generator 326 provides each route definition that it generates to an external routing engine outside of the device (e.g., to a mapping service communicatively coupled to the device through a wireless network), so that the external routing service can generate the route for each generated set of associated locations that traverses through all or most of the intermediate locations. In other embodiments, the route generator 326 itself generates the route for each set of associated locations.

Whether generated through an external routing service or an internal routing engine, the route generator 326 obtains in some embodiments a confidence score for each generated route. The confidence score in some embodiments expresses the likelihood that the generated route is an accurate route for all the sets of locations provided in the route definition. In some embodiments, the route generator stores a generated route with a high confidence score as a generated, predicted route, so that it can use this route in the future without having to generate it again. In some of these embodiments, the route generator also discards the set of locations (including the intermediate locations) that was part of the route definition that led to the generated route with the high confidence score, as such data is no longer needed to identify such a route. Other embodiments, however, do not discard the location data or route definition data at this point. However, it should be noted that in some embodiments, the prediction architecture of FIG. 2 or 3 discards raw location data after a certain number of days (e.g., 30 days). Similarly, in some embodiments, it discards processed machine-generated data after a certain number of days (e.g., 120 or 240 days), or in other embodiments, it discards stale processed machine-generated data that has not been used for a certain number of days (e.g., 120 or 240 days). Some embodiments discard such data in order not to have too much unnecessary location data and in this manner protect the privacy of the user of the device as much as possible, while also providing the user with useful prediction data.

With each route that it generates, the route generator 326 obtains from the external route generator or from another external server (e.g., an external traffic service server) information regarding the route, such as data regarding traffic congestion, accidents, road closures, etc. The route generator 326 supplies the generated routes and/or information about the routes to one or more applications, as shown in FIG. 3.

In some embodiments, the integrated mapping and navigation application operating on the device of some embodiments uses this data to provide more useful navigation instructions specifically tailored to the user's past behavior. As mentioned above, when the destination selector 320 selects a likely destination for the user, some embodiments use a frequently traveled route to that destination for the time of day rather than the best route as determined by a routing server.

In addition, some embodiments use a portion of a regularly traveled route to a first destination in order to provide navigation to a second destination. For example, a user might regularly travel to one or more destinations that requires traveling to and getting on a freeway. In many situations, the user will have a specific route to the freeway that they prefer, which might not be the most common route or the route suggested by the routing server. When providing navigation to a new destination for which route history is not stored, but which requires the user to get on the freeway in the same direction, some embodiments will use the user's preferred directions, as determined by analysis of the destination, location, and motion history. Thus, the navigation instructions for the portion of the route to get on the freeway would follow the user's usual travel pattern until on the freeway, and would then use the best route as determined without the prediction processes. While this example shows the overlapping portion at the start of the currently navigated route, some embodiments also use machine-learning to identify portions in the middle of a route or at the end of a route (e.g., if the user requests navigation home from an uncommon starting location, or if the middle of a route between two new locations overlaps with a commonly-traveled route).

In some embodiments, the mapping and navigation application uses the data for frequently traveled routes in order to simplify navigation instructions. In other words, some embodiments use machined learning to modify how a map or navigation application of the device provides turn-by-turn navigation instructions to the user. For instance, the machine learning allows the map/navigation application to skip audible (or in some cases visual) maneuver instructions for some or all portions of the route that the user frequently travels in exactly the same way over a sufficiently long duration of time.

More specifically, when a user regularly travels a portion of a route such that an assumption can be made that they do not need detailed navigation instructions for the portion of the route, the instructions can instead simply specify the endpoint of the traveled route portion, thereby simplifying numerous maneuvers into a single instruction. For instance, in the above example, rather than providing detailed maneuver instructions for the user's frequently traveled route to the freeway, the navigation instructions might instead say "Get on 280 North" (in the example in which the discussed freeway is the 280). Additional examples of such applications and their uses for such routes and associated information were described above. They will also be further described below.

Figure 4:
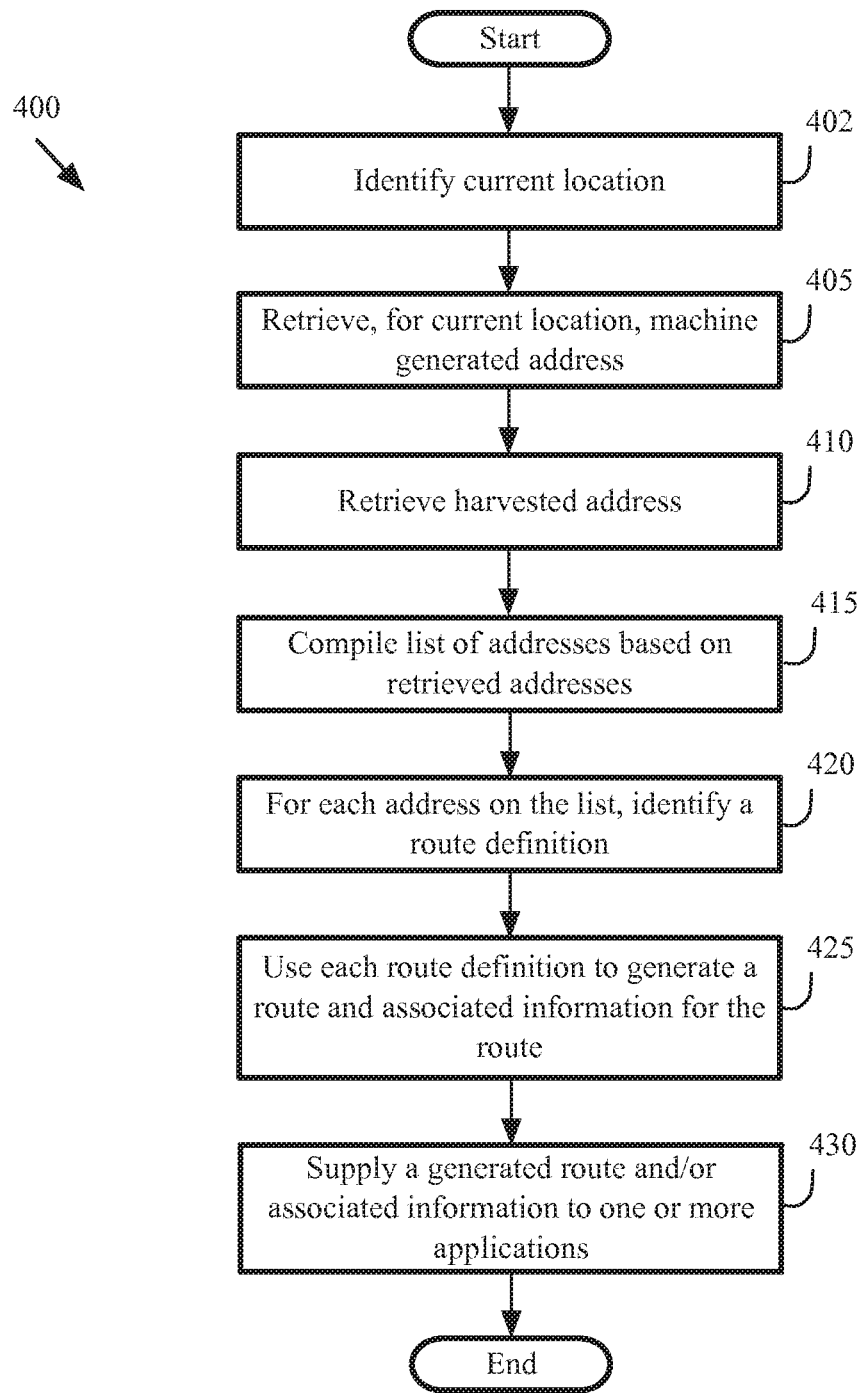
FIG. 4 illustrates a process that a route prediction processor performs in some embodiments to generate predicted routes.

FIG. 4 illustrates a process 400 that the route prediction processor 222 or 322 performs in some embodiments to generate predicted routes. The prediction processor 222 or 322 performs this process periodically or on-demand to formulate predictions about current or future destinations of the device and/or to formulate routes to such destinations for the device. Based on these formulations, this engine then directs one or more applications to relay relevant predicted destinations, routes or related information to the user.

The prediction processor 222 or 322 performs the process 400 at different frequencies. For instance, to identify possible patterns of travel, the prediction processor of some embodiments runs this process on demand, once a day in some embodiment, several times a day in other embodiments, several times an hour in yet other embodiments, etc. In other embodiments, the prediction processor initiates this process on a particular schedule (e.g., once per day) and additionally initiates the process when something changes (e.g., when a location is harvested for a calendar event or when the user views a map of an address that was sent in an email or text message). In some embodiments, the prediction processor runs less frequently when the device is running on battery power than when it is plugged in to an external power source. In addition, some embodiments perform the automated prediction processes more frequently upon detection that the device is traveling along a road or at a speed above a particular threshold generally associated with motor vehicles (e.g., 20 mph, 30 mph, etc.), if the device has sufficient battery level or the device is connected to the charger. Furthermore, some embodiments allow the user of the device to configure how often or how aggressively the route prediction processor should perform its automated processes.

As shown in FIG. 4, the process 400 initially identifies (at 402) the current location of the device from the location identification engine 228 or 328. It then directs the destination selector 220 or 320 to generate predicted destination data for the current location of the device. Accordingly, at 405, the destination selector 220 or 320 retrieves machine-generated address data from the machine-generated data storage 212 or 312. As mentioned above, the machine-generated data storage 212 or 312 store associated pairs of locations that represent associated regions of locations. Each associated pair of regions represents two locations that are commonly the start of a route or the end of a mute that the user periodically travels (e.g., the user's home and work addresses).

To retrieve machine-generated address data for a particular time period, the destination selector 220 or 320 of some embodiments examines the data storage 212 or 312 to identify any stored data sets that are related to the current location of the device. To perform this examination, the destination selector 220 or 320 of some embodiments initially determines whether the current location falls within one of the regions specified by the machine-learning engine 208 or 308, and if so, whether this region for the current location is associated with any other stored region for the current time period. The destination selector 220 or 320 retrieves each identified data set that relates to the user's current location for the current time period. Each identified set includes a predicted destination. In some embodiments, each set also includes breadcrumbs that specify a series of locations between the current location and the predicted destination of the set.

For example, assume that the user lives in San Francisco and works in Cupertino. Also, assume that the user leaves home and travels to work every day between 8 am to 9 am. Accordingly, when the destination selector 220 or 320 at 7 am tries to identify predicted destinations for the user while the user is in San Francisco, it queries the data storage 212 or 312 and determines (1) that the user's current location falls within one of the regions (e.g., falls within a neighborhood in San Francisco), and (2) that a region in Cupertino is a related destination region for the San Francisco region for weekdays travels between 8 am to 10:30 am. Hence, the destination selector 220 or 320 retrieves the address or location for the Cupertino region from the data storage 212 or 312. When the prediction architecture of FIG. 3 is used, the destination selector 320 also retrieves a group of breadcrumbs that are associated with the user's current location and the address/location of the Cupertino region.

As mentioned above, the destination selector 220 or 320 of some embodiments bases its selection of a predicted destination based on in-state probability analysis when it determines that the current location falls within one of the regions specified by the machine-learning engine 208 or 308. However, even when it determines that the current location does not fall within one of the regions specified by the machine-learning engine 208 or 308, the destination selector 220 or 320 of some embodiments formulates one or more predicted destinations for the current location. For instance, to address such a case, the destination selector of some embodiments identifies one or more predicted destinations based on out-of-state probability analysis, as mentioned above. In some embodiments, the out-of-state probability analysis is based on parameters that the machine-generated address storage stores for the stored regions. Examples of such region parameters include in-bound transition data (e.g., average time for entering a region).

In some embodiments, the destination selector 220 or 320 not only retrieves data sets related to predicted destinations for the current location for a particular time interval, but also retrieves destination data sets for future destinations at a later date from other initial locations. The destination selector 220 or 320 does this so that the route prediction processor 222 or 322 can generate various predicted routes for various different time periods in a day or series of days at once. Such batch generation of routes would be useful when the device is being charged at night at the user's home and the device has plenty of cheap network (e.g., WiFi) bandwidth for communicating with external mapping services.

For instance, in the San Francisco/Cupertino example mentioned above, the prediction processor 222 or 322 might direct the destination selector 220 or 320 to analyze the machine-learning data storage 212 or 312 to generate a table of sets of associated destination locations for different sets of routes that the user might take that day. In some embodiments that use the architecture of FIG. 3, each of these sets includes breadcrumb data that specify intermediate location data from which specific mutes can be generated by the route generator 226 or 326.

After retrieving (at 405) the predicted destination data for the machine generated data storage 212 or 312, the process 400 retrieves (at 410) high-ranking harvested addresses from the harvested address data storage 206. Some embodiments only retrieve scheduled addresses for the upcoming day (e.g., locations of calendar events, locations associated with electronic tickets, etc.), while other embodiments retrieve additional addresses such as those from recently received text messages, e-mails, or other sources. Next, the destination selector 220 or 320 compiles (at 415) a list of address data from the list of retrieved address data sets. In some embodiments, the destination selector 220 or 320 puts all the retrieved address data sets on the compiled list, while in other embodiments, it eliminates some of the address data sets when it has retrieved too many address data sets.

Also, in some embodiments, the process specifies a prediction operation for each address set on the list, while in other embodiments, the prediction processor 222 or 322 determines the prediction operation to perform for each address set on the list based on the type of address set. Different prediction operations are done for different address sets on the list because not all the address sets have the same degree of utility. For instance, a machine-generated address that is based on months of gathered data is a good predictor of travel patterns and has a high utility for predicting routes and displaying such routes to the user. On the other hand, harvested address data that is based on a user's search of a map location is not as useful for predicting travel patterns if better options exist. However, such harvested address data is useful for display of predicted search queries to the user, especially when the user is close to the searched map location. Harvested address data can be a good predictor of travel patterns in some cases. For instance, such address data is highly ranked when the user receives the address in an e-mail message from a person on the user's favorites/VIP lists or in the user's contact, and the user selects this address in the email message for viewing in the map. In addition, an address of a scheduled event may be a good predictor that the user will travel to that address in order to arrive at the location before the time of the event. However, the event may be at a location to which the user has never traveled, and therefore travel history may not be useful to determine a typically-traveled route to the location.

The destination selector 220 or 320 provides (at 415) its compiled list of addresses to the route prediction processor 222 or 322. The route prediction processor 222 or 322 then directs (at 420) the route generator 226 or 326 to generate a route definition for each address data set on the list. In some embodiments, the route generator 326 uses a machine-learning engine 350 to generate the route definition, as described above.

For each route definition, the route generator 226 or 326 then (at 425) generates a route and obtains associated information (e.g., traffic data) regarding the route. The route generator 226 or 326 supplies the predicted destination(s), generated route(s) and/or associated information to the prediction processor 222 or 322. In supplying the generated route(s), the route generator 226 or 326 in some embodiments ranks the route(s) based on the likelihood that each route ends at the user's desired destination. In some embodiments, this ranking is based on a set of factors, which include the frequency of travel, the ranking of the predicted destination, computed probabilities, etc.

The prediction processor 222 or 322 relays (at 430) the received routes and/or associated information to one or more applications. In some embodiments, different applications receive different sets of routes and route information. For instance, the notification manager 260 only receives in some embodiments traffic data along a subset of predicted routes (e.g., the most likely route or most likely two or three routes). In some embodiments, the calendar application 266 receives traffic data along a route between two locations (e.g., between two event locations, or between an event location and another predicted location) specified by the calendar application, or the travel time along the route between two such locations given the traffic level.

The map application services 262 of some embodiments have a modality that allows a user to scroll through several different predicted routes and/or predicted destinations. For such embodiments, the prediction processor 222 or 322 provides several predicted routes or predicted destinations. In some of these embodiments, these routes and/or destinations are sorted, or have ranking scores that allow them to be sorted, based on the likelihood that they will be the desired routes or destinations to the desired destination of the user. The map application services 262 also use the supplied predicted routes and/or predicted destinations to generate list views of such routes and/or destinations, e.g., in a search window as potential routes and/or destinations.

Figure 5:
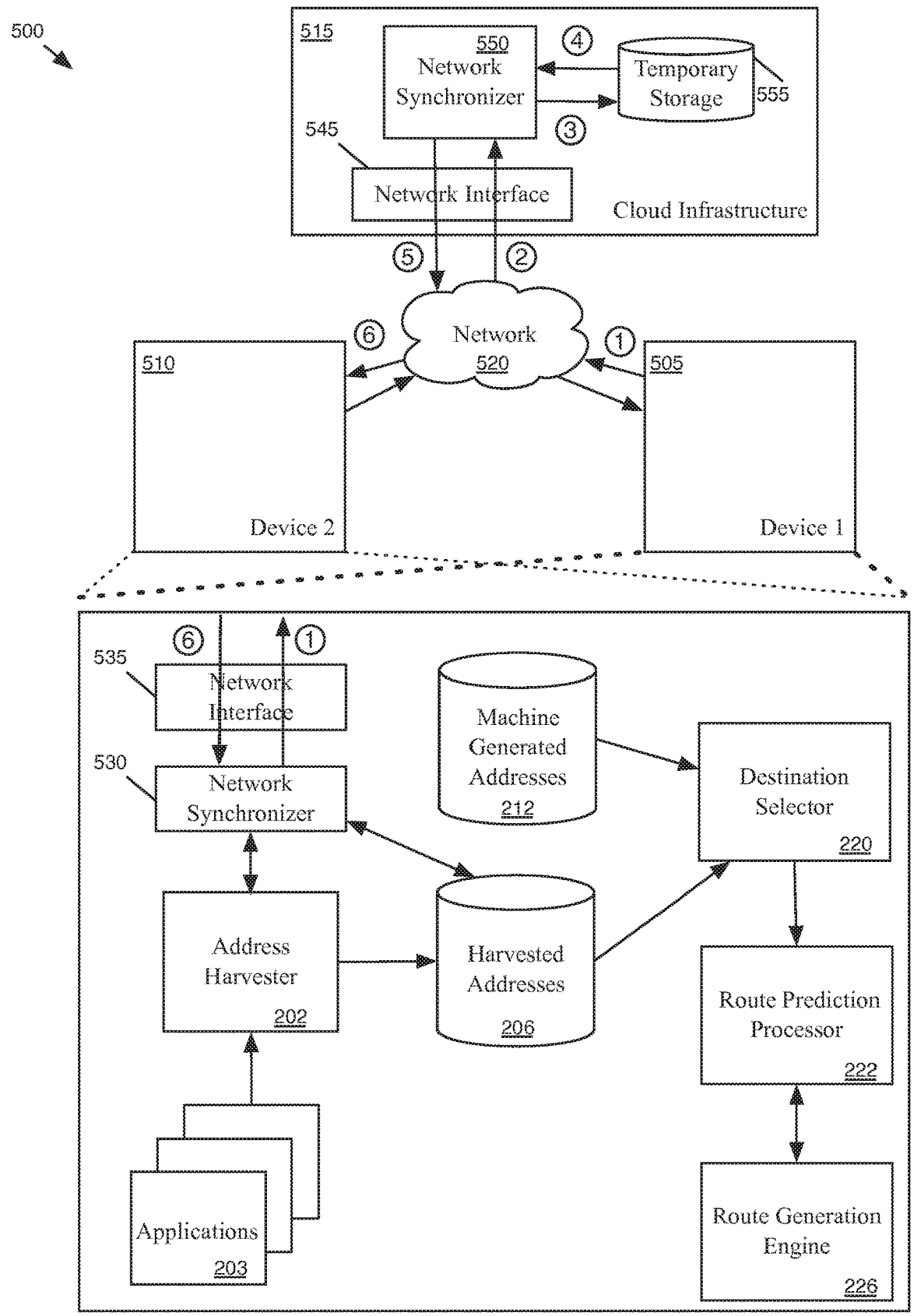
FIG. 5 illustrates an example of a harvesting architecture that can create such duplicated, distributed data storages.

Some embodiments use the addresses that are harvested on one device to facilitate the operation of one or more applications executing on another device. To do this, some embodiments create duplicate, distributed databases on different devices to store addresses that are harvested on different devices. FIG. 5 illustrates an example of a harvesting architecture 500 that can create such duplicated, distributed data storages. Specifically, it illustrates two devices 505 and 510 that are associated with each other (e.g., are associated or registered with the same account) through a cloud server infrastructure 515 that temporarily stores harvested addresses from one device before relaying it to the other device. The devices 505 and 510 and the server infrastructure 515 communicatively couple with each other through a network 520, such as the Internet or other network.

Each device 505 or 510 has (1) an address harvester 202 that harvests addresses from content supplied by one or more applications 203, and (2) a harvested address data storage 206 that stores addresses harvested by the harvester 202. Because of their association, these device share harvested address data in these storages 206. In some embodiments, the association between these devices 505 and 510 is established because the two devices are associated with one account of the cloud server infrastructure (e.g., one iCloud account offered by Apple Inc.) or with two associated accounts. In some embodiments, this association is automatically created when the devices are designated as being commonly owned by one user.

In some embodiments, each device 505 or 510 can be one of many different types of devices, such as desktop computer, laptop computer, smartphone, tablet computer, or any other electronic device. Each device 505 or 510 uses one of the prediction architecture of FIG. 2 or 3. Accordingly, in addition to the address harvester 202 and the harvested address data storage 206, each device has a machine-generated data storage 212, a destination selector 220, a route prediction processor 222, and a route generator 226.

In the example illustrated in FIG. 5, each harvested physical address in the harvested address data storage 206 is eventually routed from the device that harvests this address to the cloud server infrastructure 515, which, in turn, routes this new address to other associated devices. To detect new harvested addresses and to mute such addresses to the server infrastructure 515, each device 505 or 510 has a network synchronizer 530 that works with a network synchronizer 550 in the server infrastructure 515. The network synchronizer 530 of each device directly accesses the harvested address data storage 206 to read data from or write data to this address data storage in some embodiments, while it indirectly accesses the data storage through the address harvester 202 in other embodiments.

Each time a new address is added to a device's harvested address storage 206, the device's network synchronizer 530 detects the new harvested address and relays information about this new address to the server infrastructure 515 through the device's network interface 535.

Also, in some embodiments, each time the address harvester 202 of a device harvests an address that was previously harvested and updates a previously created record of a previously harvested address, the network synchronizer 530 detects the update to the previously created record and relays information about this update to the server infrastructure 515. When a device's decay engine adjusts the ranking score of a harvested address, the network synchronizer 530 of some embodiments relays the updated score to the server infrastructure for distribution to the other devices. In other embodiments, however, such updated ranking scores are not relayed through the server infrastructure between devices because each device has its own decay engine that is responsible for performing these adjustments.

In the example illustrated in FIG. 5, the routing of the harvested address from device 505 to the device 510 is shown in six stages. In the first stage, the network synchronizer 530 detects the addition of the harvested address, and sends to the server infrastructure 515 one or more packets to relay a data tuple that includes all the synchronized fields of data of the harvested address' record.

In the second stage, a network synchronizer 550 of the server infrastructure 515 receives the packet(s) from the device 505 through the network interface 545. The server infrastructure 515 includes one or more servers. In some embodiments, this infrastructure includes one or more web servers for processing network packets and routing these packets to application servers. In some embodiments, the network interface 545 includes the web servers, and the network synchronizer 550 is an application server that is responsible for managing the distribution of the harvested address data (e.g., new records and record updates) across a set of associated devices. Accordingly, in some embodiments, each module of the server infrastructure 515 that is shown as a single block might be implemented by one or more computers dedicated to the particular task of the module. Alternatively, or conjunctively, two or more modules of the server set might execute on the same computer. Furthermore, the different functionalities performed by the server infrastructure 515 might be performed in disparate geographic locations.

In some embodiments, the network synchronizers 535 and 550 of the devices 505 and 510 and the server infrastructure 515 use the ubiquitous key value storage mechanism of Apple Inc. to synchronize the harvested address data storage 206 across a set of associated devices. To do this, they create a key value store for the harvested address data storage 206. This key value storage mechanism is further described in filed U.S. Provisional Patent Application 61/832,850, and in concurrently filed U.S. Non-Provisional application Ser. No. 14/081,843 entitled "Harvesting Addresses" and incorporated herein by reference.

As shown in FIG. 5, the network synchronizer 550 of the server infrastructure 515 stores in a temporary storage 555 any newly received harvested address data. It stores this data until it determines that device 510 is available for receiving the harvested address data that the server infrastructure 515 received from device 505. In this manner, the cloud infrastructure relieves the two devices 505 and 510 from having to establish a real time communication session in order to download harvested addresses from one device to the other. By relieving the need to establish real time communication between the two devices, the infrastructure simplifies the process of creating duplicate, distributed databases on different devices.

Once the network synchronizer 550 determines that the device 510 is available to receive the harvested address data, it (1) in the fourth stage, retrieves this data from the temporary storage 555 (5) and in the fifth stage, sends one or more packets to relay the data tuple that includes all the synchronized fields of received harvested address data to the device 510. In the sixth stage, the network synchronizer 535 of the device 510 receives the packet(s) and stores the data tuple in the harvested address storage 206.

By so distributing the harvested address data, the harvesting architecture 500 of FIG. 5 creates duplicated, distributed databases on different devices to store addresses that are harvested on different devices. This robust distributed database synchronization across multiple devices, combined with the harvesting of address data from multiple applications on each device, makes the address harvesting architecture of some embodiments very powerful as it can quickly build a very rich address storage that resides on multiple devices and that can augment the operation of multiple applications on each device.

Some embodiments use the synchronization architecture shown in FIG. 5 to synchronize the raw data storage, the machine learning storages 209 and 309, the machine generated data storages 212 and 312, and/or the data storage 252 across several associated devices. In other words, some embodiments use the synchronization architecture of FIG. 5 to push raw data collected on one device, and/or predicted destinations or predicted routes that are formulated on one device, to another device. Under such an approach, the raw data that is stored in the raw data storage 214 or 314 of a device might not include only the raw locations collected by that device, but might include the raw locations collected by other associated devices. This approach can be used to gather a much richer set of raw data, and it can be used to allow the extra or greater resources of one device (e.g., a computer) to perform predictions for another device with less computation or battery resources (e.g., a mobile device). For instance, in some embodiments, a computer gathers raw location data of an associated mobile device, performs prediction operations on the gathered raw data, and then provides predictions through the synchronization mechanism (e.g., through the ubiquitous key value storage mechanism) to the mobile device for its use. Other embodiments do not synchronize raw or processed location data across multiple devices because of privacy concerns.

II. Uses for Predicted Routes and Related Data

Figure 6:
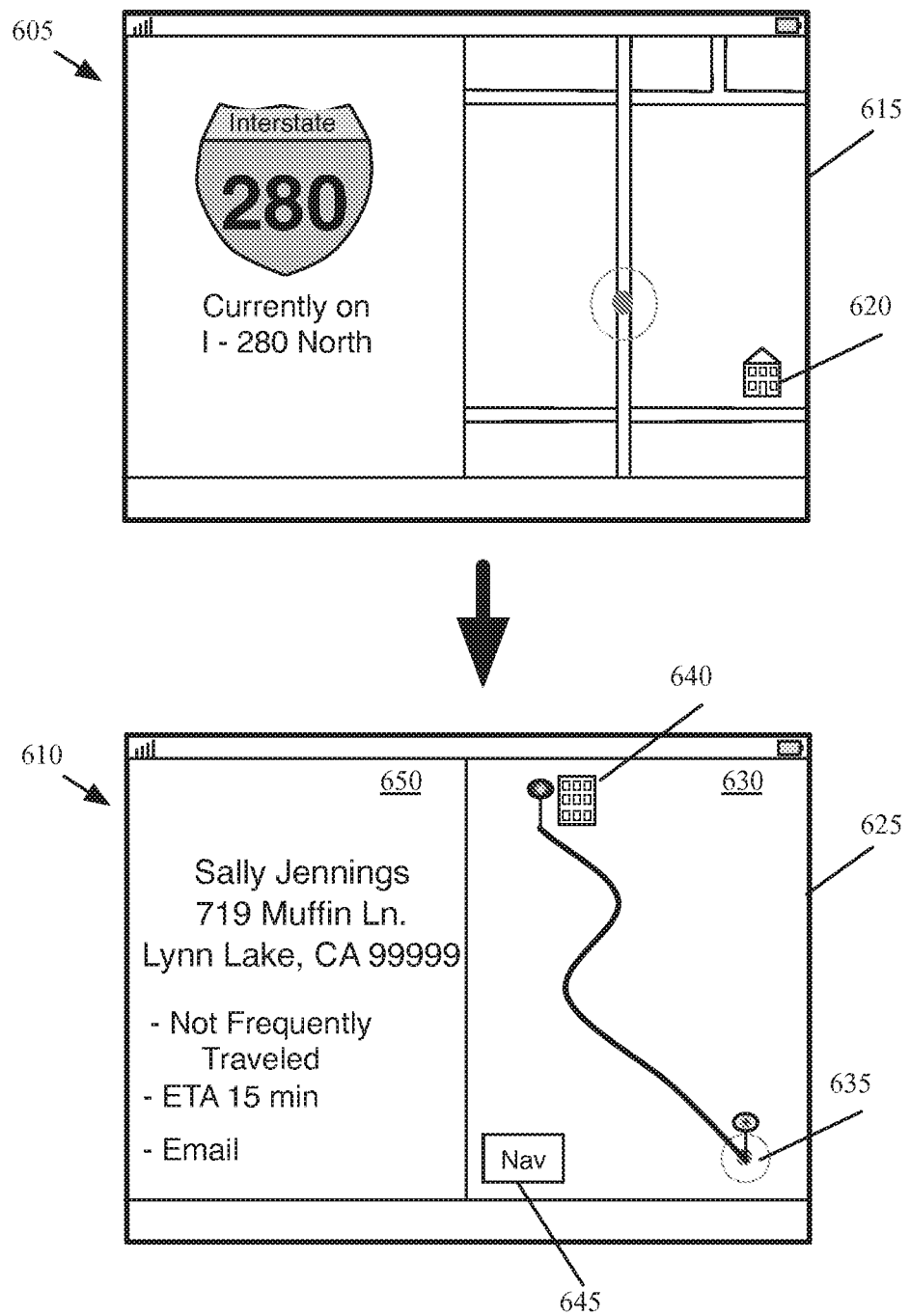
FIG. 6 illustrates an example of a map application that displays in a non-intrusive manner predicted routes identified by the route prediction architecture of some embodiments.

FIG. 6 illustrates an example of a map application that displays in a non-intrusive manner predicted routes identified by the route prediction architecture of some embodiments. In some embodiments, the mobile device executes this application and displays its output on its display screen when the user has the map application operating in the foreground. In some embodiments, the device provides the output of the map application to a display screen in a vehicle through an interface that facilitates communication between the device and the vehicle. Accordingly, the display presentations illustrated in FIG. 6 can be either provided on the display screen of the mobile device or a display screen within a vehicle in which the user of the device is traveling.

The interface of some embodiments with the vehicle enables the device to provide a safe driving experience. In addition to the device performing certain tasks and presenting certain content (e.g., predicted destination and/or routes) automatically, without the need for user input, some embodiments additionally allow user input through voice controls, touch screen controls, and/or physical controls mounted on the dashboard or steering wheel, among other possibilities. Also, certain applications and/or tasks may be automatically invoked based on sensors of the electronic device or information provided to the electronic device by other devices, such as systems of the vehicle (through the vehicle-device interface). For example, route prediction or other tasks may be automatically invoked when the vehicle is started, or based on a current location as provided by a GPS or other location indication sensor.

This figure illustrates the operation of the map application in two stages 605 and 610 that correspond to two different instances in time during a trip from the user's home to the home of Sally Jennings. Specifically, the first stage 605 corresponds to the start of the trip when the user has left his home 620. At this stage along the trip, the mobile device's route predictor (e.g., the prediction processor 222 or 322) has not yet predicted the destination or the route to the destination. Accordingly, the map application provides a display presentation 615 that simply shows the location of the device along the road being traveled by the vehicle. This presentation also provides on its left side the identity of the road that is being currently traversed, which in this example is 1-280 North. In this embodiment, this presentation 615 is simple and does not have a supplementary audio component because this presentation is not meant to distract the user as the user has not affirmatively requested a route to be identified or navigated.

As the vehicle continues along its path, the device's route predictor at some point identifies a predicted destination for the journey and a route to this destination. In the example illustrated in FIG. 6, this destination is the home of Sally. As the user only rarely travels from his home to Sally's house, the route predictor did not immediately identify this destination, but instead needed to gather additional data about the direction of the user's travel to help identify the possible destination for this journey. In some embodiments, this destination is a machine-generated destination that is correlated to Sally's contact information that is stored on the device's address book, which is a database on the device in which the user stores addresses of various people and entities. Accordingly, the name for this destination is retrieved from the contact information. In other embodiments, the machine-generated destination is derived from the addresses in the address book; in other words, the machine-generating engine augments the machine-generated addresses that it detects with addresses from the device's address book.

Also, some embodiments use the address book to identify the home and work addresses of the owner of the device. For instance, in some embodiments, the address book has a contact record that is associated with the owner or that can be associated with the owner. This contact record in some embodiments has one or more fields for specifying the owner's home address and one or more fields for specifying the owner's work address.

In some embodiments, the route predictor of some embodiments begins attempting to predict a destination for the device once determining that the device is in transit and therefore might want a destination. Different embodiments may use different factors or combinations of factors to make such a determination. For instance, the mute predictor may use location information to identify that the device is now located on a road (e.g., I-280 North) and/or that the device is traveling at a speed associated with motorized vehicle travel.

In some embodiments, the route predictor also performs its predictions on-demand, periodically and/or based on newly identified machine-generated addresses or harvested addresses, as described above by reference to FIG. 4. In other embodiments, the route predictor only performs its predictions periodically and/or based on newly identified machine-generated addresses or harvested addresses. In still other embodiments, the route predictor preforms its predictions only periodically, and does not updated its predictions based on newly identified addresses or on newly detection position or motion of the device.

The second stage 610 shows that once the device's route predictor identifies Sally's house 640 as a possible destination and identifies a route from the device to this possible destination, the map application changes the display presentation 615 to the display presentation 625. Like the presentation 615, the presentation 625 has two parts. The first part 630 displays a route between the device's current location 635 and Sally's house 640. In some embodiments, this part also displays a UI affordance (e.g., a selectable item) 645 for initiating a vehicle navigation presentation so that the map application can provide turn-by-turn navigation instructions. The affordance in some embodiments is the entirety or a portion of the first part, as the touch-selection of any of this part directs the map application to provide turn-by-turn navigation instructions to Sally's house.

The second part 650 of the display presentation 625 provides the identity of the destination, some other data regarding this destination (e.g., the frequency of travel) and an ETA for the trip. Like the first display presentation 615, the second display presentation is rather non-intrusive because this presentation is not meant to distract the user as the user has not affirmatively requested a route to be identified or navigated.

Figure 7:
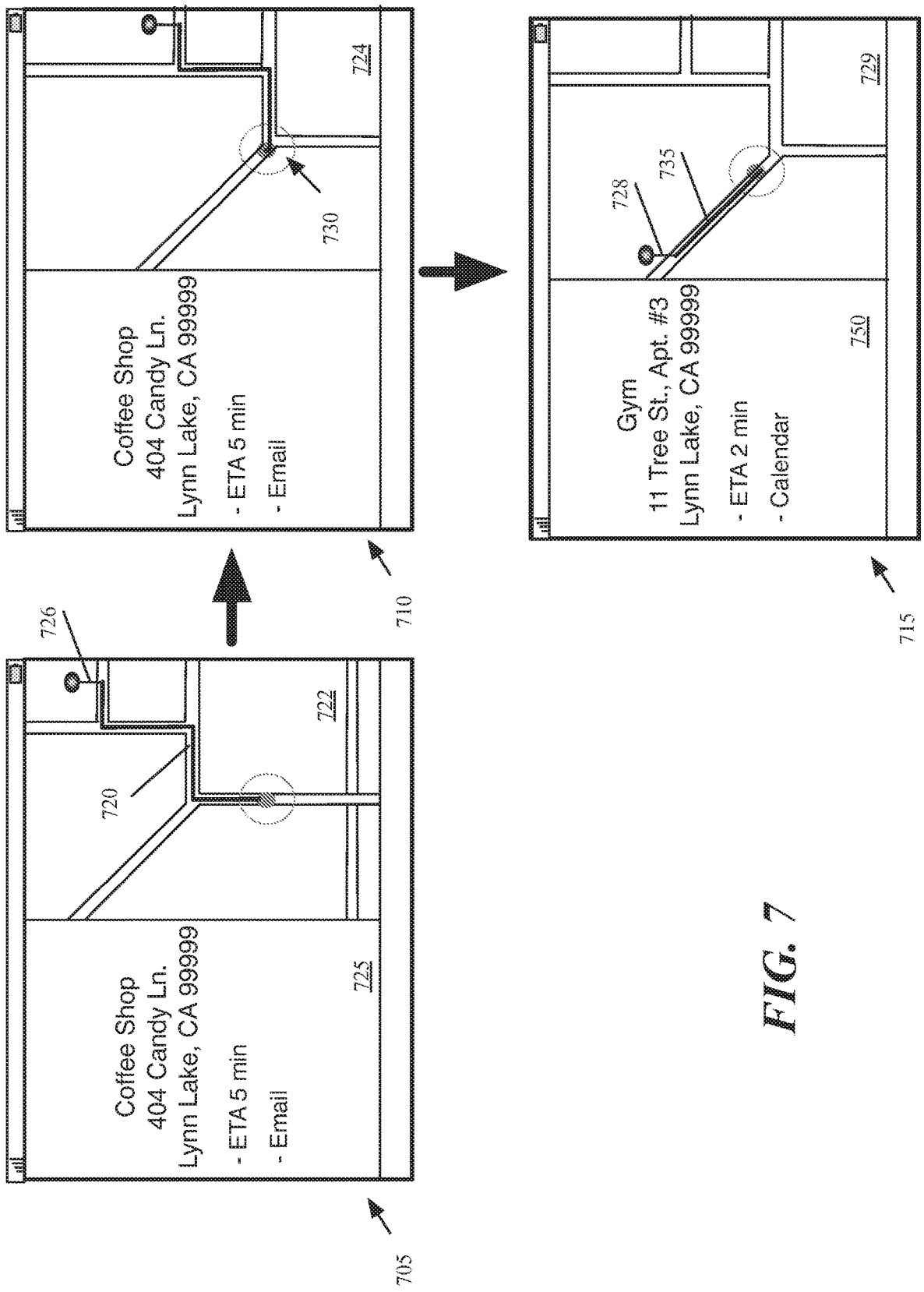
FIG. 7 presents an example of a map application switching from one predicted destination/route to another predicted destination/route.

The example illustrated in FIG. 6 illustrates that in some embodiments, the device's map application can dynamically update its predicted destination and route because the predicted route generator dynamically updates its predictions as it gathers more data from the user's direction of travel. FIG. 7 presents another example of this dynamic update as it shows the map application switching from one predicted destination/route to another predicted destination/route. This figure illustrates this example in three stages 705-715.

The first stage 705 shows the map application providing a first presentation 722 of a first predicted route 720 to a coffee shop 726 and some information 725 about the predicted destination and the expected ETA. The second stage 710 illustrates a second presentation 724 that is similar to the first presentation 722 except that the user is shown to have reached an intersection 730 along the predicted route. As shown in the left part of the second presentation 724 as well as the predicted route in the right part of the second presentation 724, the map application during the second stage 710 is still predicting that the coffee shop is the eventual destination or the trip.

The third stage 715 shows that instead of turning right along the intersection to continue on the route to the coffee shop, the user has taken a left turn towards the gym 728. Upon this turn, the map application provides a third presentation 729 that displays a second predicted route 735 to the gym 728 along with information 750 about the predicted destination and the expected ETA.

In many cases, the device's route predictor (e.g., the prediction processor 222 or 322) might concurrently identify multiple possible destination and routes to these destinations. In these situations, the prediction engine ranks each predicted destination or route based on a factor that quantifies the likelihood that they are the actual destination or route. This ranking can then be used to determine which destination or route is processed by the output engine that receives the predictions.

In both of the above examples, the predicted destinations are destinations particular to the user (i.e., for other devices belonging to other people, the destination address predicted in stages 705 and 710 would not be "Coffee Shop"). In some embodiments, the device's route predictor uses stored contact information (e.g., an address book entry for "Coffee" listing a physical address) combined with route history and motion history indicating that the particular physical address is a frequent destination in order to identify that the user is likely heading to "Coffee Shop".

Accordingly, some embodiment use the frequency of arrival at particular destinations to to assess whether a particular destination should be a predicted destination. Some embodiments also use other information, such as the frequency with which the user requests a route to the destination (irrespective of whether the device actually travels to the destination), frequency of arrival at the destination at the particular day and time of day (e.g., the user may travel to a third destination in the area somewhat frequently, but only on the weekend or only in the afternoon). As examples, the user's workplace and/or a coffee shop may be common morning destinations (especially weekday mornings), whereas home or a favorite restaurant may be common nighttime destinations when the device's current location is at the user's work.

The examples illustrated in FIGS. 6 and 7 illustrate embodiments that dynamically update their predicted destination/routes as they gather more data from the user's location and direction of travel. However, as mentioned above, the route predictor of other embodiments preforms its predictions only periodically, and does not update its predictions based on newly identified addresses or on newly detected positions or motions of the device. In these embodiment, the route predictor does not present newly predicted routes when the devices passes certain locations. Instead, it presents several predicted destinations/routes for a particular time period, and lets the user pick the one that suits the user.

Figure 8:
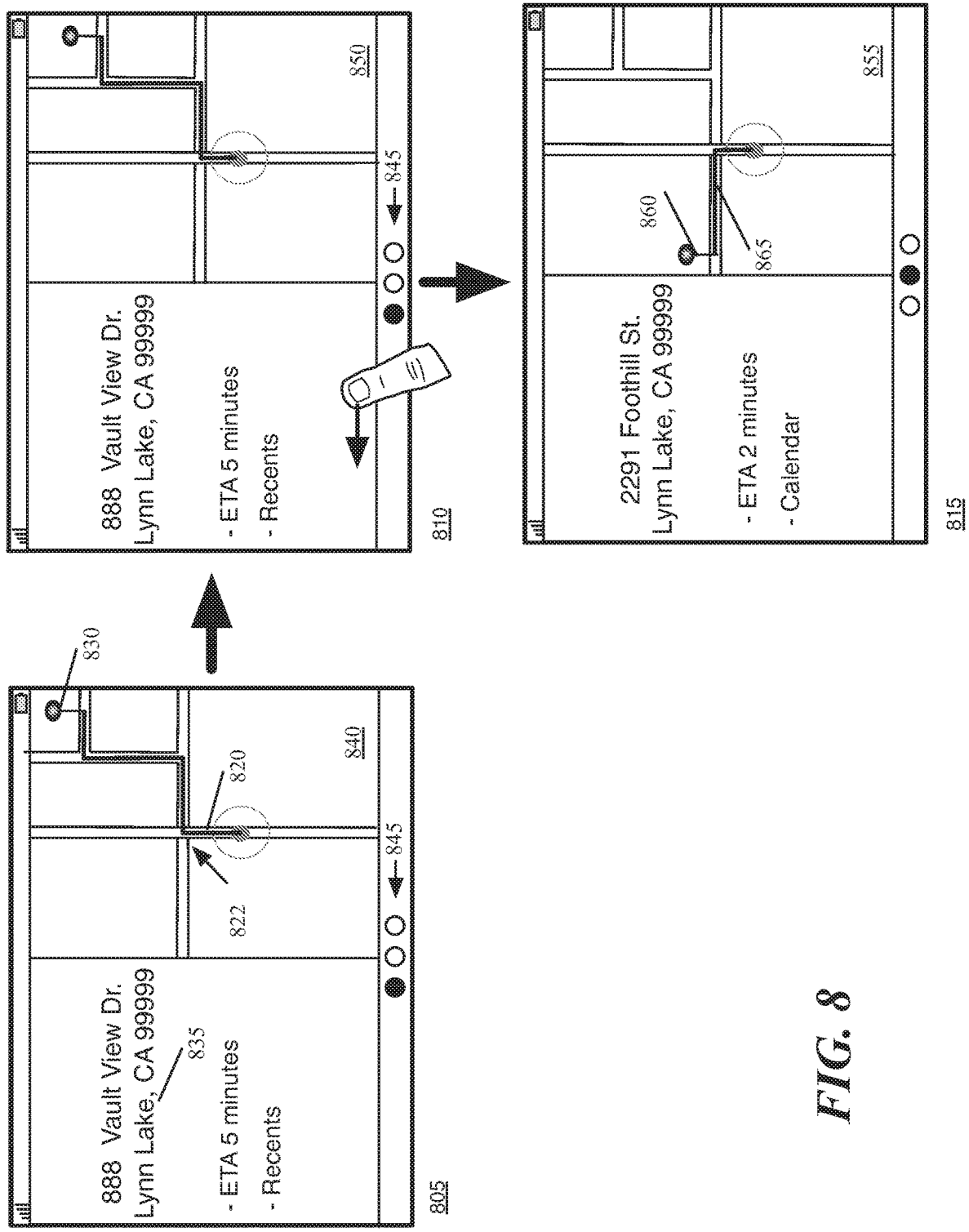
FIG. 8 illustrates an example of the map application handling multiple predicted destinations and/or routes.

FIG. 8 illustrates an example of the map application handling multiple predicted destinations and/or routes. This example is illustrated in terms of three operational stages 805-815 of the map application. The first stage 805 shows the map application providing a first presentation 840 of a first predicted route 820 to a predicted destination 830 and some information 835 about the predicted destination and the expected ETA.

When the route predictor identifies more than one predicted route, the device provides an indication of multiple predicted routes. In the example illustrated in FIG. 8, the indication of multiple routes is provided by indicators 845, which in these embodiments indicate multiple view pages that display multiple predicted routes. In some embodiments, the number of indicators is indicative of the number of additional routes. In this example, three indicators 845 in the first stage 805 are indicative in these embodiments of three predicted routes.

The second stage 810 shows the user performing a swipe operation on the presentation to navigate to another of the predicted destinations/routes. The user can perform such an action because in this example the display screen 850 of the mobile device has a touch sensitive screen. In addition to swipe gestures, the UI module of some embodiments accepts other gestures, or selection of various affordances (e.g., left and right or up and down navigation arrows) in order to cycle through the different options. Accordingly, when the presentation is shown on a non-touch sensitive screen, the user can navigate to the next predicted destination/route through one of the keys or other controls.

Regardless of how the user navigates to the next predicted destination/route, the map application presents the next predicted destination/route upon receiving the user's input. The third stage 815 illustrates the device's presentation 855, which shows another predicted destination 860 and a route 865 to this other predicted destination. The map application did not initially show the route to this destination 860 because the route predictor assigned a lower probability to this destination as the actual destination as compared to the destination shown in the first stage 805.

Figure 9:
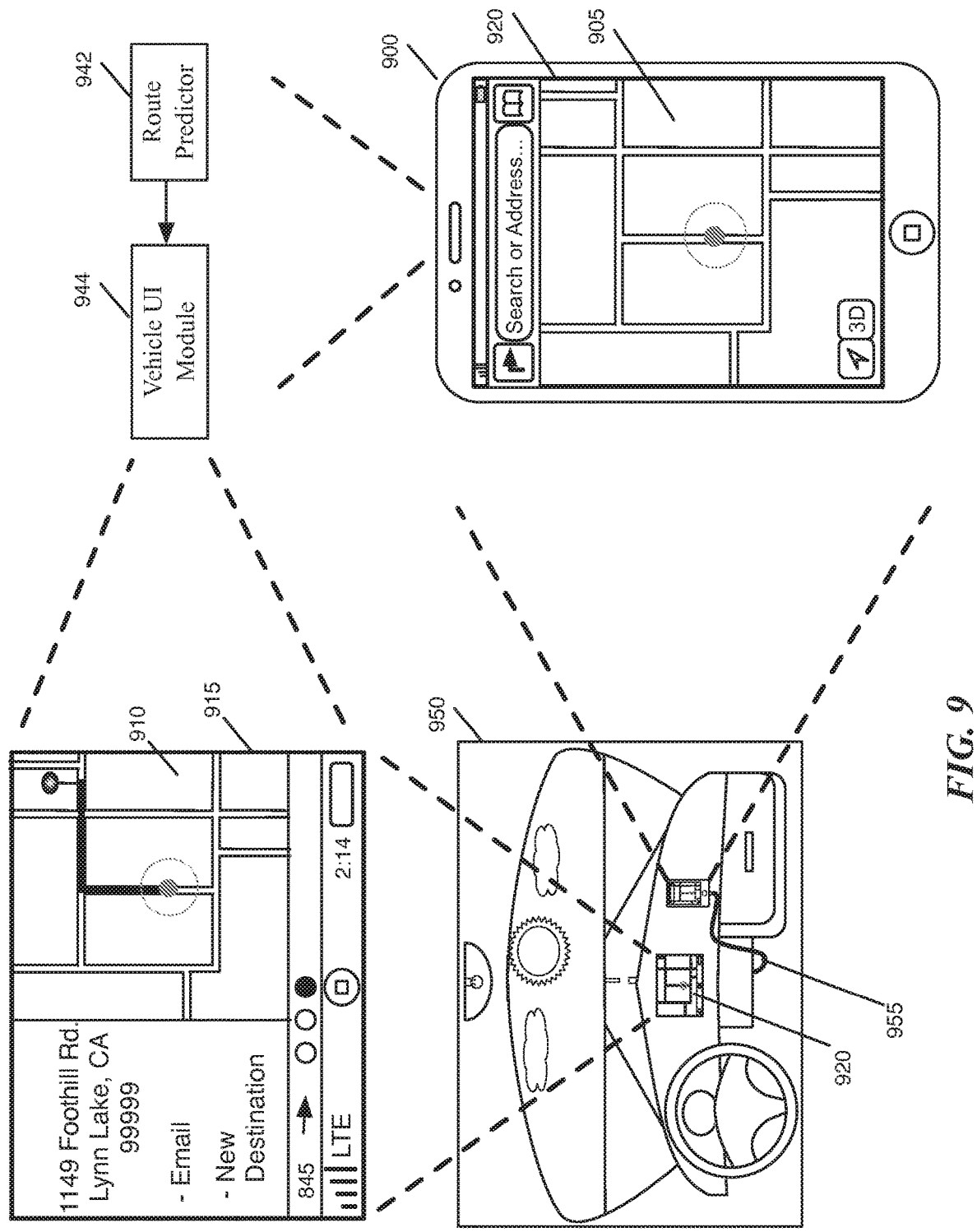
FIG. 9 illustrates an example of a mobile device that predicts future destinations and routes to these predicted destination, and that presents these destinations and routes to a user through a vehicle display.

FIG. 9 illustrates an example of a mobile device 900 that predicts future destinations and routes to these predicted destination, and that presents these destinations and routes to a user through a vehicle display. The mobile device 900 connects to the interface of the vehicle's electronic information system. A mapping application operates on the mobile device 900, and outputs both a first user interface display 905 on the mobile device's display screen 920 and a second user interface display 910 on the vehicle's display screen 915.

The figure illustrates the interior of a vehicle 950, in which the mobile device 900 connects via a wired connection 955 to the vehicle, and outputs a user interface for display on the vehicle screen 915. While this example illustrates a wired connection 955, in other embodiments the mobile device connects with the vehicle's electronic information system through a wireless connection (e.g., through a Bluetooth connection). Also, this example and others described below illustrate a single display screen in the vehicle. However, some vehicles include multiple screens, such as a center console dashboard screen and one or more screens in the control cluster in front of the driver. Some embodiments output only a single user interface to the center dashboard screen for such vehicles, while other embodiments output the same user interface to multiple screens, and yet other embodiments output different interfaces to the different screens.

The figure also illustrates a blown-up views of the mobile device 900 and the dashboard screen 915. As shown, both views display a map of the same location, but within the context of different user interfaces. This figure also illustrates a route predictor 942 and a vehicle UI module 944. Based on machine-generated addresses and harvested physical addresses, the route predictor 942 formulates one or more predicted routes that the device might take at any given time. In some embodiments, the route predictor 942 is the prediction processor that was described above by reference to FIGS. 2 and 3.

In some embodiments, the route predictor 942 is part of the map application that executes on the mobile device 900. The route predictor 942 provides the vehicle UI module 944 with these formulated routes. The vehicle UI module 944 generates the vehicle UI display 910 and presents this display on the display screen 920 of the vehicle. The vehicle UI display 910 is similar to the UI display described above by reference to FIGS. 7 and 8.

As further described in U.S. Provisional Patent Application 61/832,818 filed on Jun. 8, 2013, and in concurrently filed U.S. Non-Provisional Patent Application entitled "Mapping Application with Several User Interfaces," (both of which are incorporated herein by reference), the vehicle UI display 910 is generated in some embodiments by the vehicle UI module as a set of predicted routes or predicted destinations that are arranged along a horizontal strip that scrolls left or right horizontally to display different predicted routes or destinations. In other embodiments, the vehicle UI module 944 arranges each predicted route or destination on a card, with the cards for different predicted routes or destinations are conceptually stacked on top of each other, such that a top card currently being presented in the display 910 for one predicted route or destination can be scrolled off to reveal a lower card in the stack that shows another predicted route or destination.

Also, as mentioned above, the selection of any predicted destination or predicted route in a display 910 in some embodiments causes the navigation application 298 to generate a turn-by-turn navigation presentation for guiding the user from the device's current location to the predicted destination. The turn-by-turn navigation correlates the device's current position (as identified by location engine (e.g., GPS) of the device) at multiple locations along the route to the navigate route that it presents so that it can provide real time maneuver instructions to guide the user to the destination.

Figure 10:
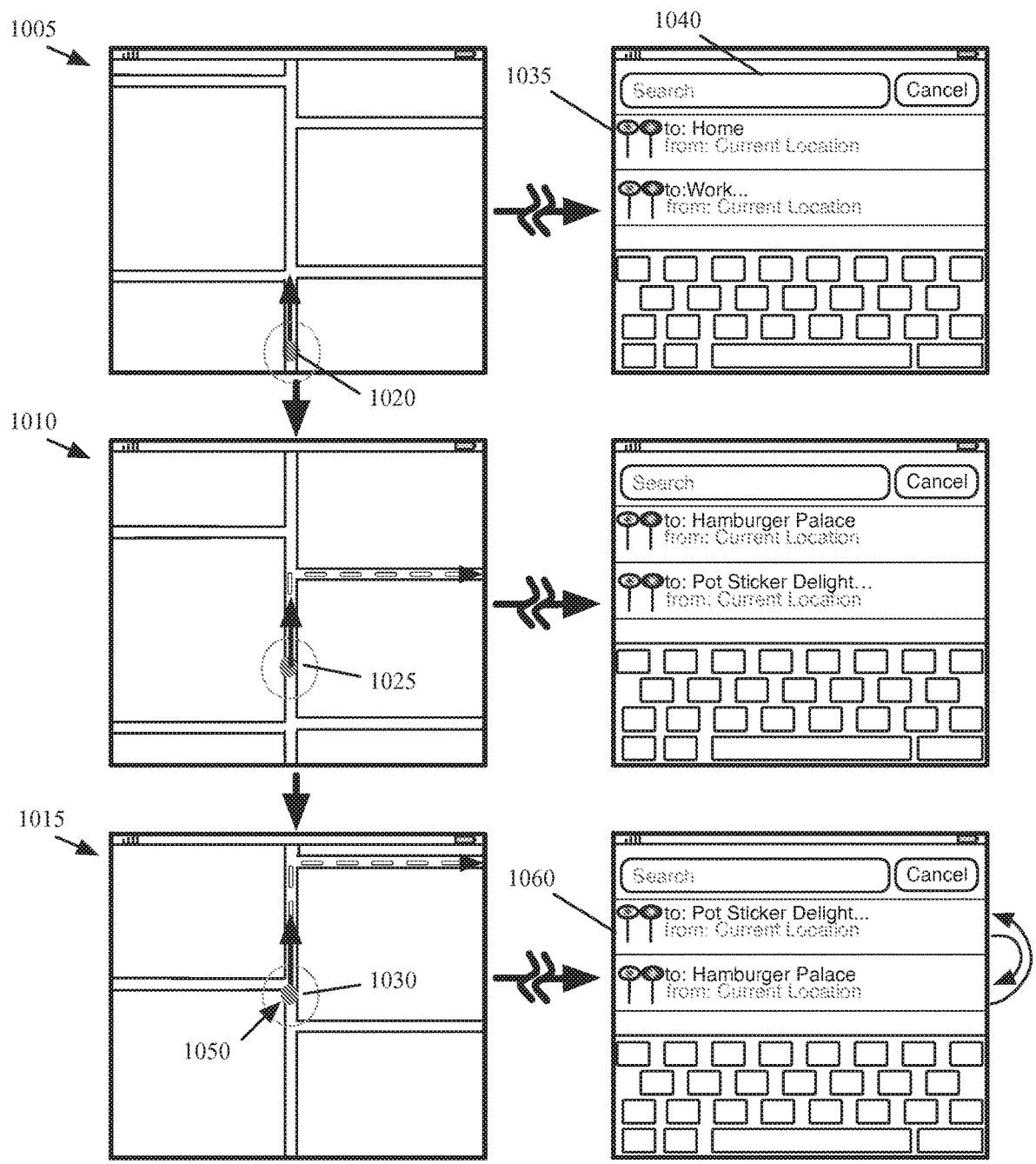
FIG. 10 illustrates an example of the map application dynamically defining and updating its "recents" suggestions based on predicted destinations and/or routes that it receives from the route predictor.

In some embodiments, the predicted destinations and/or routes are used to dynamically define and update parts of the map application functionality. FIG. 10 illustrates an example of the map application dynamically defining and updating its "recents" suggestions based on predicted destinations and/or routes that it receives from the route predictor. This example is illustrated in terms of three operational stages 1005, 1010 and 1015 of the device that correspond to three different positions 1020, 1025 and 1030 of the user along a route.

In each stage, the map application displays a "Recents" window 1035 that opens when the search field 1040 is selected. This window is meant to provide suggestions for possible destinations to a user. When the map application does not have a predicted destination, the Recents window 1035 displays initially pre-specified destinations, such as the user's home and the user's work, as shown in the first stage 1005. This stage corresponds to a start of a trip 1020. At this time, the prediction engine has not identified a predicted destination. In addition to displaying the pre-specified destinations, some embodiments may additionally display for selection recently entered locations obtained from recent tasks performed on the device or on another device by the same user. For instance, the Recents window 1035 may include a location of a restaurant for which the user recently searched in a web browser, the address of a contact that the user recently contacted (e.g., via e-mail, message, phone call, etc.), the location of a device of a contact that the user recently contacted (if the user has permission to acquire that information), a source location of a recent route to the device's current location, etc.

The second stage 1010 shows that at a later position 1025 along the trip, the route predictor identifies two possible destinations, which are the Hamburger Palace and the Pot Sticker Delight. The prediction engine at this stage provides these two possible destinations to the map application, having assigned the Hamburger Palace a higher probability of being the actual destination. Accordingly, in the second stage 1010, the map application replaces in the Recents window 1035 the default Home and Work destinations with the Hamburger Palace and Pot Sticker Delight destinations as these have been assigned higher probabilities of being the eventual destination than the default choices (which may also have been assigned some small but non-zero probability of being the user's destination). Based on the assignment of a higher probability to Hamburger Palace as the eventual destination, the map application displays the Hamburger Palace higher than the Pot Sticker Delight in the Recents window 1035.

However, as illustrated in stage 1015, after the user passes an intersection 1050 shown in the third position 1030 along the route, the prediction engine (which regularly recalculates probabilities for possible destinations, in some embodiments) determines that the Pot Sticker Delight restaurant now has a higher probability than Hamburger Palace of being the eventual destination. The engine notifies the map application of this change, and in response, the map application swaps the order of these two choices in the Recents window 1060.

In some embodiments, the prediction engine sends a list of possible destinations and their probabilities to the map application (e.g., a particular number of destinations, or all destinations above a particular probability) on a regular basis. In other embodiments, the map application sends a request to the route predictor for a given number of possible destinations/routes with the highest probabilities in a particular order. Also, while the example illustrated in FIG. 10 shows the predicted locations and/or routes updating in real time with the movement of the device for the maps application's Recents window, other embodiments do not perform this real time updating for the Recents window. Rather, these embodiments have the route predictor periodically generate predicted routes and/or destinations and account for these predictions in the presentation of the various destinations, routes, and search options in the Recents window.

In addition to the map application, many other applications operating on the mobile device can be clients for the predictions made by this device's route predictor. For instance, notification services of the device can be such clients. In some embodiments, the notification services of the device are managed by a notification manager, as mentioned above. This manager handles the notification services of the device. For instance, in some embodiments, the notification manager generates and presents a notification center, which provides notification about calendared events, unread email and text messages, and other data for notifying a user. Also, in some embodiments, the notification generated and present notification banners while the device screen is unlocked and locked. Accordingly, in some embodiments, the prediction processor provides route and traffic data to the notification manager, so that this manager can provide route and/or traffic data in the notification center or notification banners.

Figure 11:
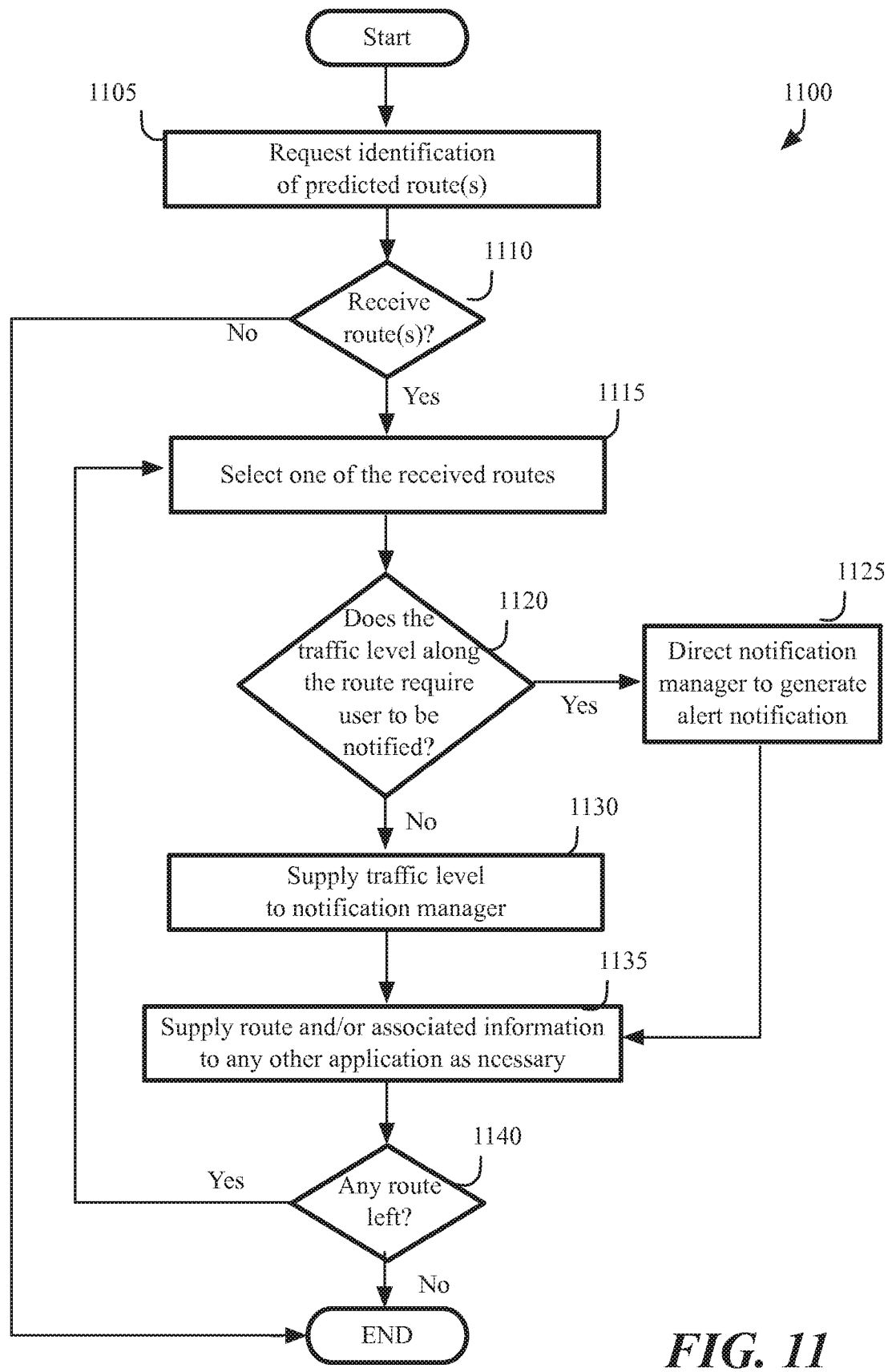
FIG. 11 illustrates a process that the route prediction processor of some embodiments performs to provide traffic data to the notification manager.

FIG. 11 illustrates a process 1100 that the route prediction processor 222 or 322 performs in some embodiments to provide traffic data to the notification manager. The route prediction processor initiates this process at different times in different embodiments. In some embodiments, the prediction processor performs this process on-demand and/or performs this process periodically at fixed intervals. For instance, the prediction processor of some embodiments performs this process every 15 minutes, 30 minutes or 60 minutes.

In other embodiments, the prediction processor first directs the destination selector 220 or 320 to generate a list of predicted destinations for a particular time interval (e.g., for a day, for 12-hrs in a day, for every 6-hrs in a day, etc.). During the particular time interval, the destination selector of some of these embodiments does not update the predicted destinations again, unless one set of events occurs. For instance, in some embodiments, the destination selector 220 updated a previously specified list of predicted destinations earlier than its periodic re-computation, when the harvested address data storage receives a new location for a new or existing appointment. In other embodiments, the destination selector does not update the predicted destinations for the particular time interval, as it only computes the list of predicted destinations for a particular time interval only once.

In some embodiments, different predicted destinations in the list of predicted destinations are for different time periods during the particular time interval that the list is meant to cover. Accordingly, the destination selector of some embodiments specifies a relevancy time period for each identified predicted destination in the list of predicted destinations for the particular time interval. A predicted destination's relevancy time period specifies the duration of time during the particular time interval in which the predicted destination is a predicted destination for the device. Usually, different predicted destinations have different relevancy time periods. But two different predicted destinations can overlap and in some cases, two different predicted destinations can be exactly the same, in some embodiments.

For each predicted destination, the route prediction processor 222 or 3222 of some embodiments performs the process 1100 once within an examination time period before the relevancy time period, or several times periodically during the examination period before the relevancy period. In some embodiments, the examination and relevancy time periods for a predicted destination may overlap.

To illustrate these concepts, assume that the device travels between San Francisco and Cupertino every morning and between Cupertino to San Francisco every afternoon. Also assume that the device usually starts to travel to Cupertino around 8:30 to 9:30 am, and usually starts to travel to San Francisco around 5:30 to 6:30 pm. Accordingly, in some embodiments, the destination selector 220 or 320 identifies Cupertino as a first predicted destination for the morning, and San Francisco as a second predicted destination for the afternoon. The route prediction processor 222 or 322 then performs the process 1100 once within an hour before 8:30 am in some embodiments, or several times from 7:30-9:30 am in other embodiments. Similarly, the route prediction processor 222 or 322 performs the process 1100 once within an hour before 5:30 pm in some embodiments, or several times from 4:30-6:30 pm in other embodiments.

As shown in FIG. 11, the process 1100 initially requests (at 1105) the identification of one or more predicted routes for one or more predicted destinations. In some embodiments, each time that the process requests that one or more predicted routes be identified at 1105, it also requests that one or more predicted destinations be identified at 1105. However, in other embodiments, absent receiving data that would indicate the benefit of re-identifying the predicted destinations for a time interval (e.g., for several days, for a day or for a portion of a day), the process 1100 does not ask for new predicted destinations to be identified at 1105, but instead simply requests (at 1105) the identification of one or more predicted routes to one or more predicted destinations that were previously identified for that time interval (e.g., for those several days, for that day, or for that portion of the day).

When routes have been predicted previously for predicted destinations, the process 1100 in some embodiments simply requests (at 1105) updates to traffic information (e.g., traffic congestion data, accident data, road closure data, etc) for the previously specified routes. In some embodiments, the traffic data that is received also specifies where there is a blockage (or other major incident) on the road that would require the re-routing of path. In some such embodiments, such traffic data is supplied with a new route that detours around the blockage (or other major incident).

In some embodiments, even when routes have been previously identified for predicted destinations, the process 1100 still requests (at 1105) the re-identification of these mutes. This can be because in some cases the starting location of the route (e.g., the device's current location) has changed or that the device is no longer moving along the previously specified route. Also, in some embodiments, the traffic data is bundled with the route data and it is easier to obtain traffic data for a new route than obtain the same for a previously specified route. Some embodiments also request the re-identification of predicted routes (at 1105) because transient road closures might cause the external route generating services to provide different routes at different times of the same day.

At 1110, the process determines whether any predicted routes were received. No predicted routes might be received for a time interval when no predicted destinations exist for that time interval. For instance, in some embodiments, the process 1100 runs every N minutes (e.g., 30 minutes, 60 minutes) to identify predicted destinations and predicted routes for a time interval of M minutes after the time for running the process. In some of these iterations, the process might not identify any predicted destinations for an M-minute time interval for one of the iterations of the process 1100.

When the process determines (at 1110) that it has not identified any predicted routes, it ends. Otherwise, at 1115, it selects one of the received predicted routes for one of the predicted destinations. As mentioned above, the predicted route in some embodiments is a "best" route between the two locations (e.g., the current location and a predicted destination) specified by the process 1100, while in other embodiments it is a route that was predicted and generated based on location data along the user's previously traveled routes. In this latter case, the route is based on intermediate breadcrumb locations that allow there to be some degree of confidence that the user has traveled along that route previously. As further described below, the difference between the "best" route and a breadcrumb-based route affects how some embodiments provide traffic data regarding the predicted route.

At 1120, the process 1100 determines whether the current traffic level along the routes requires the user to receive a notification. To do this, the process relies on traffic data that is returned by the route generating service in some embodiments, while in other embodiments, the process contacts a traffic service to ascertain the traffic along a route after the process receives the route.

In some embodiments, the process 1100 uses the route prediction engine 226 or 326 to generate a route. This engine, in turn, uses an external routing service that returns the route and/or returns the route's current travel time and its historical travel time. When the current travel time is worse than the historical travel time, the difference between current and historical travel time expresses a congestion value (e.g., a congestion score) that quantifies the degree of traffic congestion. For example, when the historical travel time is 60 minutes and the current travel time is 90 minutes, a traffic congestion score can be computed as 0.5, by taking 30 minutes (the difference between current and historical travel times) and dividing 60 minutes. This score shows the traffic congestion to be 50% worse than the historical travel time. Conversely, when the historical travel time is 60 minutes and the current travel time is 66 minutes, the traffic congestion score can be computed as 0.1, which show the current traffic to be 10% worse than the historical travel time. Some embodiments classify traffic that is 0-25% worse than usual as moderate traffic, 25-50% as heavy traffic, and 50%+ as very heavy traffic. Some of these embodiments ignore traffic congestion scores that are less than some percentage (e.g., 5%) to account for errors in the data.

Accordingly, to determine (at 1120) whether the current traffic level along the route requires the user to be notified, the process 1100 in some embodiments compares the current and historical traffic data that is returned by the external routing service. When this data specifies a traffic congestion that is worse than a specific level (e.g., at least 5% worst than the historical level), the process 1100 determines (at 1120) that is should notify the notification manager to generate the appropriate alerts for the user, and thereby transitions to 1125, where it can so direct the notification manager.

At 1125, the process provides different types of notifications in different embodiments because of the nature of the predicted mute. For instance, when the predicted mute is based on intermediate breadcrumb locations that allow there to be some degree of confidence that the user has traveled along that route previously, the notification manager in some embodiments presents a traffic alert banner regarding this route's current traffic congestion. In some of these embodiments, the notification manager also places a notice in the notification center that traffic along a particular predicted route is worse than usual or much worse than usual.

On the other hand, when the predicted route is a "best" route between the two locations (e.g., the current location and a predicted destination), the notification manager in some embodiments only places the notice in the notification center that traffic along a particular predicted route is worse or much worse than usual. This general, non-intrusive notice is commensurate with the nature of the "best" route, which is not tied to intermediate locations along a route traveled previously by the device. In other words, a notification banner is not provided for the traffic congestion along a "best" route, because it is not certain that the user will take that route as there is prediction architecture of some embodiments does not have any data about the device's intermediate travel path.

From 1125, the process 1100 transitions to 1135, which will be further described below.

The process transitions to 1130 when it determines (at 1120) that the current traffic level along the route does not require the user to be notified. At 1130, the process supplies the traffic data for the route to the notification manager. This traffic data for the selected route indicates that the current traffic is better or the same as the usual traffic along the route. As further described below, the notification manager uses this data in some embodiments to place a notification in the notification center regarding the average or better than average traffic congestion.

From 1130, the process transitions to 1135. At 1135, the process supplies the mute and/or the route's associated information to one or more other applications. Several examples of such other applications and their uses for the predicted route and its associated information were described above by reference to FIGS. 2, 3 and 4. All these examples are equally applicable to the process 1100. Similarly, all the discussion regarding process 1100 is equally applicable to the prediction architectures of FIGS. 2 and 3, and the process 400 of FIG. 4.

After 1135, the process 1100 determines (at 1140) whether it has examined all the routes received in response to the request at 1105. If not, the process returns to 1115 to select another route and to repeats its subsequent operations for this route. Otherwise, the process ends.

The embodiments described above identify traffic congestion along a route by comparing current travel time and historical travel time for the route. Such an approach, however, might hide congestion that is focused in a portion of the route, especially in longer routes. For instance, in a 90-minute route, a 10 minute backup along one portion of the route might not be seen as significant congestion when comparing the extra 10 minutes over the entire route. However, it might be desirable to provide notification regarding congestion along a portion of the route. Accordingly, some embodiments identify traffic congestion along different portions of the route. For example, some embodiments obtain from the traffic or mute generation servers historical and current travel times for different segments of the route, and identify unique and possibly different traffic congestion along different segments by comparing current travel time of each segment with that segment's historical travel time value. By computing traffic congestion along different segments of the route, the notification services of some embodiments can provide notification regarding any traffic congestion along any segment of the route. In some embodiments, the notification reports the traffic congestion in a route segment along with any reported traffic incident that is within that route segment.

Figure 12:
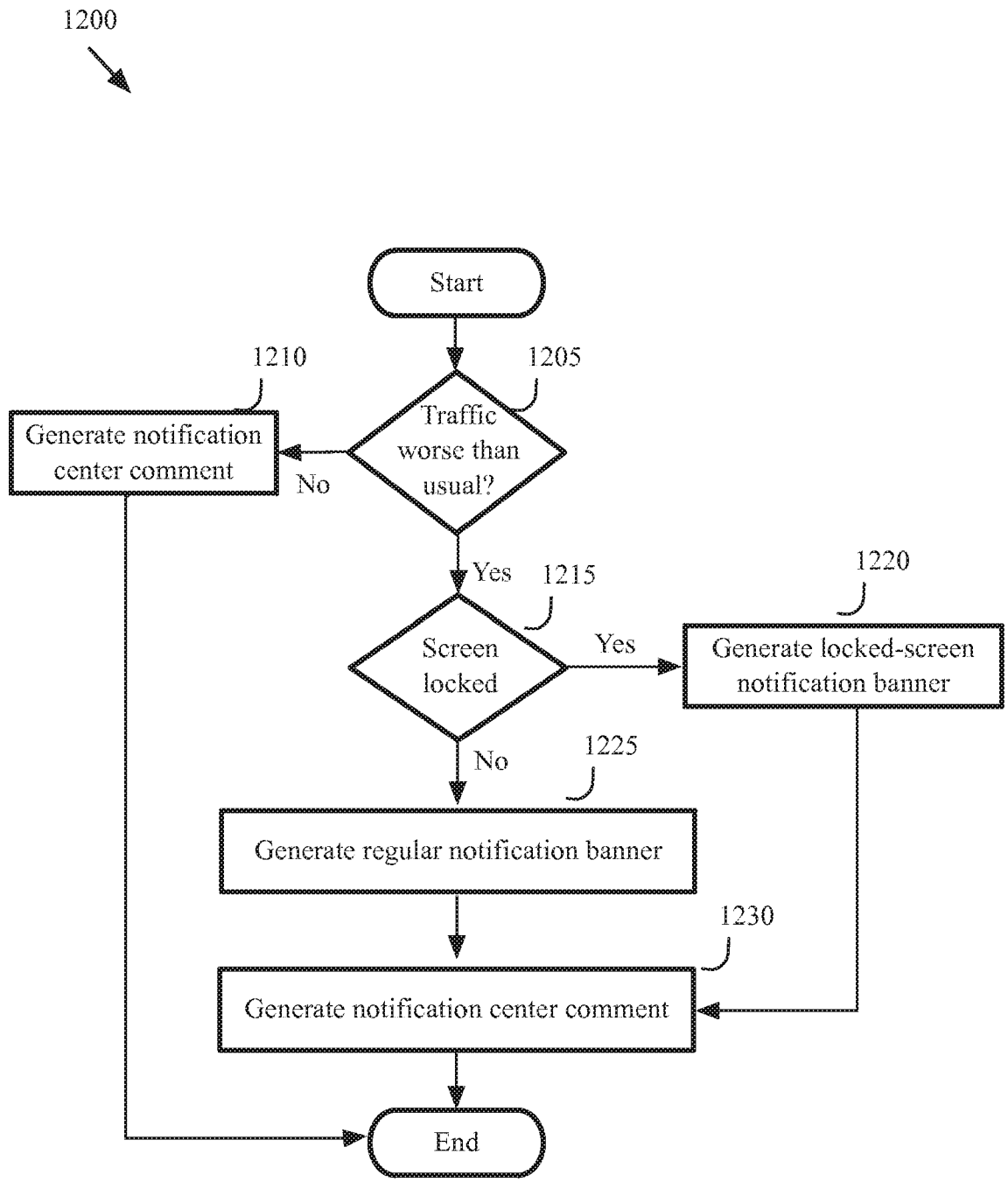
FIG. 12 illustrates a process that the notification manager performs in some embodiments when it receives traffic data for a predicted route to a predicted destination.

FIG. 12 illustrates a process 1200 that the notification manager performs in some embodiments when it receives traffic data for a predicted route to a predicted destination. In some embodiments, this process is performed only when the predicted route is based on intermediate breadcrumb locations that allow there to be some degree of confidence that the user has traveled along that route previously. In other embodiments, this process is also performed when the predicted route is the "best" route between two locations, and it is not tied to intermediate locations along a route traveled previously by the device.

As shown in FIG. 12, the process 1200 initially determines (at 1205) whether the traffic data specifies that the traffic congestion along the predicted route is worse than usual (e.g., worse than the historical average). If not, the process places (at 1210) a notice in a notification center regarding the average or better than average traffic congestion, and then ends.

Otherwise, the process determines (at 1215) whether the device's screen is currently locked. In some embodiments, the device has a touch-sensitive screen that allows touch interactions with the device's operating system and applications. This touch-sensitive screen can be locked to provide reduced or no touch functionality and thereby avoid unintentional UI selection.

When the screen is locked, the process generates (at 1220) a locked-screen notification banner to provide a notification that the traffic congestion along the predicted route is worse than usual, and then transitions to 1230, which is further described below. One example of such a locked-screen display will be described below by reference to FIG. 15. Given that the locked-screen notification is intrusive and given that the user may only care for it if it is about a route that the user usually takes, the locked-screen notification is only provided in some embodiments when the predicted route is based on intermediate breadcrumb location data relating to the device's past intermediate route locations. However, as mentioned above, other embodiments provide such locked-screen notification banners for all predicted routes, including the "best" routes described above.

When the screen is not locked, the process generates (at 1225) a notification banner on a page that the device is showing on the unlocked screen. Examples of such notification banners will be described below. After 1225, the process places (at 1210) a notice in a notification center regarding the worse than average traffic congestion, and then ends.

Figure 13:
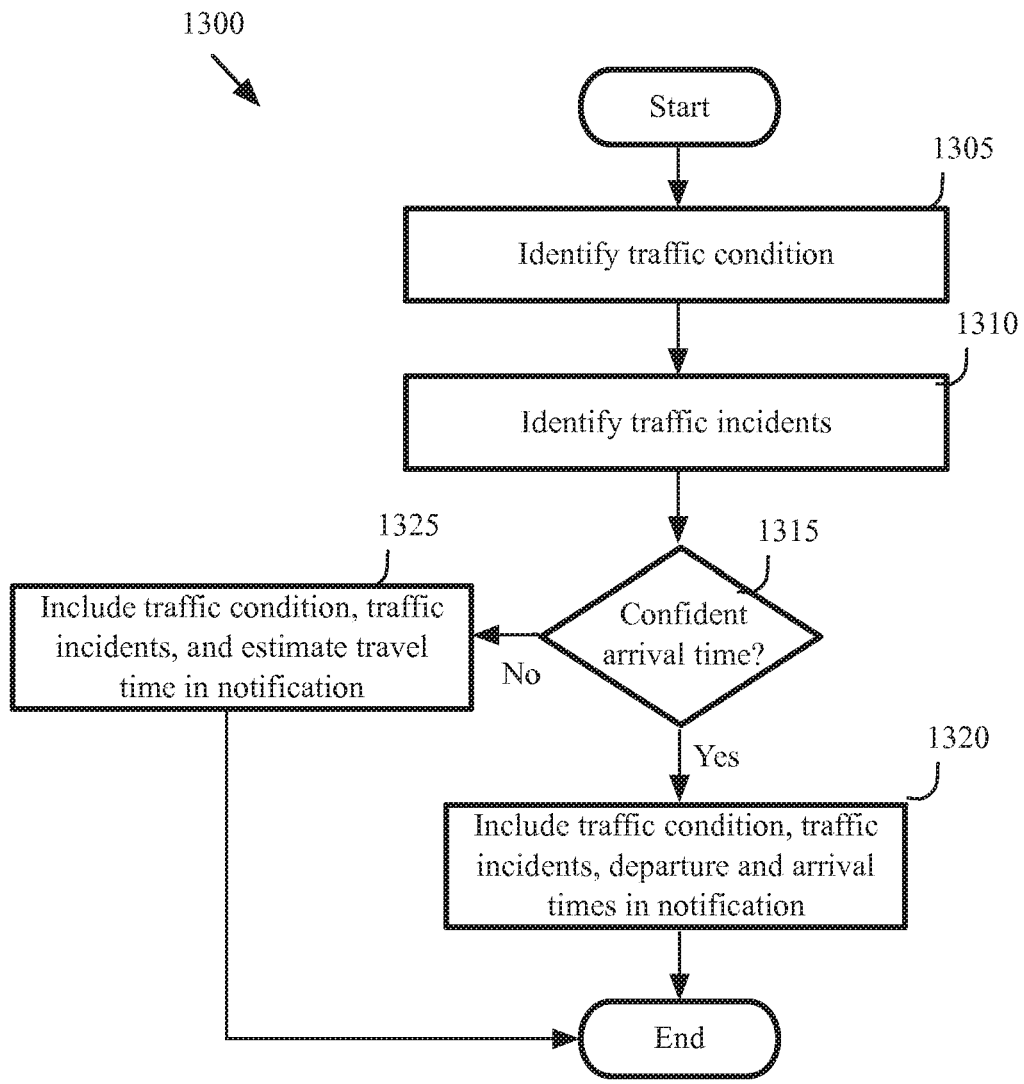
FIG. 13 illustrates a process that some embodiments use to adaptively generate a notification for display in a notification comment or in a banner.

FIG. 13 illustrates a process 1300 that some embodiments use to adaptively generate a notification for display in a notification comment (e.g., a comment in a notification center managed by a notification manager) or in a banner (e.g., a notification banner generated by a notification manager). This process adaptively generates the notification based on a confidence value that expresses the level of confidence in the desired or predicted arrival time for a predicted route. Also, the notification includes three components in this example, which relate to a traffic condition, a traffic incident (if any), and an expression of the travel time. The travel time is specified as an estimated time of travel when the process is not as confident regarding the arrival time, or specified in terms of expected departure and arrival times when the process is confident regarding the arrival time.

As shown in FIG. 13, the process 1300 initially identifies (at 1305) the traffic condition along a predicted route. As mentioned above, the traffic conditions along the entire route or along different segments of the route can be computed from the historical and current travel times provided by an external route generator or a traffic server. Based on such values, the process 1300 specifies the traffic condition along the route or a segment of a route in normative expressions, such as heavy traffic, moderate traffic, no traffic, etc. In other embodiments, the traffic server or route generation server provides the expression for the traffic along the route or a portion of the route to the process 1300.

Next, at 1310, the process 1300 identifies any traffic incidents along the route. Examples of such incidents include traffic accidents, construction, lane closures, road closures, debris on the road, etc. At 1310, the process generates an expression to capture the traffic incident, if any. For each different type of incident, the process uses one or more different traffic incident expressions in one or more different situations (e.g., one type of expression when specifying arrival time and another type of expression when specifying estimated travel time). In some embodiments, the process uses a look-up table to store and retrieve incident expressions. In some embodiments, the process 1300 also uses such a look-up table and/or adaptive formulation of different expressions to express traffic conditions 1305.

After 1310, the process determines (at 1315) whether the expected arrival time is known with a high degree of confidence. When the arrival time is derived from a calendared time for an appointment, the arrival time is a desired arrival time and it is known with a high degree of confidence. On the other hand, when the destination is a machine-generated destination, the arrival time is derived from a range of time that corresponds to the usual period of time that the device arrives at the predicted destination. In such situations, the arrival time is known with a sufficient degree of confidence when the arrival range of time is sufficiently small, while it is not known with a sufficient degree of confidence when the arrival range of time is not sufficiently small.

When the process determines (at 1315) that the arrival time is known with a high degree of confidence, the process expresses (at 1320) the travel time in terms of the expected arrival time. For instance, in some embodiments, it generates the travel time expression as "to arrive at 5, you have to leave by 4" or "you need to leave by 4 if you want to arrive at 5." At 1320, the process also generates the notification in terms of (1) the generated traffic condition expression, (2) the generated traffic incident expression, if any traffic incident exists, and (3) the travel time expression that specifies the arrival time. After 1320, the process ends.

When the process determines (at 1315) that the arrival time is not known with a high degree of confidence, the process expresses (at 1325) the travel time in terms of an estimated time of travel. For instance, in some embodiments, it generates the travel time expression as "expected travel time is 25 minutes." At 1320, the process also generates the notification in terms of (1) the generated traffic condition expression, (2) the generated traffic incident expression, if any traffic incident exists, and (3) the estimated time of travel. After 1320, the process ends.

While the process 1300 generates a notification that includes traffic condition, traffic incident (if any), and travel time expression, the adaptive notification generation process of other embodiments does not include all of these components and/or includes a different combination of components.

Figure 14:
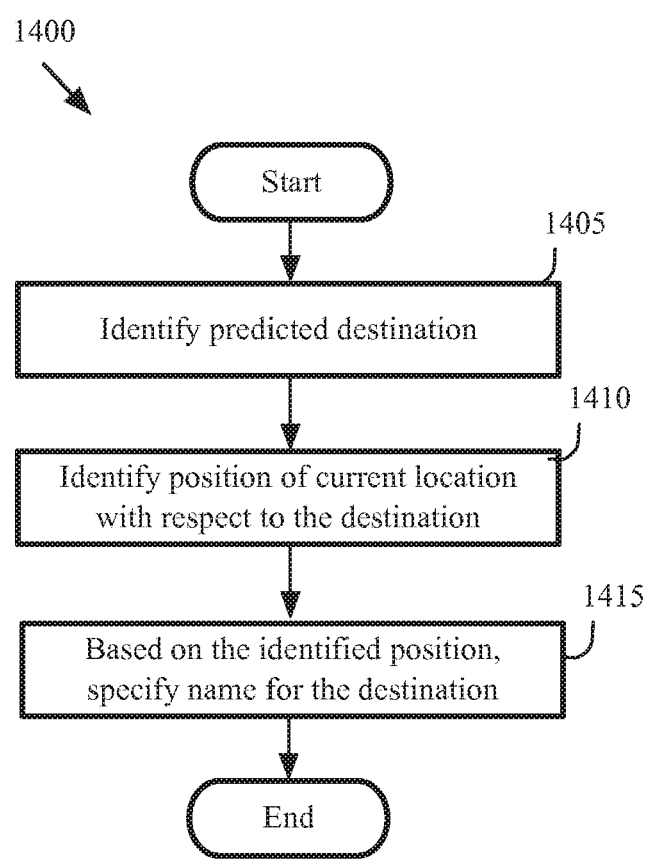
FIG. 14 illustrates a process that some embodiments use to adaptively name the destination of a predicted route.

FIG. 14 illustrates a process 1400 that some embodiments use to adaptively name the destination of a predicted route. This adaptive naming process is used to name the predicted destination in a variety of settings, such as (1) notification banners (e.g., banners illustrated in FIGS. 15-18 described below), (2) notification comments (e.g., traffic comments in notification centers illustrated in FIGS. 19-25 described below). (3) map displays of predicted routes and predicted destinations, (4) information window displays (e.g., route information windows illustrated in FIGS. 6-9) that accompany map displays of predicted routes and that are presented adjacent to the predicted routes. This naming process adaptively names the predicted destination based on the position of current location of the device and the predicted destination.

As shown in FIG. 14, the process 1400 initially identifies (at 1405) the predicted destination. In some embodiments, the predicted destination is identified as part of another process, e.g., as part of a route generation process. The address of the predicted-destination is not always exactly expressed in terms of a numbered street address (e.g., a building or land street address), or is expressed in terms of a numbered street address but this address might not be exactly correct. For instance, when the predicted-destination is a machine-generated destination (e.g., a destination that is identified through machine learning), the exact numbered street address for the destination is generated but this address might not be exactly correct.

Because of this imprecision, the adaptive naming process 1400 adaptively names the destination based on the distance between the current device location and the predicted destination, so that it can identify the destination with a useful name descriptor while hiding the imprecision in its address as much as possible. Specifically, after 1405, the process identifies (at 1410) the position of the current location with respect to the destination, and based on this position, it adaptively names (at 1415) the destination.

The operations 1410 and 1415 are performed differently in different embodiments. For instance, in some embodiments, the process identified (at 1410) the distance between the current location and predicted destination, and based on the identified distance value, it names the predicted destination. In other embodiments, the process determines (at 1410) whether the current location and predicted destination are in the same city. If so, it expresses (at 1415) the predicted destination in terms of the neighborhood or street of the predicted destination, but not the numbered street address of the predicted destination. For example, when the current location is Cupertino and the predicted destination is 1 Stockton St., San Francisco, the process 1400 in some embodiments names the predicted destination as San Francisco. But if the current location in this example is an address in the Noe Valley neighborhood of San Francisco, then the predicted destination is Stockton Street. This naming approach allows the process 1400 to provide a useful name for the predicted destination while hiding any imprecision in the predicted destination's address as much as possible.

To perform the operations 1410 and 1415, the process 1400 in some embodiments uses an address database that allows each physical address to be classified in terms of multiple hierarchical levels of address categories or characteristics. For example, in the U.S., some embodiments can group addresses into the following hierarchical categorization levels: states, regions, cities, neighborhoods, streets, and numbers on streets. For each physical address, some embodiments specify a value for each of these categories (e.g., states, regions, cities, neighborhoods, streets, and numbers). So, a physical address will have a state, a region, a city, a neighborhood, a street, a street number, etc.

The process in some embodiments retrieves (at 1410) the category values for the current location and the predicted destination from the address data storage, and then compares (at 1415) the category values to identify the last matching category level in the hierarchy that the current location and the predicted destination have the same values. In these embodiments, the process then names the predicted destination with the predicted-destination address value at the category level after the last matching category level. Accordingly, when the current location and the predicted destination are in different cities in the same state, the process in these embodiments uses the city of the predicted destination to name this location. On the other hand, when the current location and predicted destination are in the same city, the process in these embodiments uses the predicted destination's neighborhood to name it, if the neighborhood data is available, or uses the predicted destination's street to name it, if the neighborhood data is not available.

In some embodiments, the process 1400 is performed repeatedly in order to adjust the name of the destination as the device gets closer to the predicted destination (i.e., as the current location of the device approaches the predicted destination). For example, the predicted destination is identified by the city name when the current location is outside of the city, but it is re-specified to its street name when the current location is within the same city. This adjustment is done only up to a certain level of specificity (e.g., only up to going from a city or neighborhood descriptor to the street descriptor) in some embodiments.

Figure 15:
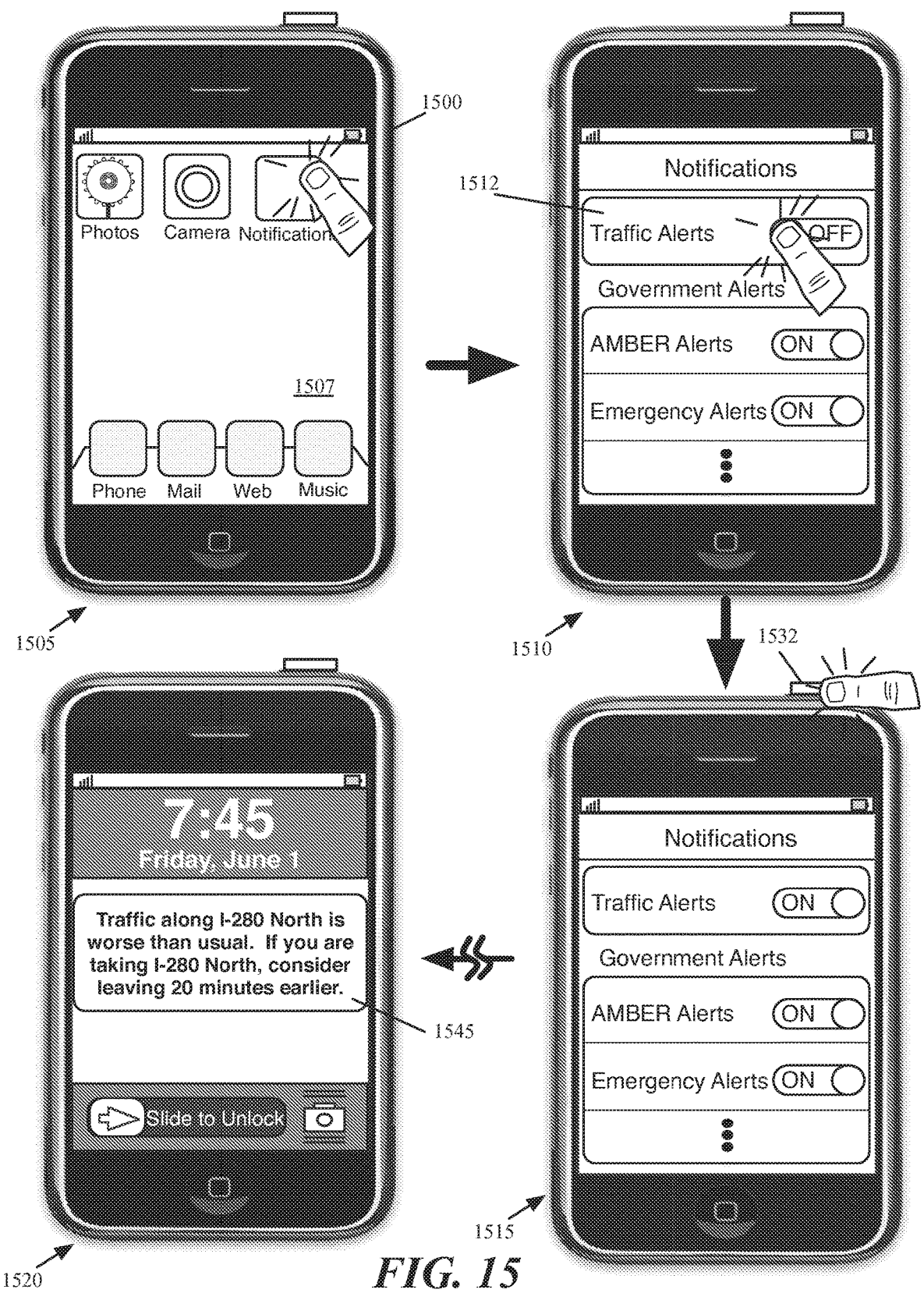
FIG. 15 provides an example of how the device's notification manager in some embodiments uses the predicted route data to provide automated notification to a user.

FIG. 15 provides an example of how the device's notification manager in some embodiments uses the predicted route data to provide automated notification to a user. In some embodiments, the device has a notification service called Traffic Alerts, which when enabled, allows the user to receive traffic alerts as automated prompts while the device screen is on or off. In the example shown in FIG. 15, the notification alerts are provided while the screen is locked.

The example in this figure is described in terms of four stages 1505-1520 of operations of the device. The first stage 1505 shows the user selecting the notification manager icon on a page 1507 of the device 1500. In some embodiments, the notification manager does not have an icon on the page 1507, but rather is made available through a setting menu that is presented when a setting icon on page 1507 or another page of the device's UI.

The second stage 1510 shows the presentation of several notification controls, one of which is the traffic alert affordance 1512. This affordance allows the traffic alert service of the notification manager to be turned on or off. The second stage shows the user turning on the traffic alert service, while the third stage 1515 shows the notification page after this service has been turned on. The third stage 1515 also shows the user turning off the screen of the device by pressing on a screen-off button 1532 of the device.

The fourth stage 1520 is a duration of time after the user has turned off the screen of the device. During this duration, the device's route predictor has identified that the user will likely take a predicted route to a predicted destination and has also determined that this route is much more congested than usual. The prediction engine relays this information to the notification manager of the device, and in response, the notification manger generates a traffic alert prompt 1545 that is illustrated in the fourth stage. This prompt notifies the user that traffic along the user's predicted route is worse than usual and that the user might wish to consider leaving 20 minutes earlier. In some embodiments, the notification manager computes the time value for leaving earlier (i.e., the 20 minutes in this example) by subtracting the historical travel time from the current travel time. The result of this subtraction is augmented by a small percentage (e.g., is multiplied by 1.05 for a 5 percent increase) to provide some cushion in the time budget for leaving earlier.

In some embodiment, the locked screen traffic banner 1545 is initially presented by itself in the center of the page. After receiving another notification banner or after a transient time delay, this banner becomes a smaller banner that is then displayed with other notification banners. Also, in some embodiments, a user can select an individually displayed traffic banner or a group displayed traffic banner (e.g., through a sliding swipe touch gesture) to unlock the phone and be presented by additional data regarding the notified traffic alert. For instance, in some embodiments, a map view of the traffic congestion is provided, in other embodiments, alternative routes are provided or displayed on the map, and in still other embodiments, additional traffic data is provided in a text format. Also, as further described above, different types of traffic alerts are provided in some embodiments based on different conditions.

Figure 18:
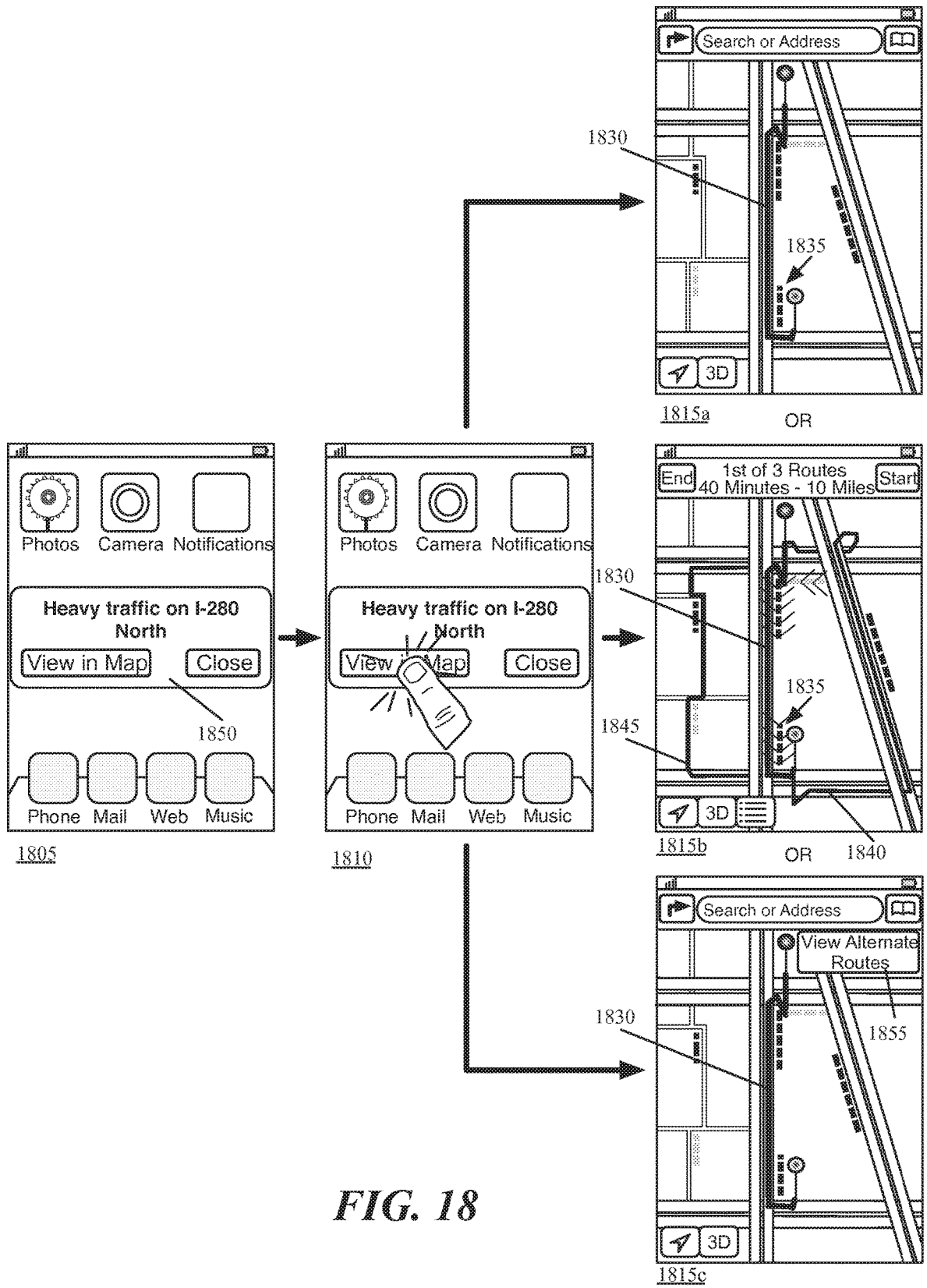

FIGS. 16, 17, and 18 illustrate examples of traffic banners while the device's screen is unlocked. Different embodiments display such banners differently. For instance. FIG. 16 illustrates that some embodiments provide such banners 1605 at the top of the display 1600. In some of these embodiments, such a banner 1605 is presented with an animation that shows it rotatably scrolling into the screen display and then after a transient time, rotatably scrolling out of the screen display.

FIGS. 17 and 18 illustrate that the notification manager of some embodiments presents notification banners 1750 in the middle of the screen. In some embodiments, these banners pop open in the middle of the screen and require the user to either view the traffic congestion on a map or to close the notification banner. FIG. 17 illustrates the case where the notification banner is presented in the middle of the screen and then closed by the user. In this example, traffic along 1-280 north is reported as being heavy, but the user chooses not to view this traffic in the map.

FIG. 18 illustrates alternative embodiments for presenting the traffic and alternative route options in the map when the user selects this option in a notification banner 1850. Specifically, it illustrates a first stage 1805 that presents the notification banner 1850 regarding the heavy traffic along 1-280 N, a second stage 1810 that shows the user selecting the option to view the traffic congestion in the map, and a three alternative third stages 1815*a-c* that present the three different ways for providing alternative route options in the map.

The first alternative 1815*a* does not provide the user with any alternative route or any option to direct the device to provide an alternative route. It only displays the route 1830 and congestion markers 1835 along the route. The second alternative 1815*b* displays the route 1830, the congestion 1835 along this route, and two alternative routes 1840 and 1845 and traffic along these routes. Like the first alternative 1815*a*, the third alternative 1815*c* does not provide alternative routes. In place of these alternative routes, it provides a selectable option 1855 for directing the device to present alternative routes to the route 1830 being presented.

Instead of, or in addition to, providing traffic data in notification banners, the notification manager of some embodiments also provides such data in a notification center. In some embodiments, the notification center is a set of one or more display areas (e.g., display pages) that collectively provide notifications data generated by the notification manager or routed to the notification center by the notification manager. FIGS. 19-23 illustrate four different ways that the notification manager in different embodiments provides traffic data in a notification center.

Figure 19:
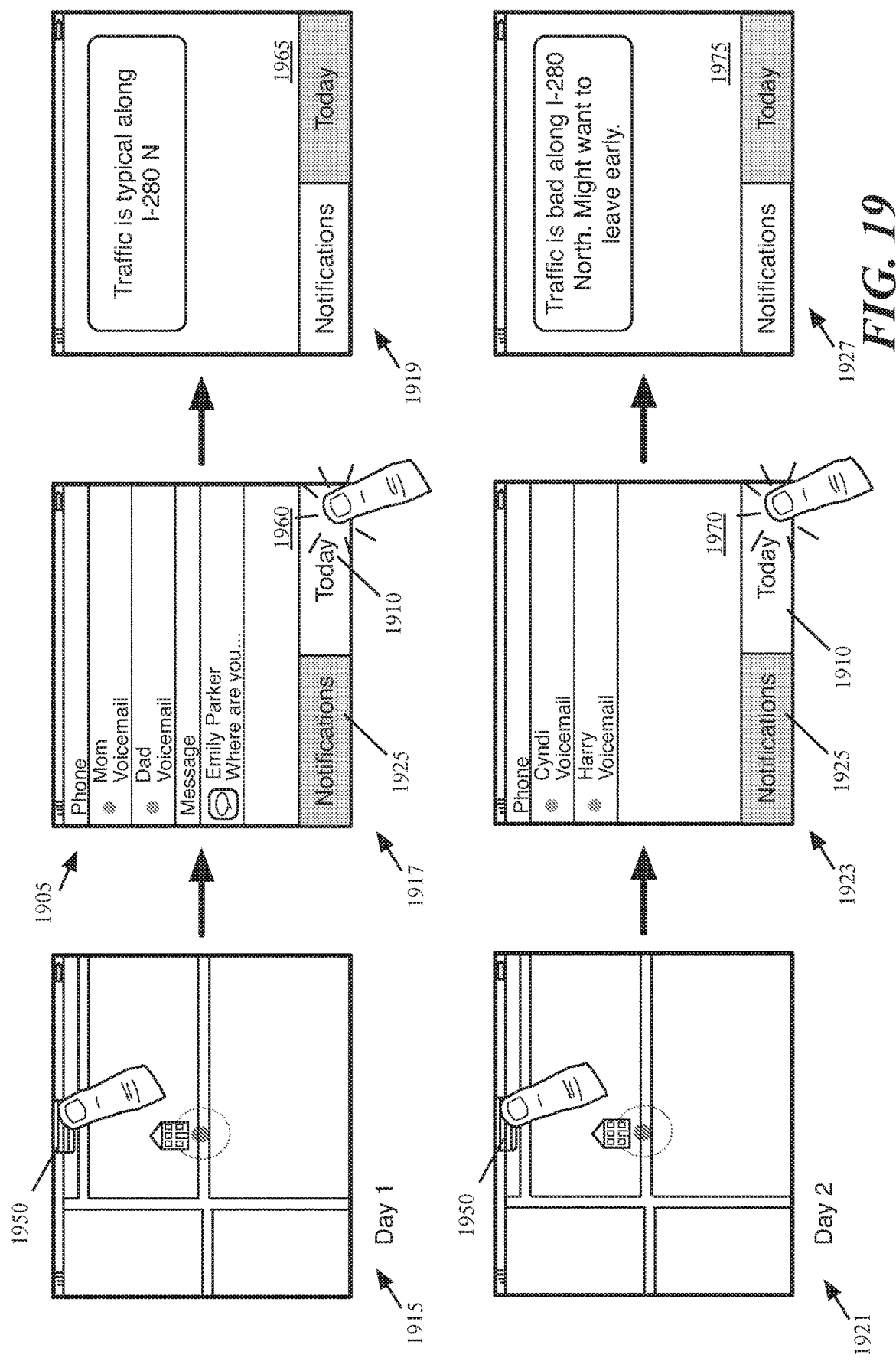

FIG. 19 illustrates a notification center 1905 of some embodiments. This notification center is a window that can be manually requested by a user of the device whenever the user wishes to see an overview of alerts that are provided by various applications being executed on the device (e.g., voicemails and missed calls from the phone application, text messages from a messaging application, etc.). The notification center display 1905 of some embodiments includes a today tab 1910 that, when selected, illustrates information about that day, which in some embodiments includes traffic along predicted and/or in progress routes, weather condition for that day, one or more calendared appointment, etc.

FIG. 19 illustrates the type of information that the today tab can provide in terms of the traffic along a predicted route on two consecutive days. Each day is shown in terms of three operational stages of the device. On the first day 1915, the user manually pulls on the notification center affordance 1950 in the first stage 1915. As shown by the second stage 1917, this operation results in the presentation of a first notification display area of the notification center 1960. This display area presents the enabled notification feature of this display (as indicated by the greyed out color of the notification affordance 1925) and also presents a variety of notification alerts from a variety of applications. The second stage 1917 also shows the user's touch selection of the today affordance 1910.

As shown by the third stage 1919, the selection of this affordance results in the presentation 1965 of the today display area, which states that traffic along 1-280 north is typical for the predicted time of the user's departure. In some embodiments, the presented traffic data (i.e., the traffic notice) is reported for the "best" route that was predicted for the device based on the predicted destination for the device's current location without reference to the device's previous intermediate locations. In other embodiments, the traffic notice is provided for a predicted route that is based on the device's previous intermediate locations as it previously traveled to the predicted destination.

The expression of traffic as typical or atypical is highly useful because certain routes are always congested. Accordingly, a statement that the route is congested might not help the user. Rather, knowing that the traffic is better than usual, worse than usual, or the same as usual is more useful for the user. In some embodiments, the notification services provide such normative expressions of traffic because the route predictor (1) predicts likely mutes that the user might take at different time periods based on the user's historical travel patterns, and (2) compares the traffic along these routes to historical traffic levels along these routes.

In some embodiments, the engine then provides not only one or more predicted routes for the user but also normative quantification of the level of traffic along each of the predicted routes. When the engine provides more than one predicted route, the engine also provides probabilities for each predicted route that quantifies the likelihood that the predicted route is the actual route. Based on these probabilities, the notification manager can display traffic information about the most likely route, or creates a stacked, sorted display of such traffic information, much like the sorted, stacked display of routes explained above by reference to FIG. 8. That is, the user could perform a swipe interaction (or perform another interaction with the device) in order to cause the notification center to provide information for a different possible route (e.g., traffic information for US-101). In addition to providing probabilities for different routes to different destinations, the route predictor may identify two (or more) probabilities for two different mutes to the same destination (e.g., if the user often takes two different routes to and/or from work based on his own assessment of the traffic).

On the second day, the user again manually pulls on the notification center affordance 1950 in the first stage 1921. As shown by the second stage 1923, this operation again results in the presentation of the notification center 1970. This display presents the enabled notification feature of this display (as indicated by the greyed out color of the notification affordance 1925) and also presents a variety of notification alerts from a variety of applications. The second stage 1923 also shows the user's touch selection of the today affordance 1910.

As shown by the third stage 1927, the selection of this affordance again results in a presentation 1975 of the today window. In this case, the window states that traffic along 1-280 north is worse than usual for the predicted time of the user's departure and that the user should consider leaving a little earlier than usual. The notification services provides this notice because the mute predictor (1) has predicted that the user will likely take 1-280 north, and (2) has compared today's traffic with historical traffic levels along this route to determine that traffic today is worse than usual.

While specific names are given to the two tabs of the notification center ("Notifications" and "Today"), one of ordinary skill in the art will recognize that different names or icons may be used to represent these tabs. For instance, the "Today" tab is called the "Traffic" tab in some embodiments, and the Traffic window only provides traffic data. Similarly, other specific UI names and icons may be represented differently in different embodiments.

FIGS. 20 and 21 illustrate another way for providing traffic data in the notification center. In this example, the notification center presents all notifications on one page that has different headings for different types of notifications. The headings in some embodiments includes a Traffic heading, a calendar heading, a voicemail heading, a message heading, a stock heading, etc.

FIGS. 20 and 21 illustrate that under the Traffic heading some embodiments provide traffic data. In some embodiments, the presented traffic data (i.e., the traffic notice) is reported for the "best" route that was predicted for the device based on the predicted destination for the device's current location without reference to the device's previous intermediate locations. In other embodiments, the traffic notice is provided for a predicted route that is based on the device's previous intermediate locations as it previously traveled to the predicted destination. FIG. 20 illustrates an example where the traffic along I-101 is heavy on one day (Thursday, May 31), while FIG. 21 illustrates an example where the traffic along I-101 is normal on the next day (Friday, May 31).

FIGS. 20 and 21 illustrate a design layout for the one-page notification center. Other embodiments use other design layouts for the one-page notification center. FIG. 22 illustrates one such other design layout. Specifically, it shows a one-page notification center 2200 that is similar to that illustrated in FIGS. 20 and 21, except that it does not have headers between the different categories of topics on this page. In some embodiments, the page 2200 includes various different types of data for the current day, and it is called the Today page. This information includes traffic notices, calendared appointments, weather reports, stock prices, etc.

In the embodiments illustrated in FIGS. 20, 21, and 22, no affordance is provided to view alternative routes for a congested predicted route. FIG. 23 illustrates that other embodiments place an affordance 2305 next to a traffic notice regarding heavier than normal traffic congestion. Selection of this affordance in some embodiments directs the device to show one or more alternative routes on a map to the same predicted destination. A similar alternative route affordance can be provided in the design layout of FIG. 22.

Also, in the embodiments illustrated in FIGS. 20-23, traffic data is provided separately from the other data. In other embodiments, however, the notification center uses traffic and/or route data to inform and adjust the presentation of other data in the notification center. For instance, FIGS. 24 and 25 illustrate embodiments in which the notification manager of the device uses traffic and route data to identify and display the travel times for appointments specified the a calendar application that executes on the device. As mentioned above, the location of such appointments along with their times are harvested and stored in the harvested address data storage 206. In some embodiments, these harvested addresses drive the process for identifying the travel times shown in FIGS. 24 and 25, while in other embodiments this process is driven by the calendar application's interaction with the prediction processor and its subsequent interaction with the notification manager.

In FIG. 24, the notification center displays a traffic notice for two calendared appointments. In some embodiments, the traffic is expressed in terms of traffic expression along one or more roads that are traversed by a predicted route to the location of a calendared appointment. The predicted route is a best route in some embodiments, while it is based on intermediate breadcrumb data in other embodiments.

In FIG. 25, the notification center displays a traffic event for each of two calendared appointments. Each traffic event appears as a calendared appointment except that its description makes it clear that it represents the time of travel to an appointment. In some embodiments, the traffic events have an appearance that is different than calendered events (appointments) to allowing them to be quickly distinguished from the calendered events.

In some embodiments, the traffic event has a duration that is specified in terms of (1) one or more roads that are traversed by a predicted route to the location of a calendared appointment, and (2) traffic along such roads. The predicted route is a best route in some embodiments, while it is based on intermediate breadcrumb data in other embodiments.

In the notification centers of FIGS. 24 and 25, the traffic data is also presented under the traffic header. Other embodiments do not provide such general traffic data when traffic data is provided for calendared events. Also, in these two figures, the different types of data are separated through the use of headers. While using the traffic and route data to generate and display travel events in a calendar, other embodiments do not use such headers to differentiate different types of data. e.g., they use the headerless approach of FIG. 22.

III. Electronic Device and System

Many of the above-described features and applications are implemented as software processes that are specified as a set of instructions recorded on a computer or machine readable storage medium (also referred to as computer or machine readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 26:
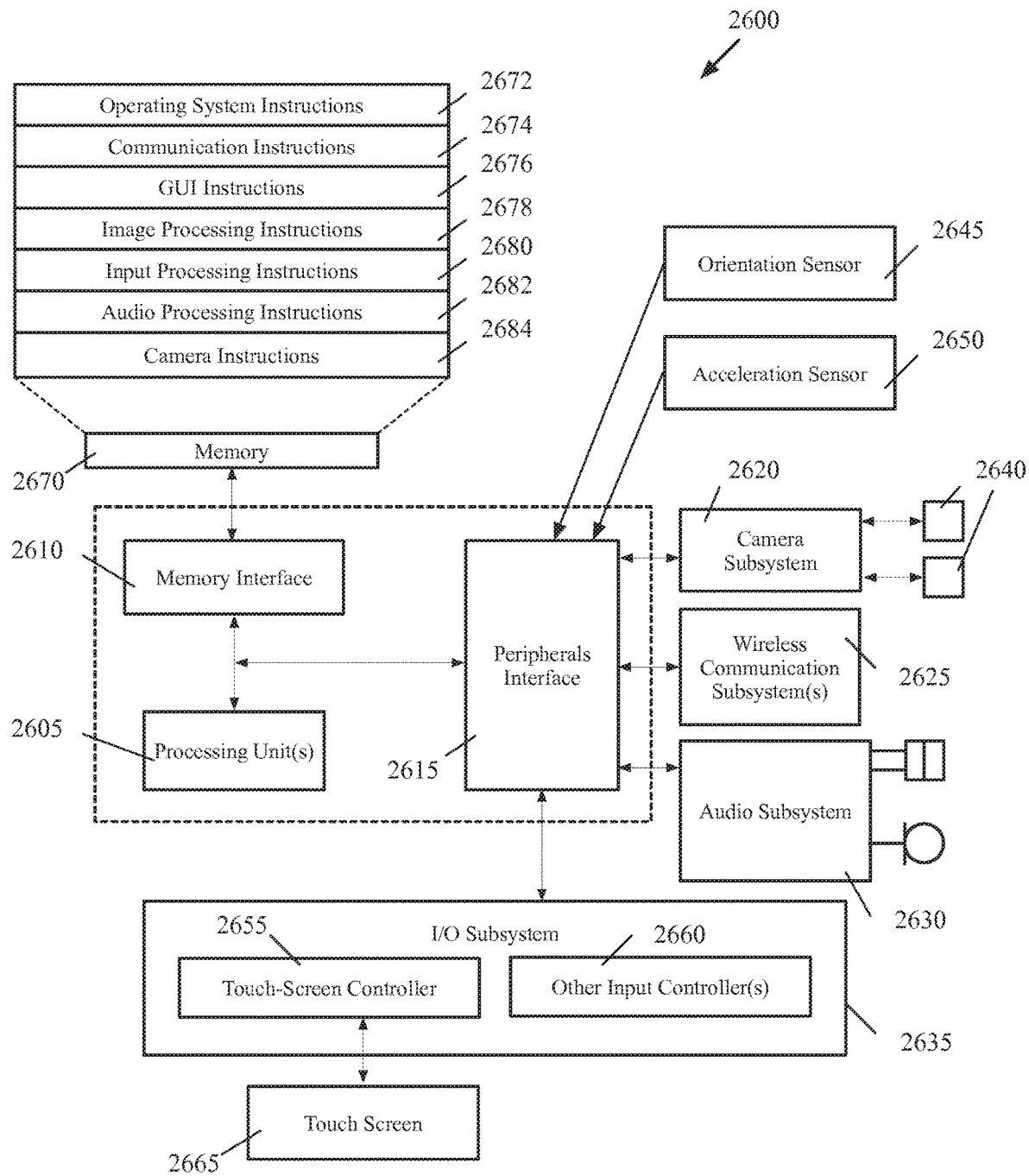
FIG. 26 is an example of an architecture of such a mobile computing device.

The mapping and navigation applications of some embodiments operate on mobile devices, such as smart phones (e.g., iPhones®) and tablets (e.g., iPads®). FIG. 26 is an example of an architecture 2600 of such a mobile computing device. Examples of mobile computing devices include smartphones, tablets, laptops, etc. As shown, the mobile computing device 2600 includes one or more processing units 2605, a memory interface 2610 and a peripherals interface 2615.

The peripherals interface 2615 is coupled to various sensors and subsystems, including a camera subsystem 2620, a wireless communication subsystem(s) 2625, an audio subsystem 2630, an I/O subsystem 2635, etc. The peripherals interface 2615 enables communication between the processing units 2605 and various peripherals. For example, an orientation sensor 2645 (e.g., a gyroscope) and an acceleration sensor 2650 (e.g., an accelerometer) is coupled to the peripherals interface 2615 to facilitate orientation and acceleration functions.

The camera subsystem 2620 is coupled to one or more optical sensors 2640 (e.g., a charged coupled device (CCD) optical sensor, a complementary metal-oxide-semiconductor (CMOS) optical sensor, etc.). The camera subsystem 2620 coupled with the optical sensors 2640 facilitates camera functions, such as image and/or video data capturing. The wireless communication subsystem 2625 serves to facilitate communication functions. In some embodiments, the wireless communication subsystem 2625 includes radio frequency receivers and transmitters, and optical receivers and transmitters (not shown in FIG. 26). These receivers and transmitters of some embodiments are implemented to operate over one or more communication networks such as a GSM network, a Wi-Fi network, a Bluetooth network, etc. The audio subsystem 2630 is coupled to a speaker to output audio (e.g., to output voice navigation instructions). Additionally, the audio subsystem 2630 is coupled to a microphone to facilitate voice-enabled functions, such as voice recognition (e.g., for searching), digital recording, etc.

Conjunctively, or alternatively, some embodiments also include a wired communication subsystem to facilitate communication functions with a vehicle's electronic system. In some embodiments, the wired communication system includes a USB connector for connecting the mobile device to a vehicle electronic system. The interface of some embodiments for communicating with a vehicle electronic system is described in further detail in U.S. Patent Publications 2009/0284476, 2010/0293462, 2011/0145863, 2011/0246891, and 2011/0265003, which are incorporated herein by reference.

The I/O subsystem 2635 involves the transfer between input/output peripheral devices, such as a display, a touch screen, etc., and the data bus of the processing units 2605 through the peripherals interface 2615. The I/O subsystem 2635 includes a touch-screen controller 2655 and other input controllers 2660 to facilitate the transfer between input/output peripheral devices and the data bus of the processing units 2605. As shown, the touch-screen controller 2655 is coupled to a touch screen 2665. The touch-screen controller 2655 detects contact and movement on the touch screen 2665 using any of multiple touch sensitivity technologies. The other input controllers 2660 are coupled to other input/control devices, such as one or more buttons. Some embodiments include a near-touch sensitive screen and a corresponding controller that can detect near-touch interactions instead of or in addition to touch interactions.

The memory interface 2610 is coupled to memory 2670. In some embodiments, the memory 2670 includes volatile memory (e.g., high-speed random access memory), non-volatile memory (e.g., flash memory), a combination of volatile and non-volatile memory, and/or any other type of memory. As illustrated in FIG. 26, the memory 2670 stores an operating system (OS) 2672. The OS 2672 includes instructions for handling basic system services and for performing hardware dependent tasks.

The memory 2670 also includes communication instructions 2674 to facilitate communicating with one or more additional devices; graphical user interface instructions 2676 to facilitate graphic user interface processing; image processing instructions 2678 to facilitate image-related processing and functions; input processing instructions 2680 to facilitate input-related (e.g., touch input) processes and functions; audio processing instructions 2682 to facilitate audio-related processes and functions; and camera instructions 2684 to facilitate camera-related processes and functions. The instructions described above are merely exemplary and the memory 2670 includes additional and/or other instructions in some embodiments. For instance, the memory for a smartphone may include phone instructions to facilitate phone-related processes and functions. Additionally, the memory may include instructions for a mapping and navigation application as well as other applications. The above-identified instructions need not be implemented as separate software programs or modules. Various functions of the mobile computing device can be implemented in hardware and/or in software, including in one or more signal processing and/or application specific integrated circuits.

While the components illustrated in FIG. 26 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 26 may be split into two or more integrated circuits.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such machine-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The machine-readable media may store a program that is executable by at least one processing unit and includes sets of instructions for performing various operations. Examples of programs or code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs), customized ASICs or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

Figure 27:
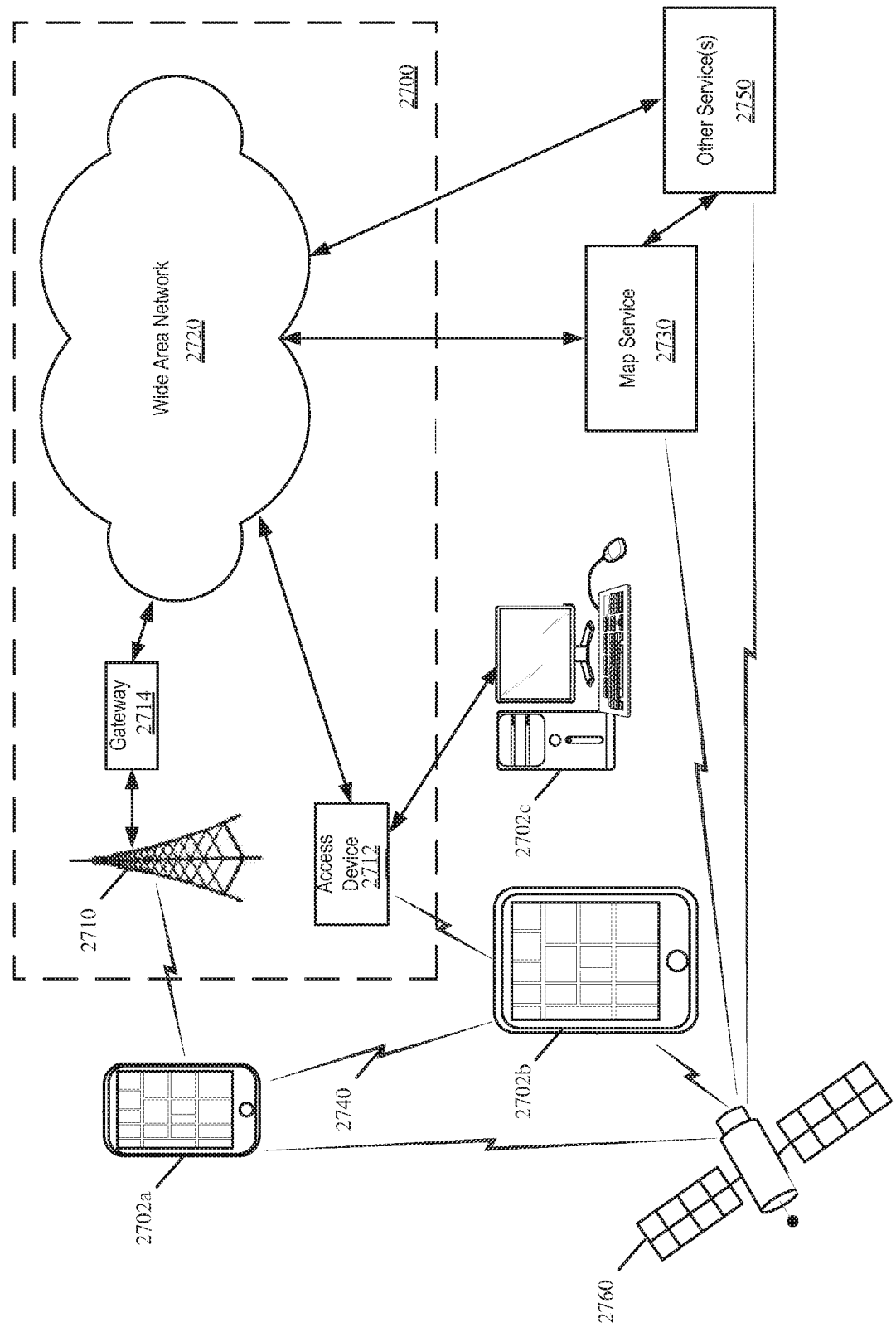
FIG. 27 illustrates a map service operating environment according to some embodiments.

As mentioned above, various embodiments may operate within a map service operating environment. FIG. 27 illustrates a map service operating environment, according to some embodiments. A map service 2730 (also referred to as mapping service) may provide map services for one or more client devices 2702a-2702c in communication with the map service 2730 through various communication methods and protocols. A map service 2730 in some embodiments provides map information and other map-related data, such as two-dimensional map image data (e.g., aerial view of roads utilizing satellite imagery), three-dimensional map image data (e.g., traversable map with three-dimensional features, such as buildings), route and direction calculation (e.g., ferry route calculations or directions between two points for a pedestrian), real-time navigation data (e.g., turn-by-turn visual navigation data in two or three dimensions), location data (e.g., where is the client device currently located), and other geographic data (e.g., wireless network coverage, weather, traffic information, or nearby points-of-interest). In various embodiments, the map service data may include localized labels for different countries or regions; localized labels may be utilized to present map labels (e.g., street names, city names, points of interest) in different languages on client devices. Client devices 2702a-2702c may utilize these map services by obtaining map service data. Client devices 2702a-2702c may implement various techniques to process map service data. Client devices 2702a-2702c may then provide map services to various entities, including, but not limited to, users, internal software or hardware modules, and/or other systems or devices external to the client devices 2702a-2702c.

In some embodiments, a map service is implemented by one or more nodes in a distributed computing system. Each node may be assigned one or more services or components of a map service. Some nodes may be assigned the same map service or component of a map service. A load balancing node in some embodiments distributes access or requests to other nodes within a map service. In some embodiments a map service is implemented as a single system, such as a single server. Different modules or hardware devices within a server may implement one or more of the various services provided by a map service.

A map service in some embodiments provides map services by generating map service data in various formats. In some embodiments, one format of map service data is map image data. Map image data provides image data to a client device so that the client device may process the image data (e.g., rendering and/or displaying the image data as a two-dimensional or three-dimensional map). Map image data, whether in two or three dimensions, may specify one or more map tiles. A map tile may be a portion of a larger map image. Assembling together the map tiles of a map produces the original map. Tiles may be generated from map image data, routing or navigation data, or any other map service data. In some embodiments map tiles are raster-based map tiles, with tile sizes ranging from any size both larger and smaller than a commonly-used 256 pixel by 256 pixel tile. Raster-based map tiles may be encoded in any number of standard digital image representations including, but not limited to, Bitmap (.bmp), Graphics Interchange Format (.gif), Joint Photographic Experts Group (.jpg, .jpeg, etc.), Portable Networks Graphic (.png), or Tagged Image File Format (.tiff). In some embodiments, map tiles are vector-based map tiles, encoded using vector graphics, including, but not limited to, Scalable Vector Graphics (.svg) or a Drawing File (.drw). Some embodiments also include tiles with a combination of vector and raster data. Metadata or other information pertaining to the map tile may also be included within or along with a map tile, providing further map service data to a client device. In various embodiments, a map tile is encoded for transport utilizing various standards and/or protocols, some of which are described in examples below.

In various embodiments, map tiles may be constructed from image data of different resolutions depending on zoom level. For instance, for low zoom level (e.g., world or globe view), the resolution of map or image data need not be as high relative to the resolution at a high zoom level (e.g., city or street level). For example, when in a globe view, there may be no need to render street level artifacts as such objects would be so small as to be negligible in many cases.

A map service in some embodiments performs various techniques to analyze a map tile before encoding the tile for transport. This analysis may optimize map service performance for both client devices and a map service. In some embodiments map tiles are analyzed for complexity, according to vector-based graphic techniques, and constructed utilizing complex and non-complex layers. Map tiles may also be analyzed for common image data or patterns that may be rendered as image textures and constructed by relying on image masks. In some embodiments, raster-based image data in a map tile contains certain mask values, which are associated with one or more textures. Some embodiments also analyze map tiles for specified features that may be associated with certain map styles that contain style identifiers.

Other map services generate map service data relying upon various data formats separate from a map tile in some embodiments. For instance, map services that provide location data may utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Embodiments may also receive or request data from client devices identifying device capabilities or attributes (e.g., hardware specifications or operating system version) or communication capabilities (e.g., device communication bandwidth as determined by wireless signal strength or wire or wireless network type).

A map service may obtain map service data from internal or external sources. For example, satellite imagery used in map image data may be obtained from external services, or internal systems, storage devices, or nodes. Other examples may include, but are not limited to, GPS assistance servers, wireless network coverage databases, business or personal directories, weather data, government information (e.g., construction updates or road name changes), or traffic reports. Some embodiments of a map service may update map service data (e.g., wireless network coverage) for analyzing future requests from client devices.

Various embodiments of a map service may respond to client device requests for map services. These requests may be a request for a specific map or portion of a map. Some embodiments format requests for a map as requests for certain map tiles. In some embodiments, requests also supply the map service with starting locations (or current locations) and destination locations for a route calculation. A client device may also request map service rendering information, such as map textures or style sheets. In at least some embodiments, requests are also one of a series of requests implementing turn-by-turn navigation. Requests for other geographic data may include, but are not limited to, current location, wireless network coverage, weather, traffic information, or nearby points-of-interest.

A map service, in some embodiments, analyzes client device requests to optimize a device or map service operation. For instance, a map service may recognize that the location of a client device is in an area of poor communications (e.g., weak wireless signal) and send more map service data to supply a client device in the event of loss in communication or send instructions to utilize different client hardware (e.g., orientation sensors) or software (e.g., utilize wireless location services or Wi-Fi positioning instead of GPS-based services). In another example, a map service may analyze a client device request for vector-based map image data and determine that raster-based map data better optimizes the map image data according to the image's complexity. Embodiments of other map services may perform similar analysis on client device requests and as such the above examples are not intended to be limiting.

Various embodiments of client devices (e.g., client devices 2702a-2702c) are implemented on different portable-multifunction device types. Client devices 2702a-2702c utilize map service 2730 through various communication methods and protocols. In some embodiments, client devices 2702a-2702c obtain map service data from map service 2730. Client devices 2702a-2702c request or receive map service data. Client devices 2702a-2702c then process map service data (e.g., render and/or display the data) and may send the data to another software or hardware module on the device or to an external device or system.

A client device, according to some embodiments, implements techniques to render and/or display maps. These maps may be requested or received in various formats, such as map tiles described above. A client device may render a map in two-dimensional or three-dimensional views. Some embodiments of a client device display a rendered map and allow a user, system, or device providing input to manipulate a virtual camera in the map, changing the map display according to the virtual camera's position, orientation, and field-of-view. Various forms and input devices are implemented to manipulate a virtual camera. In some embodiments, touch input, through certain single or combination gestures (e.g., touch-and-hold or a swipe) manipulate the virtual camera. Other embodiments allow manipulation of the device's physical location to manipulate a virtual camera. For instance, a client device may be tilted up from its current position to manipulate the virtual camera to rotate up. In another example, a client device may be tilted forward from its current position to move the virtual camera forward. Other input devices to the client device may be implemented including, but not limited to, auditory input (e.g., spoken words), a physical keyboard, mouse, and/or a joystick.

Some embodiments provide various visual feedback to virtual camera manipulations, such as displaying an animation of possible virtual camera manipulations when transitioning from two-dimensional map views to three-dimensional map views. Some embodiments also allow input to select a map feature or object (e.g., a building) and highlight the object, producing a blur effect that maintains the virtual camera's perception of three-dimensional space.

In some embodiments, a client device implements a navigation system (e.g., turn-by-turn navigation). A navigation system provides directions or route information, which may be displayed to a user. Some embodiments of a client device request directions or a route calculation from a map service. A client device may receive map image data and route data from a map service. In some embodiments, a client device implements a turn-by-turn navigation system, which provides real-time route and direction information based upon location information and route information received from a map service and/or other location system, such as Global Positioning Satellite (GPS). A client device may display map image data that reflects the current location of the client device and update the map image data in real-time. A navigation system may provide auditory or visual directions to follow a certain route.

A virtual camera is implemented to manipulate navigation map data according to some embodiments. Some embodiments of client devices allow the device to adjust the virtual camera display orientation to bias toward the route destination. Some embodiments also allow virtual camera to navigation turns simulating the inertial motion of the virtual camera.

Client devices implement various techniques to utilize map service data from map service. Some embodiments implement some techniques to optimize rendering of two-dimensional and three-dimensional map image data. In some embodiments, a client device locally stores rendering information. For instance, a client stores a style sheet which provides rendering directions for image data containing style identifiers. In another example, common image textures may be stored to decrease the amount of map image data transferred from a map service. Client devices in different embodiments implement various modeling techniques to render two-dimensional and three-dimensional map image data, examples of which include, but are not limited to: generating three-dimensional buildings out of two-dimensional building footprint data; modeling two-dimensional and three-dimensional map objects to determine the client device communication environment; generating models to determine whether map labels are seen from a certain virtual camera position; and generating models to smooth transitions between map image data. Some embodiments of client devices also order or prioritize map service data in certain techniques. For instance, a client device detects the motion or velocity of a virtual camera, which if exceeding certain threshold values, lower-detail image data is loaded and rendered of certain areas. Other examples include: rendering vector-based curves as a series of points, preloading map image data for areas of poor communication with a map service, adapting textures based on display zoom level, or rendering map image data according to complexity.

In some embodiments, client devices communicate utilizing various data formats separate from a map tile. For instance, some client devices implement Assisted Global Positioning Satellites (A-GPS) and communicate with location services that utilize data formats conforming to location service protocols, such as, but not limited to, Radio Resource Location services Protocol (RRLP), TIA 801 for Code Division Multiple Access (CDMA). Radio Resource Control (RRC) position protocol, or LTE Positioning Protocol (LPP). Client devices may also receive GPS signals directly. Embodiments may also send data, with or without solicitation from a map service, identifying the client device's capabilities or attributes (e.g., hardware specifications or operating system version) or communication capabilities (e.g., device communication bandwidth as determined by wireless signal strength or wire or wireless network type).

FIG. 27 illustrates one possible embodiment of an operating environment 2700 for a map service 2730 and client devices 2702a-2702c. In some embodiments, devices 2702a, 2702b, and 2702c communicate over one or more wire or wireless networks 2710. For example, wireless network 2710, such as a cellular network, can communicate with a wide area network (WAN) 2720, such as the Internet, by use of gateway 2714. A gateway 2714 in some embodiments provides a packet oriented mobile data service, such as General Packet Radio Service (GPRS), or other mobile data service allowing wireless networks to transmit data to other networks, such as wide area network 2720. Likewise, access device 2712 (e.g., IEEE 802.11g wireless access device) provides communication access to WAN 2720. Devices 2702a and 2702b can be any portable electronic or computing device capable of communicating with a map service. Device 2702c can be any non-portable electronic or computing device capable of communicating with a map service.

In some embodiments, both voice and data communications are established over wireless network 2710 and access device 2712. For instance, device 2702a can place and receive phone calls (e.g., using voice over Internet Protocol (VoIP) protocols), send and receive e-mail messages (e.g., using Simple Mail Transfer Protocol (SMTP) or Post Office Protocol 3 (POP3)), and retrieve electronic documents and/or streams, such as web pages, photographs, and videos, over wireless network 2710, gateway 2714, and WAN 2720 (e.g., using Transmission Control Protocol/Internet Protocol (TCP/IP) or User Datagram Protocol (UDP)). Likewise, in some implementations, devices 2702*b* and 2702*c* can place and receive phone calls, send and receive e-mail messages, and retrieve electronic documents over access device 2712 and WAN 2720. In various embodiments, any of the illustrated client device may communicate with map service 2730 and/or other service(s) 2750 using a persistent connection established in accordance with one or more security protocols, such as the Secure Sockets Layer (SSL) protocol or the Transport Layer Security (TLS) protocol.

Devices 2702*a* and 2702*b* can also establish communications by other means. For example, wireless device 2702*a* can communicate with other wireless devices (e.g., other devices 2702*b*, cell phones, etc.) over the wireless network 2710. Likewise devices 2702*a* and 2702*b* can establish peer-to-peer communications 2740 (e.g., a personal area network) by use of one or more communication subsystems, such as Bluetooth® communication from Bluetooth Special Interest Group. Inc. of Kirkland, Wash. Device 2702*c* can also establish peer to peer communications with devices 2702*a* or 2702*b* (not shown). Other communication protocols and topologies can also be implemented. Devices 2702*a* and 2702*b* may also receive Global Positioning Satellite (GPS) signals from GPS satellites 2760.

Devices 2702*a*, 2702*b*, and 2702*c* can communicate with map service 2730 over the one or more wire and/or wireless networks. 2710 or 2712. For instance, map service 2730 can provide a map service data to rendering devices 2702*a*, 2702*b*, and 2702*c*. Map service 2730 may also communicate with other services 2750 to obtain data to implement map services. Map service 2730 and other services 2750 may also receive GPS signals from GPS satellites 2760.

In various embodiments, map service 2730 and/or other service(s) 2750 are configured to process search requests from any of client devices. Search requests may include but are not limited to queries for business, address, residential locations, points of interest, or some combination thereof. Map service 2730 and/or other service(s) 2750 may be configured to return results related to a variety of parameters including but not limited to a location entered into an address bar or other text entry field (including abbreviations and/or other shorthand notation), a current map view (e.g., user may be viewing one location on the multifunction device while residing in another location), current location of the user (e.g., in cases where the current map view did not include search results), and the current route (if any). In various embodiments, these parameters may affect the composition of the search results (and/or the ordering of the search results) based on different priority weightings. In various embodiments, the search results that are returned may be a subset of results selected based on specific criteria include but not limited to a quantity of times the search result (e.g., a particular point of interest) has been requested, a measure of quality associated with the search result (e.g., highest user or editorial review rating), and/or the volume of reviews for the search results (e.g., the number of times the search result has been review or rated).

In various embodiments, map service 2730 and/or other service(s) 2750 are configured to provide auto-complete search results that are displayed on the client device, such as within the mapping application. For instance, auto-complete search results may populate a portion of the screen as the user enters one or more search keywords on the multifunction device. In some cases, this feature may save the user time as the desired search result may be displayed before the user enters the full search query. In various embodiments, the auto complete search results may be search results found by the client on the client device (e.g., bookmarks or contacts), search results found elsewhere (e.g., from the Internet) by map service 2730 and/or other service(s) 2750, and/or some combination thereof. As is the case with commands, any of the search queries may be entered by the user via voice or through typing. The multifunction device may be configured to display search results graphically within any of the map display described herein. For instance, a pin or other graphical indicator may specify locations of search results as points of interest. In various embodiments, responsive to a user selection of one of these points of interest (e.g., a touch selection, such as a tap), the multifunction device is configured to display additional information about the selected point of interest including but not limited to ratings, reviews or review snippets, hours of operation, store status (e.g., open for business, permanently closed, etc.), and/or images of a storefront for the point of interest. In various embodiments, any of this information may be displayed on a graphical information card that is displayed in response to the user's selection of the point of interest.

In various embodiments, map service 2730 and/or other service(s) 2750 provide one or more feedback mechanisms to receive feedback from client devices 2702*a*-2702*c*. For instance, client devices may provide feedback on search results to map service 2730 and/or other service(s) 2750 (e.g., feedback specifying ratings, reviews, temporary or permanent business closures, errors etc.); this feedback may be used to update information about points of interest in order to provide more accurate or more up-to-date search results in the future. In some embodiments, map service 2730 and/or other service(s) 2750 may provide testing information to the client device (e.g., an A/B test) to determine which search results are best. For instance, at random intervals, the client device may receive and present two search results to a user and allow the user to indicate the best result. The client device may report the test results to map service 2730 and/or other service(s) 2750 to improve future search results based on the chosen testing technique, such as an A/B test technique in which a baseline control sample is compared to a variety of single-variable test samples in order to improve results.

While the invention has been described with reference to numerous specific details, one of ordinary skill in the art will recognize that the invention can be embodied in other specific forms without departing from the spirit of the invention. For instance, many of the figures illustrate various touch gestures (e.g., taps, double taps, swipe gestures, press and hold gestures, etc.). However, many of the illustrated operations could be performed via different touch gestures (e.g., a swipe instead of a tap, etc.) or by non-touch input (e.g., using a cursor controller, a keyboard, a touchpad/trackpad, a near-touch sensitive screen, etc.).

Also, numerous examples were provided above for using the predicted destinations, predicted routes, or data regarding the predicted destinations or routes to drive the operations of one or more applications. However, one of ordinary skill will realize that such predictions or associated data can be used to inform many other applications not described above. For example, a weather application or a notification manager can use the predicted destination or route information to provide weather at a predicted destination or along a predicted route. Many other examples of informing the operation of many other applications with predicted route, destination or related data exist. Thus, one of ordinary skill in the art would understand that the invention is not to be limited by the foregoing illustrative details, but rather is to be defined by the appended claims.

What is claimed is:

1. A method implemented by a map application of a mobile device connected to a vehicle interactive system, the method comprising:
    performing destination prediction for the mobile device according to a first prediction frequency, the destination prediction including formulating, by the map application, a plurality of predicted destinations for the mobile device;
    detecting, by the map application, that a speed of the mobile device has accelerated past a threshold speed;
    in response to detecting that the mobile device has accelerated past the threshold speed, performing the destination prediction for the mobile device according to a second prediction frequency that is higher than the first prediction frequency;
    causing, by the map application, a vehicle display screen of the vehicle interactive system to display a current location of the mobile device in a first navigation presentation;
    detecting, by the map application, a proximity of a first predicted destination of the plurality of predicted destinations to the current location; and
    causing, by the map application, the vehicle display screen to present a first route to the first predicted destination in a second navigation presentation.

2. The method of claim 1, further comprising providing the route without user input.

3. The method of claim 1, further comprising detecting a proximity of the first predicted destination when the vehicle interactive system is activated.

4. The method of claim 1, further comprising formulating the plurality of predicted destinations based on a current travel direction of the mobile device.

5. The method of claim 1, wherein the first predicted destination is a machine-generated destination that is distinct from one or more physical addresses stored on the mobile device.

6. The method of claim 5, further comprising:
    searching a contacts application of the mobile device for the machine-generated destination;
    identifying a contact that corresponds to the machine-generated destination; and
    labeling the machine-generated destination using the contact from the contacts application.

7. The method of claim 1, further comprising formulating the plurality of predicted destinations for the mobile device based on a determination that the current location of the mobile device corresponds to a road.

8. The method of claim 1, further comprising:
    receiving a touch input anywhere on the second navigation presentation; and
    in response to the touch input, presenting turn-by-turn navigation instructions to navigate the first route to the first predicted destination.

9. The method of claim 1, further comprising:
    detecting a change in the current location of the mobile device; and
    in response to the detection, updating the second navigation presentation to present a second route to a second predicted destination of the plurality of predicted destinations.

10. A mobile device comprising:
    a set of processing units for executing sets of instructions; and
    a non-transitory machine readable medium storing a map application executable by at least one of the processing units of the device, the map application comprising sets of instructions for:
        performing destination prediction for the mobile device according to a first prediction frequency, the destination prediction including formulating, by the map application, a plurality of predicted destinations for the mobile device;
        detecting, by the map application, that a speed of the mobile device has accelerated past a threshold speed;
        in response to detecting that the mobile device has accelerated past the threshold speed, performing the destination prediction for the mobile device according to a second prediction frequency that is higher than the first prediction frequency;
        causing, by the map application, a vehicle display screen of the vehicle interactive system to display a current location of the mobile device in a first navigation presentation;
        detecting, by the map application, a proximity of a first predicted destination of the plurality of predicted destinations to the current location; and
        causing, by the map application, the vehicle display screen to present a first route to the first predicted destination in a second navigation presentation.

11. The mobile device of claim 10, wherein the map application further comprises sets of instructions for providing the route without user input.

12. The mobile device of claim 10, wherein the map application further comprises sets of instructions for detecting a proximity of the first predicted destination when the vehicle interactive system is activated.

13. The mobile device of claim 10, wherein the map application further comprises sets of instructions for wherein the first predicted destination is a machine-generated destination that is distinct from one or more physical addresses stored on the mobile device.

14. The mobile device of claim 13, wherein the map application further comprises sets of instructions for:
    searching a contacts application of the mobile device for the machine-generated destination;
    identifying a contact that corresponds to the machine-generated destination; and
    labeling the machine-generated destination using the contact from the contacts application.

15. The mobile device of claim 10, wherein the map application further comprises sets of instructions for:
    receiving a touch input anywhere on the second navigation presentation; and
    in response to the touch input, presenting turn-by-turn navigation instructions to navigate the first route to the first predicted destination.

16. The mobile device of claim 10, wherein the map application further comprises sets of instructions for:
    detecting a change in the current location of the mobile device; and
    in response to the detection, updating the second navigation presentation to present a second route to a second predicted destination of the plurality of predicted destinations.

17. A non-transitory machine readable medium storing a map application executable by at least one of the processing units of the device, the map application comprising sets of instructions for:

performing destination prediction for the mobile device according to a first prediction frequency, the destination prediction including formulating, by the map application, a plurality of predicted destinations for the mobile device;

detecting, by the map application, that a speed of the mobile device has accelerated past a threshold speed;

in response to detecting that the mobile device has accelerated past the threshold speed, performing the destination prediction for the mobile device according to a second prediction frequency that is higher than the first prediction frequency;

causing, by the map application, a vehicle display screen of the vehicle interactive system to display a current location of the mobile device in a first navigation presentation;

detecting, by the map application, a proximity of a first predicted destination of the plurality of predicted destinations to the current location; and causing, by the map application, the vehicle display screen to present a first route to the first predicted destination in a second navigation presentation.

18. The non-transitory machine readable medium of claim 17, wherein the first predicted destination is a machine-generated destination that is distinct from one or more physical addresses stored on the mobile device.

19. The non-transitory machine readable medium of claim 18, wherein the map application further comprises a set of instructions for:

searching a contacts application of the mobile device for the machine-generated destination;

identifying a contact that corresponds to the machine-generated destination; and labeling the machine-generated destination using the contact from the contacts application.

20. The non-transitory machine readable medium of claim 17, wherein the map application further comprises a set of instructions for:

receiving a touch input anywhere on the second navigation presentation; and in response to the touch input, presenting turn-by-turn navigation instructions to navigate the first route to the first predicted destination.

* * * * *